United States Patent [19]
Cwiakala et al.

[11] Patent Number: 5,257,379
[45] Date of Patent: Oct. 26, 1993

[54] ESTABLISHING SYNCHRONIZATION OF HARDWARE AND SOFTWARE I/O CONFIGURATION DEFINITIONS

[75] Inventors: Richard Cwiakala, Wappingers Falls; Jeffrey D. Haggar, Pleasant Valley; Charles E. Shapley, Salt Point; Timothy J. Spewak, Hyde Park; David E. Stucki, Poughkeepsie; Harry M. Yudenfriend, Wappingers Falls, all of N.Y.

[73] Assignee: International Business Machines Corporation, Armonk, N.Y.

[21] Appl. No.: 754,813

[22] Filed: Sep. 4, 1991

[51] Int. Cl.⁵ .................... G06F 3/00; G06F 13/00
[52] U.S. Cl. ...................... 395/700; 395/275; 364/DIG. 1; 364/280; 364/238.3; 364/284.2
[58] Field of Search .................. 395/650, 700, 275

[56] References Cited

U.S. PATENT DOCUMENTS

| | | | |
|---|---|---|---|
| 4,821,179 | 4/1989 | Jensen et al. | 364/200 |
| 5,014,193 | 5/1991 | Garner et al. | 364/200 |
| 5,022,077 | 6/1991 | Bealkowski et al. | 380/4 |
| 5,113,497 | 5/1992 | Dewa | 395/275 |
| 5,170,472 | 12/1992 | Cwiakala et al. | 395/275 |
| 5,193,174 | 3/1993 | Bealkowski et al. | 395/500 |

Primary Examiner—Kevin A. Kriess
Assistant Examiner—Richard A. Smedley
Attorney, Agent, or Firm—Floyd A. Gonzalez

[57] ABSTRACT

A data processing I/O system having a main storage for storing data including a software configuration definition and data processing instructions arranged in programs including an operating system, a storage device for storing I/O definition files including hardware configuration information, a processor controller for containing the hardware configuration information, and a hardware storage area (HSA) connected to the processor controller for storing a hardware configuration definition. A hardware configuration definition program (HCD) builds I/O definition files (IODFs), each IODF containing at least one I/O processor configuration definition. Each processor I/O configuration definition has a hardware token for identification. The hardware configuration information for an I/O processor configuration definition, along with a copy of its hardware token, is transferred to the processor controller by an I/O configuration program (IOCP), and a hardware configuration definition is established in the HSA. The copy of the hardware token may be fetched from the HSA and compared to hardware token of the configuration definition used to establish the software configuration definition in the main storage to determine that the software and hardware configuration definitions are synchronized. If the software and hardware configuration definitions are synchronized, dynamic changes may be made to the hardware configuration definition in the HSA. A program parameter is provided to store recovery information such that if a failure occurs during a dynamic change, the previous hardware I/O configuration may be recovered or subsequent changes can be made from the point of failure.

44 Claims, 31 Drawing Sheets

FIG.13C   PRIOR ART
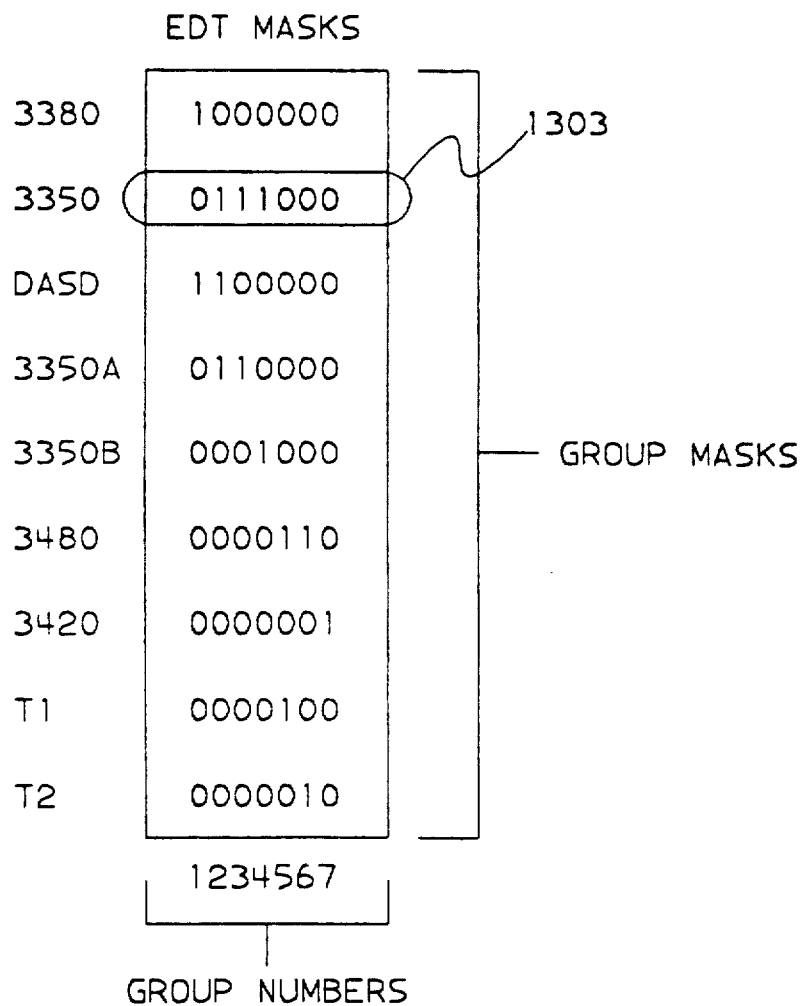
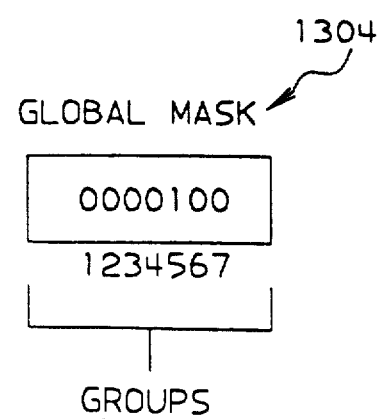

FIG. 18

| Word | | | |
|---|---|---|---|
| 0<br>1 | Processor name | | |
| 2 | 00000000 | CPU address | CPU |
| 3 | serial # | | CPU model # |
| 4<br>5 | Time stamp from TOD clock | | |
| 6 | 00000000 00000000 00000000 00000000 | | |
| 7 | 00000000 00000000 00000000 00000000 | | |
| 8<br>9 | Date | | |
| 10<br>11 | Time | | |
| 12<br>13<br>14<br>15 | Configuration description | | |

| Word | | |
|---|---|---|
| 0 | '0010' | '0012' |
| 1 | 00000000 00000000 00000000 00000000 | |
| 2 | 00000000 00000000 00000000 00000000 | |
| 3 | 00000000 00000000 00000000 00000000 | |

| Word | | | | |
|---|---|---|---|---|
| 0 | '0138' | | Response Code | |
| 1 | 00000000 00000000 00000000 00000000 | | | |
| 2 | 00000000 | Flags | 00000000 | PN |
| 3–6 | Program Parameter | | | |
| 7 | Remaining Subchannel Elements | | | |
| 8 | Remaining Control-Unit Elements | | | |
| 9 | Remaining Shared-Cluster Elements | | | |
| 10 | 00000000 00000000 00000000 00000000 | | | |
| 11 | 00000000 00000000 00000000 00000000 | | | |
| 12–27 | Current-Configuration Token | | | |
| 28–43 | Target-Configuration Token | | | |
| 44 | 00000000 00000000 00000000 00000000 | | | |
| 45 | Prtn.-Names Valid | 00000000 00000000 | | |
| 46–77 | Partition Names | | | |

0   8   16   24   31

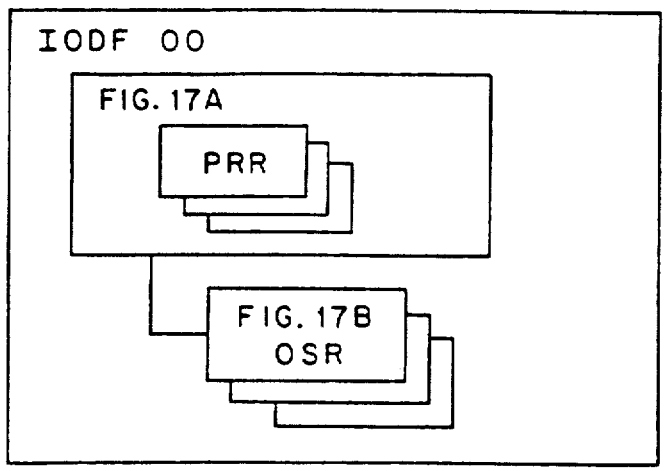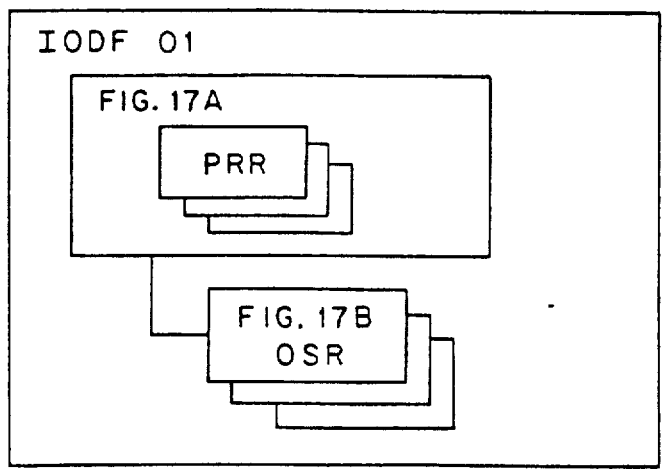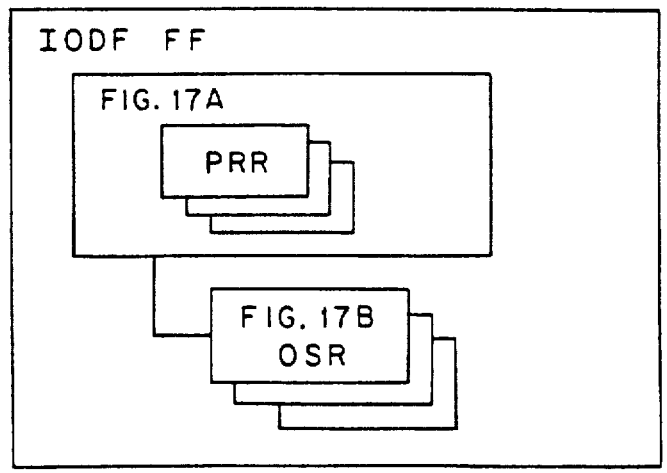
FIG. 21

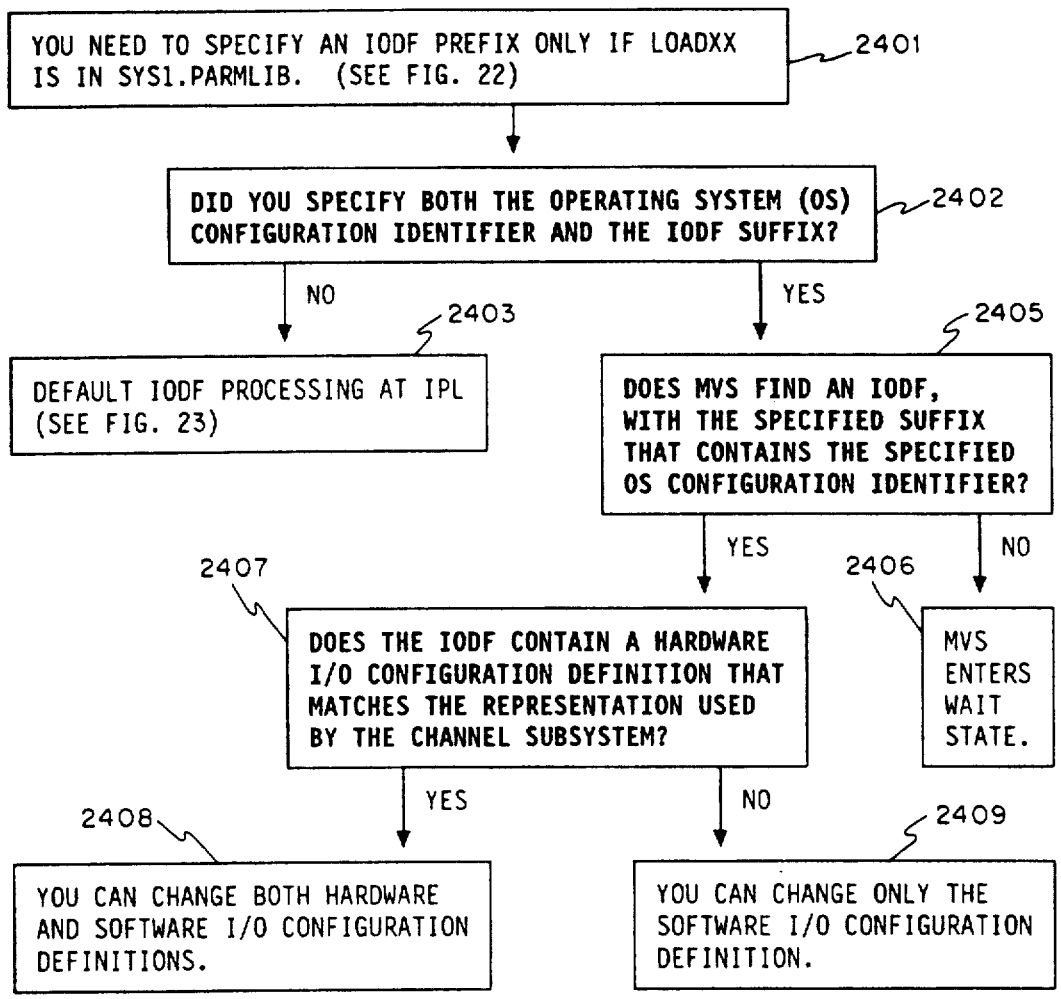

ESTABLISHING SYNCHRONIZATION OF HARDWARE AND SOFTWARE I/O CONFIGURATION DEFINITIONS

BACKGROUND OF THE INVENTION

1. Field of the Invention

This invention relates to establishment of an input/output (I/O) definition in a data processing I/O system, and is more particularly related to determining if the software I/O configuration definition is in synchronization with the hardware I/O configuration definition, to providing for synchronizing the software I/O configuration definition with the hardware I/O configuration definition, and to allowing for the recovery of a hardware I/O configuration definition if an error occurs during a dynamic change from a first I/O configuration to a second I/O configuration.

2. Background Art

Data processing systems in the field of art of the present invention typically comprise a central processor complex attached to one or more control units and their associated I/O devices in an I/O subsystem (or with other processor complexes), and central storage; and the CPU further comprises an Arithmetic Logical Unit (ALU), registers, high speed buffers, and the Processor Controller. Such systems are typically managed by a control program such as IBM's MVS/ESA.

Since such a system has a high degree of modularity, it is a routine event to add, delete, or exchange control units, I/O devices, or change channel path configurations, in the system. A particular I/O configuration must be defined both to the system's channel subsystem and operating system software, and a change to an I/O configuration occasioned by the addition, deletion, or exchange of an I/O element (channel, control unit, or I/O divice) must be reflected in a change to the hardware and software definition.

In the past it has been a matter of some difficulty to change a system's I/O configuration without disrupting active processing or the system. A normal course of events would be to establish a new set of definitions, stop processing of work on the system, add, delete, or change the I/O elements by performing the physical connection, disconnection, or reconnection, then power-up and initialize the hardware and IPL the operating system to reestablish the correct hardware and software definitions, and again start the processing of work.

This was recognized to be unacceptably disruptive and expensive, requiring as it does that the system be idle for a possibly long time period while the reconfiguration is performed. Therefore, schemes were devised to reduce the impact on system processing: one such scheme involved "over-defining" an I/O configuration—i.e., setting up definitions (control blocks) for nonexistent (at present) I/O elements, which could then be utilized later when new I/O elements are added. However this scheme has its limitations: the number of reserved definitions is a largely matter of intelligent guess work; space is wasted by the reservation of the unused control blocks; the scheme allows for the addition, not the deletion of I/O elements; and certain types of changes (such as the incorrect specification of device's "type") still required a system reinitialization.

Other schemes provided for the dynamic addition of a device definition without pre-reservation of control blocks, but did not deal with I/O element deletion since deletion poses the additional problem of the treatment of ongoing system work making use of the I/O element to be deleted—again, the traditional method of dealing with this situation was to "quiesce" the system (completing ongoing work without starting new work) so that the I/O element could be disconnected, and I/O element definition deleted, without adversely affecting ongoing processing. Still other schemes dealt with changing the characteristics of existing I/O element definitions again leaving unresolved the matter of whether or not active work must stop, and how to deal with device additions, or deletions.

SUMMARY OF THE INVENTION

A data processing I/O system is disclosed having a main storage for storing data including a software configuration definition and data processing instructions arranged in programs including an operating system, a storage device for storing I/O definition files including hardware configuration information, a processor controller for containing the hardware configuration information, and a hardware storage area (HSA) connected to the processor controller for storing a hardware configuration definition. A hardware configuration definition program (HCD) builds I/O definition files (IODFs), each IODF containing at least one I/O processor configuration definition. Each processor I/O conviguration definition has a hardware token for identification. The hardware configuration information for an I/O processor configuration definition, along with a copy of its hardware token, is transferred to the processor controller by an I/O configuration program (IOCP), and as a result of Power-On-Reset (POR) a hardware I/O configuration definition is established in the HSA. The copy of the hardware token may be fetched from the HSA and compared to hardware token of the I/O configuration definition used to establish the software I/O configuration definition in the main storage to determine that the software and hardware I/O configuration definitions are synchronized. If the software and hardware I/O configuration definitions are synchronized, dynamic changes may be made to the hardware I/O configuration definition in the HSA. A program parameter is provided to store recovery information such that if a failure occurs during a dynamic change, the previous hardware I/O configuration may be recovered or subsequent changes can be made from the point of failure.

It is thus a primary object of the present invention to provide an apparatus and method for determining if the hardware I/O configuration definition in the HSA of a data processing I/O system is synchronized with the software I/O configuration definition in the main storage.

It is another object of the present invention to determine if the hardware I/O configuration definition in the HSA of a data processing I/O system is synchronized with the software I/O configuration definition in the main storage before allowing dynamic changes to be made to the hardware I/O configuration definition.

It is another object of the present invention to provide for recovery of the hardware I/O configuration definition if a failure occurs during dynamic changes in the hardware I/O configuration definition.

It is another object of the present invention to provide that the recovery of the hardware I/O configuration definition may be to either continue to make dynamic changes to the hardware I/O configuration definition after a failure, or to backout changes made to the hardware I/O configuration definition before the failure until a defined source or target hardware I/O configuration definition is reached.

It is another object of the present invention to identify a source or target hardware I/O configuration definition by finding its hardware token in one of the IODFs on the storage device.

The foregoing and other objects, features and advantages of the invention will be apparent from the following more particular description of the preferred embodiment of the invention as illustrated in the drawings.

BRIEF DESCRIPTION OF THE DRAWINGS

FIG. 13C is an illustration of EDT groups masks and a global mask according to the prior art.

FIG. 18 shows the format of a hardware token of the present invention.

FIG. 19 shows the format of a command-request block of a store-configuration-information command requesting information from the HSA.

FIG. 20 shows the format of a command-response block of the store-configuration-information command.

FIG. 21 is an illustration of the contents of multiple IODFs.

FIG. 24 is a flowchart of non-default IODF processing at IPL.

FIG. 25 shows the format of the program parameter used in recovery of I/O configuration definitions.

DESCRIPTION OF THE PREFERRED EMBODIMENT

Figure 1A:
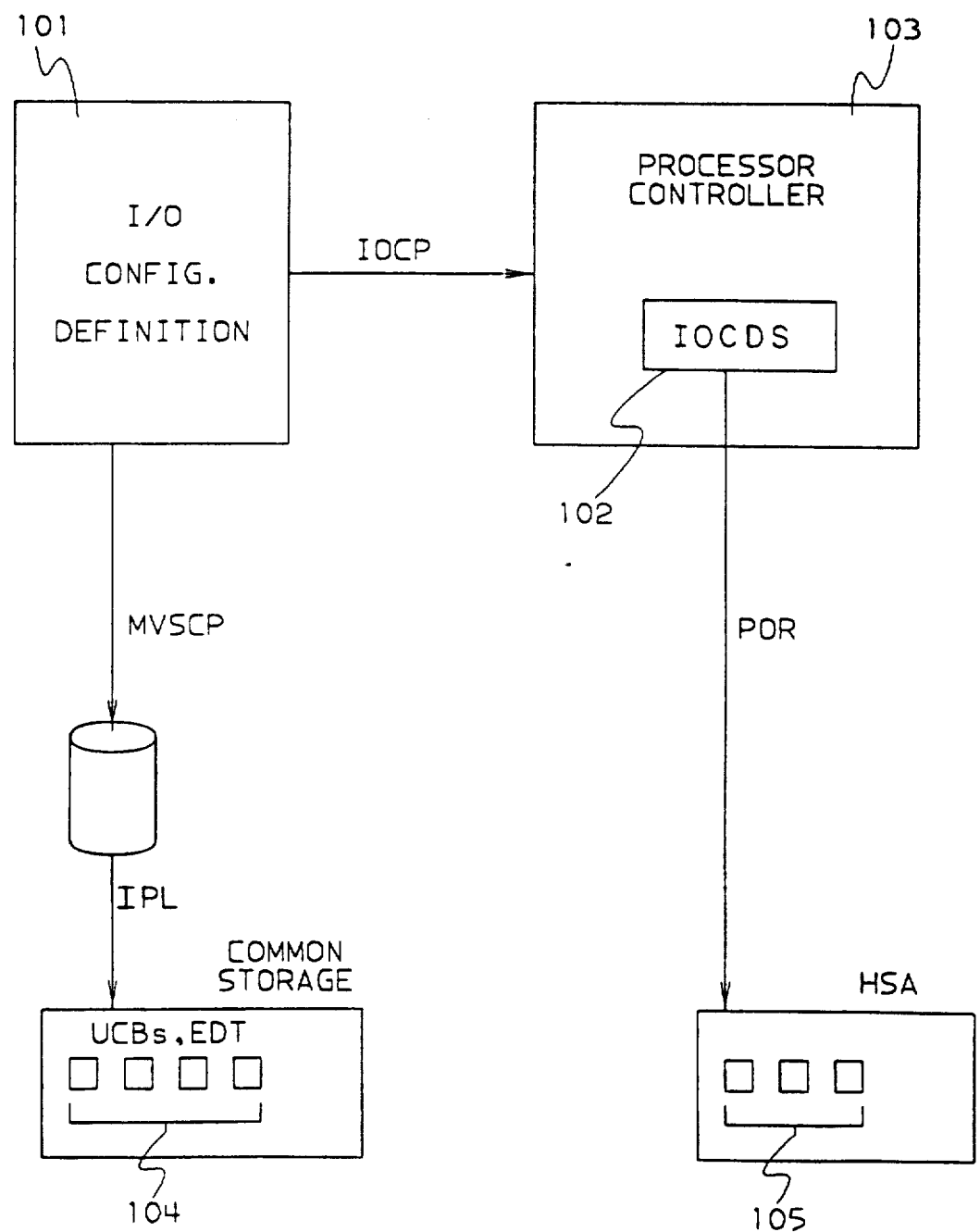
FIG. 1A is a prior art block diagram illustrating an existing system configuration definition mechanism.

FIG. 1A illustrates at a high level the configuration definition mechanism of IBM's prior art Systems. An I/O Configuration Definition 101 is processed by a hardware I/O configuration program (IOCP) to create an I/O Configuration Data Set (IOCDS) 102 within the Processor Controller 103. Independently, the same (or a different) I/O Configuration Definition 101 is processed by the MVS Configuration program (MVSCP) and selected at system IPL to create control block definitions of the configuration (104) in control program (common) storage. The IOCDS 102 is used at hardware Power-On Reset (POR) to generate definitional structures within the system's Hardware System Area (HSA) Storage. The use of "configuration" herein means "I/O configuration."

Figure 1B:
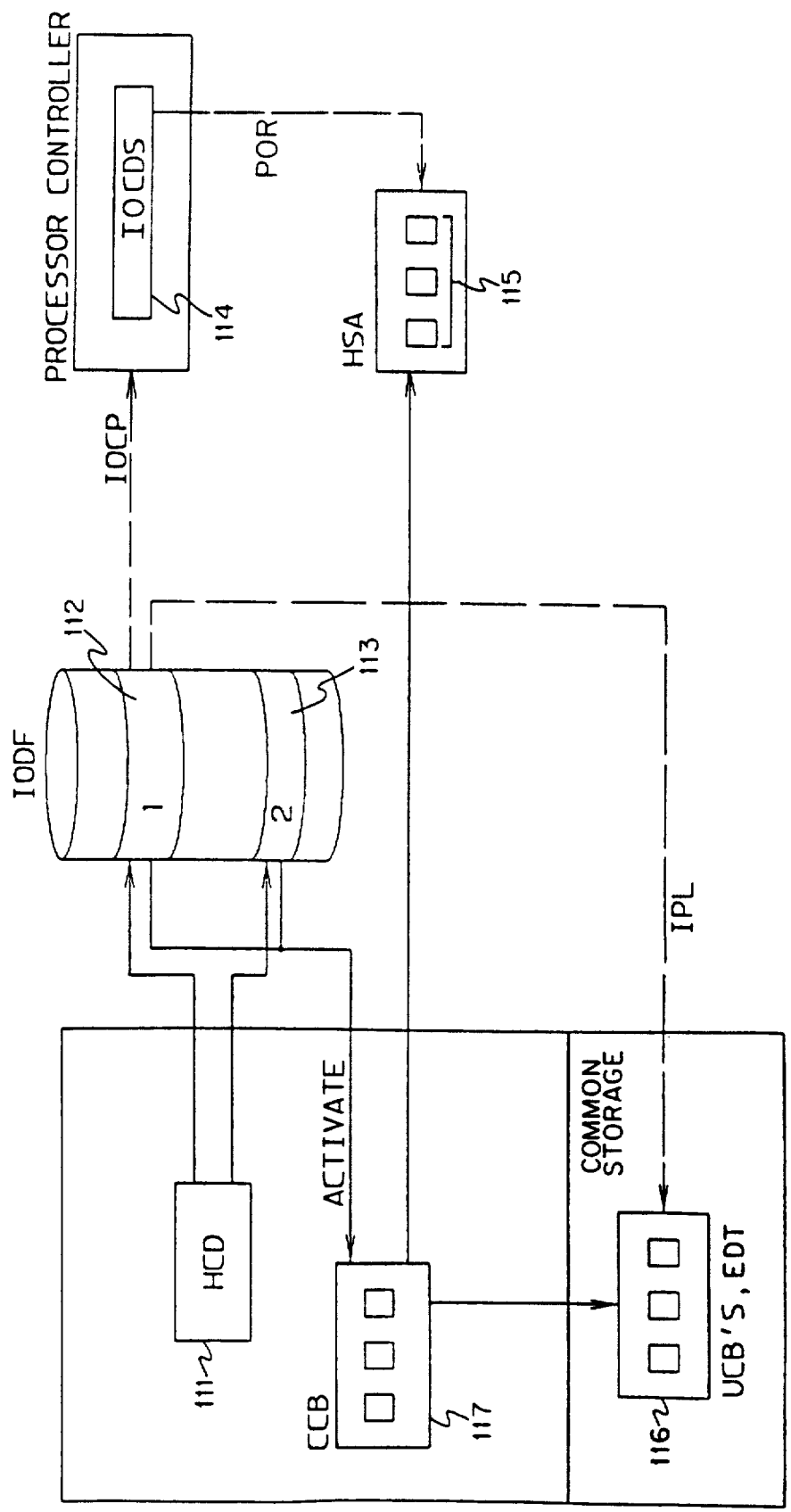
FIG. 1B is a block diagram of the system configuration mechanism of the present invention.

FIG. 1B illustrates at a high level the improved configuration definition mechanism of the present invention, in an IBM/MVS embodiment. A configuration defining program (Hardware Configuration Definition—HCD) 111 creates a representation of the current system I/O configuration 112 in an I/O definition file (IODF), and, subsequently, a representation of a future configuration in the same (or a different) file 113. (Appendix B describes the IODF layout in more detail, in relation to FIG. 17—which illustrates it.) The current configuration definition 112 may be used, as in prior art systems, to create an IOCDS 114 (in the processor controller)—which then is processed at POR to create definitional structures 115 within HSA. Definition 112 may also be used, again as in prior art, to create control block definitions 116 within common program storage. Subsequently, an ACTIVATE function initiates a comparison between current definition 112 and future definition 113, the creation of a Configuration Change Block (CCB) 117 representing the deltas to the hardware and software definitions to perform the change (and validates that the change can be made with data integrity). The CCB then drives the modifications needed to software definition 116 and hardware definition 115. (The mechanics of the changing of the hardware definition are described in "Dynamically Changing a System I/O Configuration Definition" by R. Cwiakala et al., U.S. patent application Ser. No. 07/693,997 now U.S. Pat. No. 5,170,472 Mar. 28, 1991 and assigned to the same assignee, which application is hereby incorporated by reference.) This process will be explained in more detail below.

Processing Overview

Figure 2:
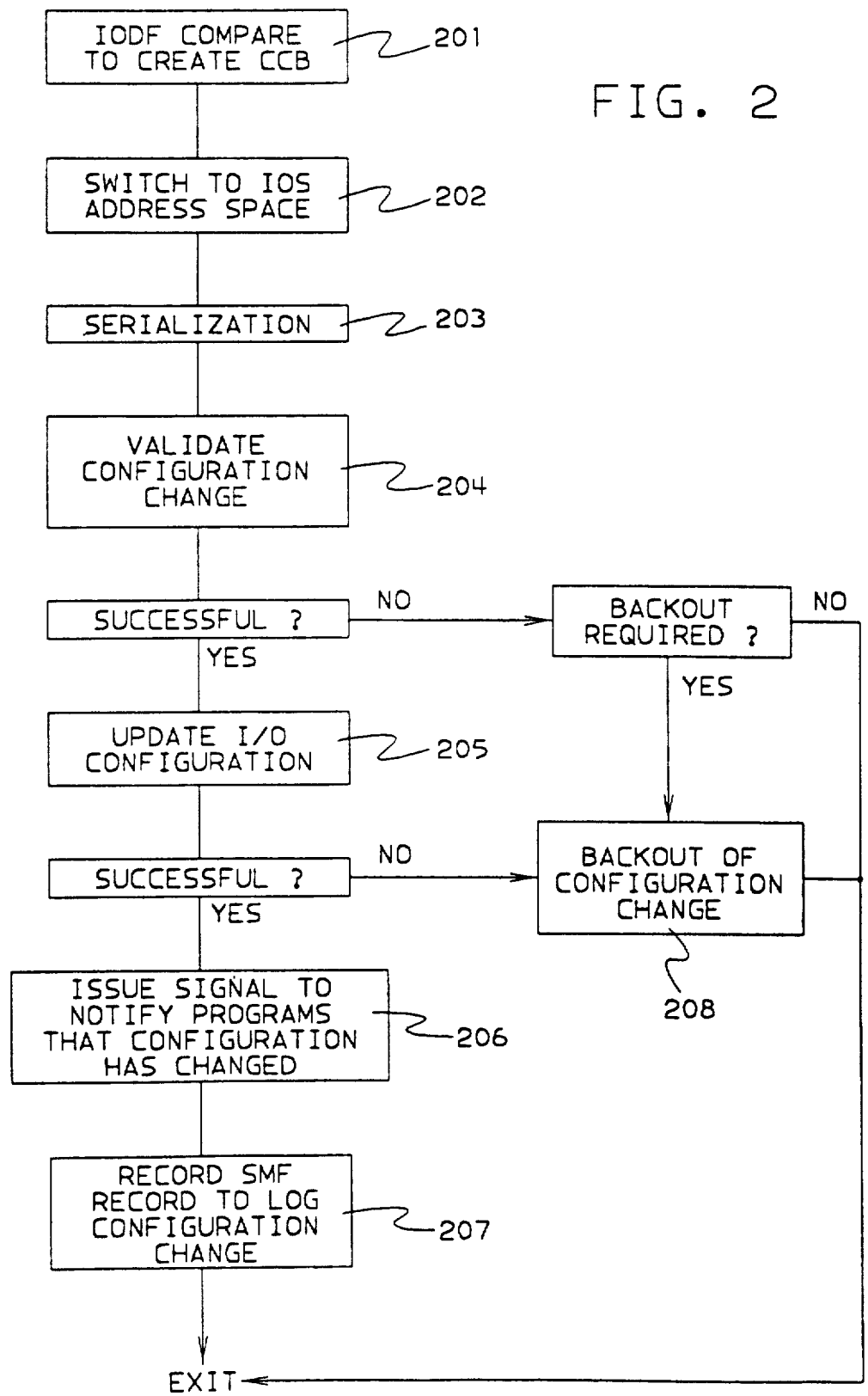
FIG. 2 is a flowchart presenting an overview of the dynamic I/O configuration process of the present invention.

An overview of the dynamic I/O configuration process used in changing from a current configuration to a future (target) configuration is as follows, and is illustrated in FIG. 2.

1. The user initiates a configuration change via the activate function in the HCD. The information that the user may specify on the activate request includes the following.

Target IODF, which is the IODF that contains the I/O configuration definition to which the user wishes to change.

EDT ID, which identifies the data in the target IODF which will be used to construct the new EDT (the "eligible device table", a control block known to the prior art).

Whether a software-only configuration change should be performed.

Whether the test function should be performed.

Whether an IOCDS should be created.

Whether the written IOCDS should be made the default at the next POR.

2. The source IODF, which is the IODF that contains the I/O configuration definition with which the system is currently running, and the target IODF are compared 201 in order to create the CCB. (Part of the I/O configuration comparison process is the enforcement of the implementation restriction that a split or a merge of the LCU (Logical Control Unit) does not occur as a result of the planned I/O configuration change. Refer to Appendix C for a detailed description.) This creation process is described further in FIG. 8 and the accompanying text below.

3. MVS switches to the IOS address space 202 to perform the configuration change. The MVS address space in which the IODF comparison processing is performed is a TSO address space. A Time Sharing Option (TSO) address space is terminated if the user logs off to TSO. To ensure that the configuration change runs to completion, MVS switches to the IOS address space to perform the configuration change. The IOS address space is an address space which cannot be terminated by the user.

4. MVS obtains the necessary serialization 203 to perform the configuration change. MVS must serialize with other processes that can affect an I/O configuration change. Specifically, MVS:

enqueues on the dynamic resource, to prevent another dynamic configuration change from occurring enqueues on the reconfiguration resources, to prevent reconfiguration (i.e. vary on-line and vary off-line) of devices and device-paths enqueues on the Dynamic Device Reconfiguration (DDR) resources, to prevent a DDR swap enqueues on the allocation TP resource to prevent allocations to off-line TP and CTC devices serializes via a compare and swap on the Missing Interrupt Handler (MIH) resource, to prevent updates to MIH time intervals.

5. MVS then verifies 204 that the configuration change is valid. This process is described further in FIGS. 3, 4A, 4B, 4C and 4D, and the accompanying text below.

6. If the validation is successful, the hardware and software representations of the I/O configuration are updated 205 to reflect the new I/O configuration definition. This process is described further in FIG. 6 and the accompanying text below.

7. If the hardware and software were updated successfully, MVS issues a signal 206 to notify programs that the configuration change has completed successfully. (This signal-together with the one issued at step 307 of FIG. 3—provide the opportunity for system components, subsystems, and applications (that wish to listen for it) to prepare before or react after a dynamic configuration change is done and to adjust internal tables that they maintain.) Additionally, information regarding the configuration change is recorded 207 for logging purposes.

8. If the hardware and software were not updated successfully, MVS backs out of the configuration change 208 to restore the I/O configuration to its original state.

Validating a Configuration Change

Figure 3:
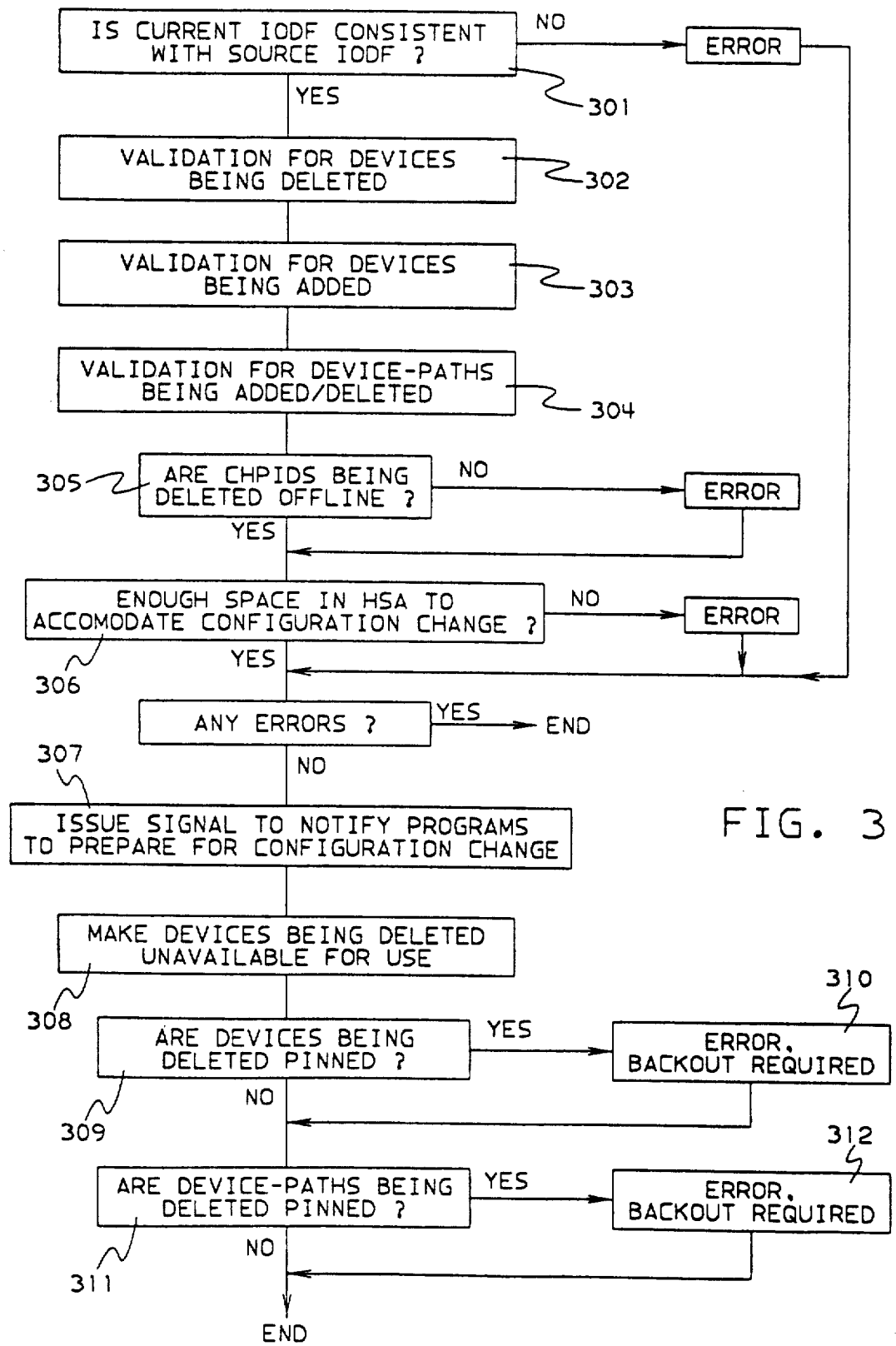
FIG. 3 is a flowchart for validating a configuration change.

The validation phase is outlined in FIG. 3. The steps which require more detail are described in FIGS. 4A, 4B, 4C and 4D.

Referring first to FIG. 3, MVS validates that:

The source I/O Definition File (IODF), which is the IODF used as the base for configuration changes, matches the configuration definition in HSA with which the system is currently running (FIG. 3 at 301).

Figure 4A:
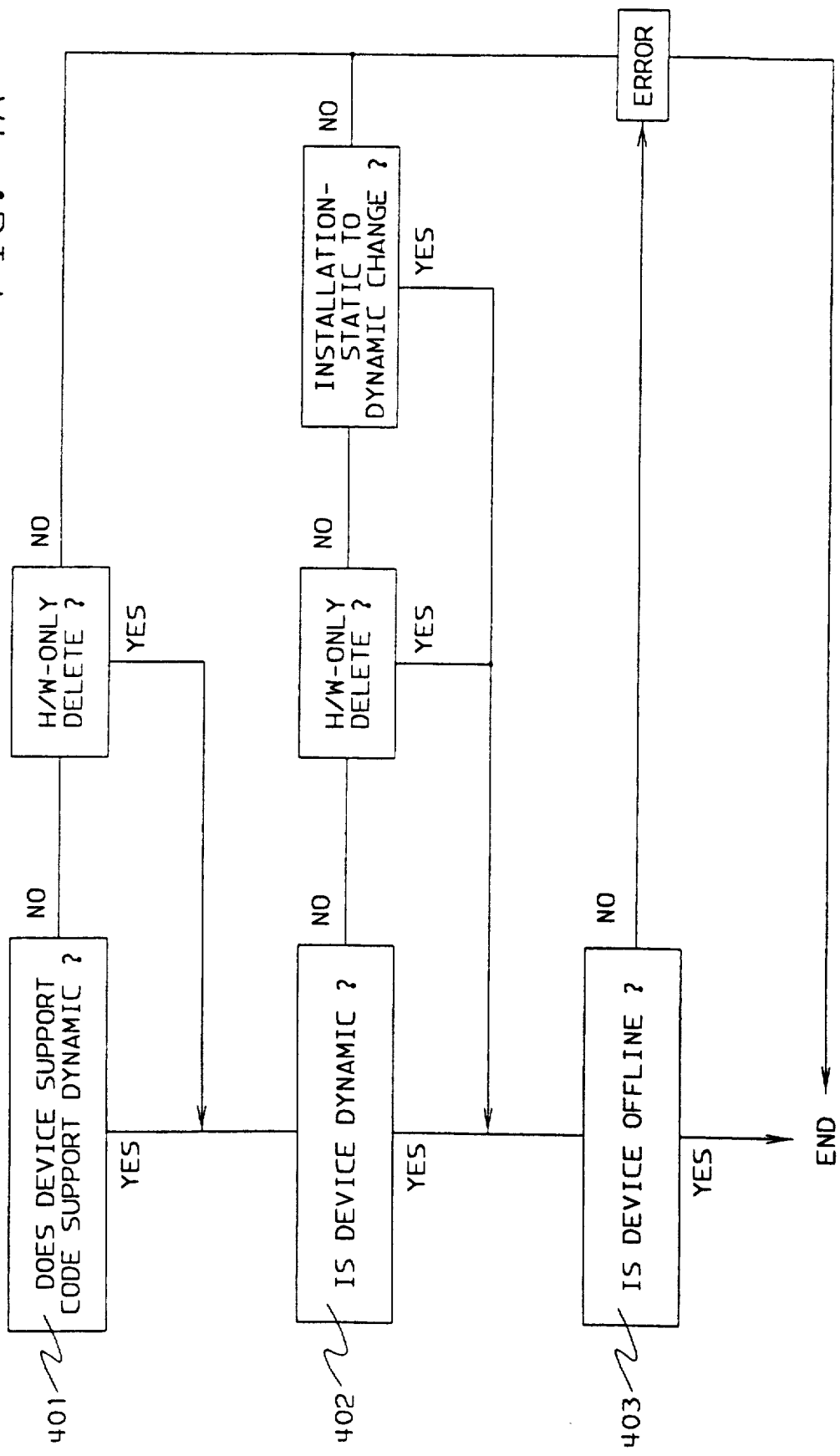
FIGS. 4A, 4B, 4C, and 4D are flowcharts for respectively: validating a device deletion, validating a device addition; validating a device-path addition, and validating a device path deletion.

For each device 302 being deleted:

The device support code supports dynamic (FIG. 4A at 401). (See the discussion of "Static" and "Dynamic" devices below.)

The device is defined as dynamic (FIG. 4A at 402). One exception to this rule is when the device is being changed from installation-static to dynamic. This transition is allowed if and only if the only difference between the source IODF definition and the target IODF definition (for the device) is that the source indicates that the device is defined as installation-static and the target IODF has the device defined as dynamic. In this case, the installation-static UCB is left in the old data structure, since there is no way to safely remove it from the UCB chain without jeopardizing system integrity—but it is rendered functionally invalid. A new dynamic UCB is added.

Another exception to this rule is when only the subchannel is being deleted and not the UCB (hardware-only delete). In this case, the subchannel is allowed to be deleted regardless of whether the device support code supports dynamic or the device is defined as dynamic.

The device is off-line (FIG. 4A at 403).

Figure 4B:
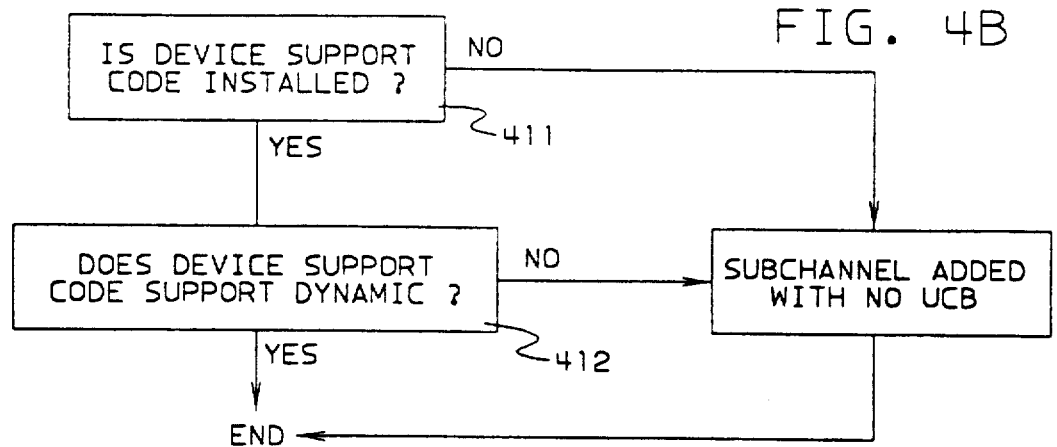

For each device being added 303:

The device support code was loaded at IPL (FIG. 4B at 411).

In prior art systems, MVS only loaded the device support code for devices in the I/O configuration at IPL. In accord with the present invention, the installation may indicate that all device support code for device types which support dynamic should also be loaded at IPL. Selecting this option will ensure that any device type which supports dynamic can be dynamically added.

The device support code supports dynamic (FIG. 4B at 412).

If either or both of these conditions are not met, the device is allowed to be added to the hardware definition. A subchannel is created (if not a software-only configuration change) but a UCB and other device related control blocks are not created. The device is available for use at the next IPL of the same IODF at which time the software definition is created.

Figure 4C:
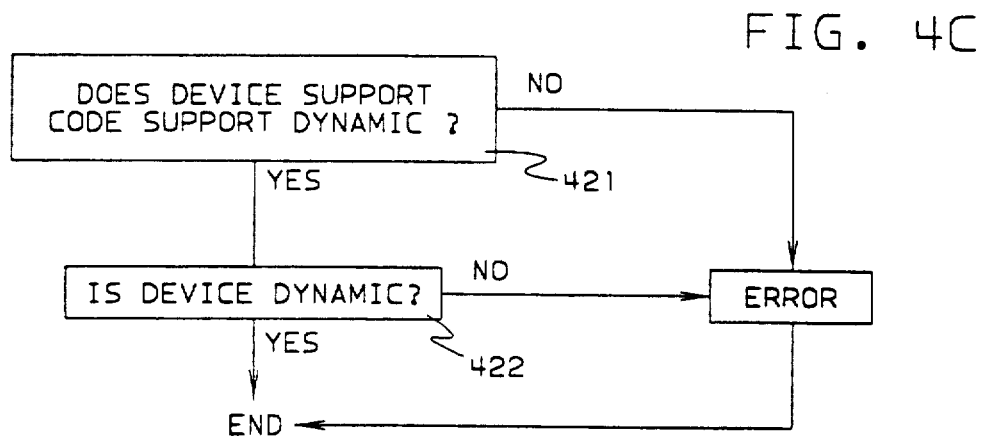
Figure 4D:
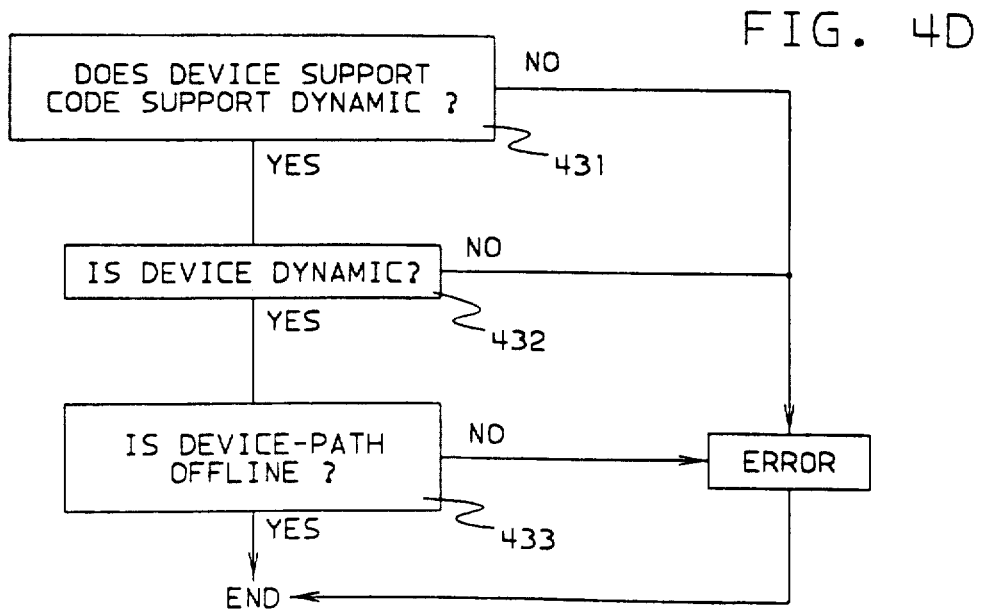

For each device-path being deleted 304:
The device support code supports dynamic (FIG. 4D at 431).
The device is defined as dynamic (FIG. 4D at 432).
The device-path is off-line (FIG. 4D at 433).

For each device-path being added 304:
The device support code supports dynamic (FIG. 4C at 421).
The device is defined as dynamic (FIG. 4C at 422).

For each channel path being deleted, the channel path must be configured off-line 305.

If the configuration change is not a software-only change, the system validates that there is enough space in the Hardware System Area (HSA) 306 to accommodate updates to the hardware I/O configuration.

All of the above validation steps are processed even if there are any requests which do not pass validation, to give the user as much information as possible as to why the configuration change could not be processed.

If the configuration change is valid so far (No errors were encountered), the system will do the following:

Issue an Event Notification Facility (ENF) signal 307 to notify programs to prepare for the configuration change. For example, programs which are using a device that is to be deleted, must prepare for the device to be deleted, by removing the address of the UCB associated with the device from any control blocks, unpinning the UCB (see below), etc.

Similarly, a device support code exit called the Device Services Exit (DSE) is invoked to notify device support code to prepare for the configuration change (for example, the device support code may need to free storage used as work areas for that device).

Make all devices which are to be deleted unavailable to be used for I/O requests 308, by disabling the subchannel associated with the device and boxing the device. Disabling the subchannel prevents I/O interrupts from being presented by the device. Boxing the device prevents I/O requests from being issued to the device.

Validate that all devices to be deleted are not pinned 309. If a device is not pinned, the UCB associated with the device is marked "not findable", which prevents if from being used. Pinning is a serialization technique that can be used by a program to prevent a UCB and associated device from being deleted by a dynamic I/O configuration change. If any devices to be deleted are pinned, an error is indicated and back-out is required 310. (See FIG. 7 and supporting text.)

Validate that all device-paths to be deleted are not pinned 311. If a device-path is not pinned, the associated UCB is marked "not path-pinnable", to prevent the device-paths associated with the UCB from being pinned. Pinning device-paths is similar to pinning a UCB, except that pinning device-paths prevents the device-paths from being deleted, as well as preventing the UCB and associated device from being deleted. If any device-paths to be deleted are pinned, an error is indicated and back-out is required 312. (See FIG. 7 and supporting text.)

Updating the Configuration Definition

Figure 5:
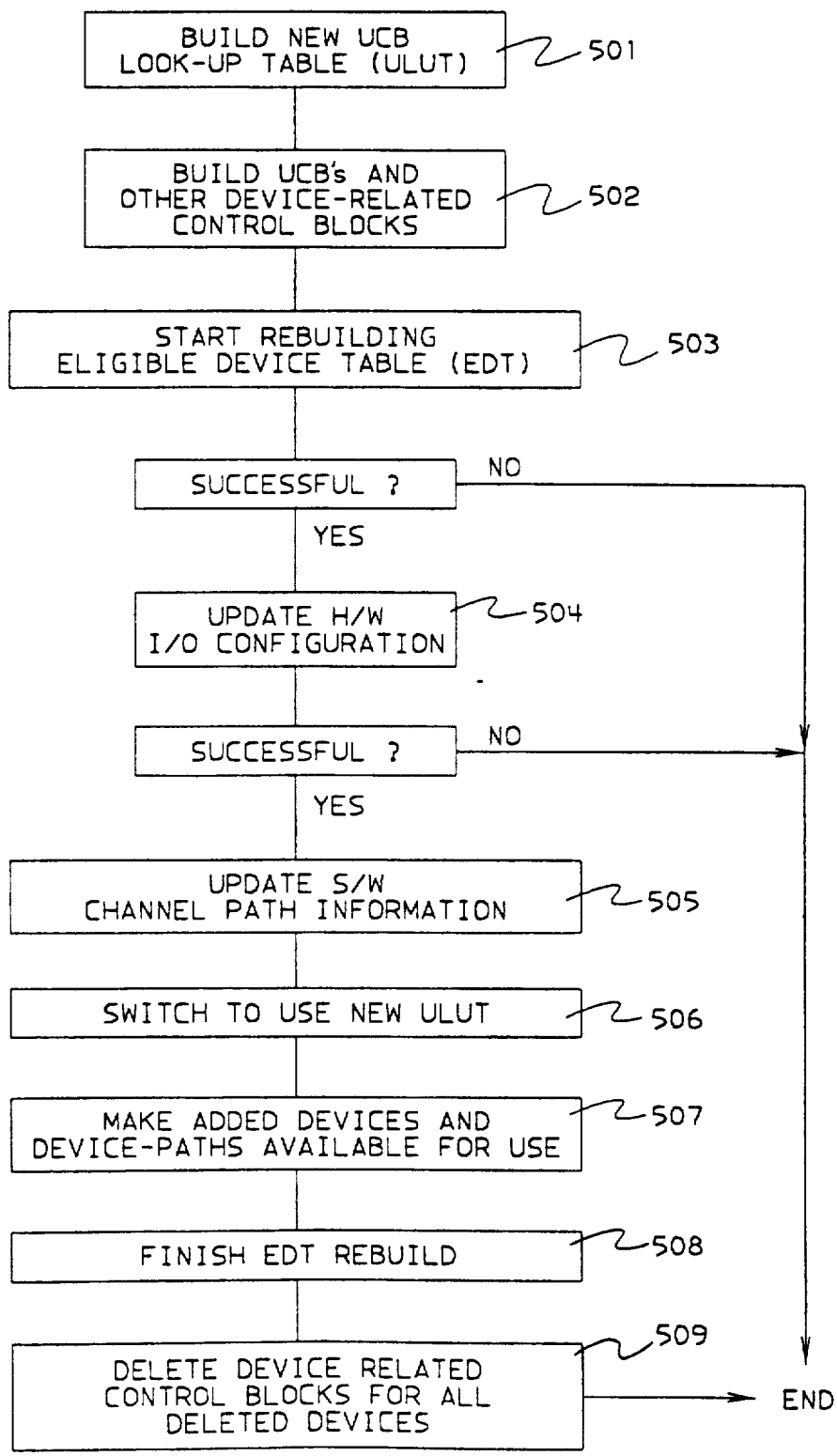
FIG. 5 is a flowchart for updating an I/O configuration.
Figure 6:
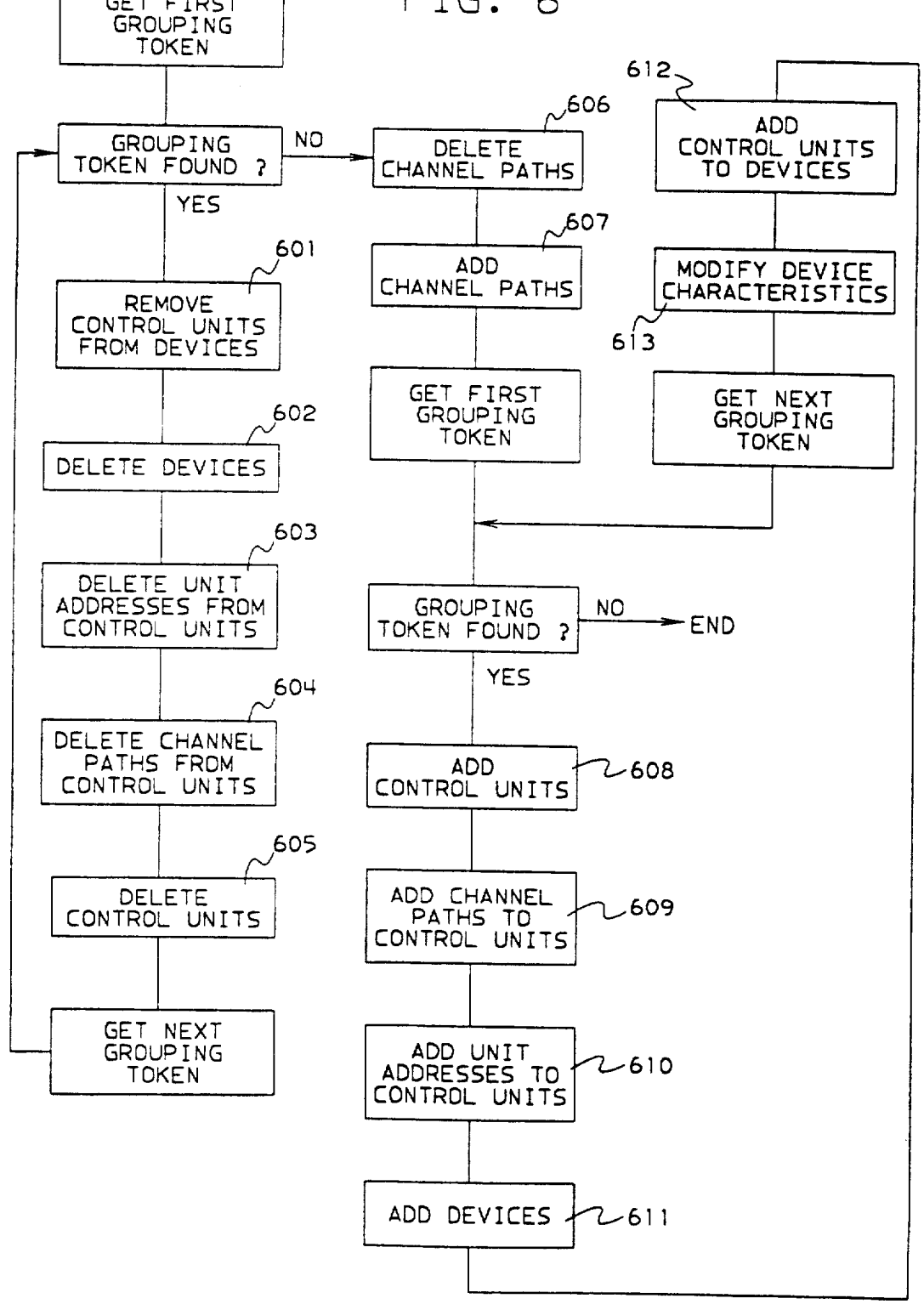
FIG. 6 is a flowchart for updating a I/O hardware configuration.

If the configuration change is valid (no errors were encountered during the validation phase), the I/O configuration is updated as shown in FIG. 5 and FIG. 6.

A new UCB Lookup Table (ULUT) is built (FIG. 5 at 501). The ULUT contains pointers to all UCBs in the system. The new ULUT will contain entries for the UCBs being added and will not contain entries for the UCBs being deleted.

A new UCB is built 502 for each device being added to the software I/O configuration. Additionally, other device related control blocks like the Device Statistics Table (DST), which is used to maintain error data associated with a device, are built. A Measurement Block Index (MBI) is established for certain added UCBs (e.g. DASD or TAPE), which will allow performance data to be measured for the device. The default MIH time interval for the device class with which the UCB is associated, is established for each added UCB, so that missing interrupts will be detected for the device.

The EDT rebuild process is started 503. This first stage of EDT rebuild creates a new intermediate EDT which will not contain the UCBs being deleted. If stage one EDT rebuild is unsuccessful, an error is indicated, back-out is required, and the update process is exited. Otherwise, the update process continues.

The hardware I/O configuration is then updated 504. This process is further described in FIG. 6. I/O components are updated in a specific order and by grouping token. The grouping token is a means for grouping together changes to I/O components, to minimize the HSA storage used for the constructs which represent the I/O components. All devices and control units in the same Logical Control Unit (LCU) will have the same grouping token. An LCU is a hardware entity, and is made up of a set of control units and devices, such that the control units access the same set of devices. (It is a set of control units having devices in common.) The following describes the order in which hardware I/O components are updated.

For each grouping token associated with the configuration change, the hardware I/O components are updated in the following order.

Remove control units from devices (FIG. 6 at 601).
Delete devices 602.
Delete unit addresses from control units 603.
Delete channel paths from control units 604.
Delete control units 605.

Then, all requests to delete channel paths are performed 606, followed by all requests to add channel paths 607. The order in which channel path configuration changes are performed is not governed by grouping tokens. Channel paths are not part of the LCU structure, therefore grouping tokens provide no HSA storage efficiency benefit for channel paths.

Then, for each grouping token associated with the configuration change, the remaining configuration changes are performed in the following order.
Add control units 608.
Add channel paths to control units 609.
Add unit address ranges to control units 610.
Add devices 611.
Add control units to devices 612.
Modify device characteristics 613.

The above order must be followed because before an I/O component can be deleted, all I/O components lower in the hierarchy must be deleted. That is, before a channel path can be deleted, all control units attached to it must be deleted. Before a control unit can be deleted, all devices attached to the control unit must be deleted. Similarly, before an I/O component can be added, all I/O components higher in the hierarchy must be added. That is, before a device can be added, all control units that the device will attach to must be added. Before a control unit can be added, all channel paths that the control unit will attach to must be added. The CCB creation logic guarantees this.

If a change to update an I/O component is unsuccessful, an error is indicated, back-out is required, and the hardware update process is exited. Otherwise, the hardware update process continues. If the hardware update process completes with no errors, the I/O configuration update process continues.

Returning to the flow in FIG. 5, channel path information that is maintained by the system is then updated 505 to include information about added channel paths, and remove information about deleted channel paths.

The ULUT lock is obtained to serialize updates to the ULUT and MVS I/O configuration token. The old and new ULUTs are then switched 506, making the new ULUT the current ULUT. From this point on, backing out of the configuration change is not possible, because once the new ULUT is made the current ULUT, UCBs that have been added are available for use, and cannot be taken away by back-out. The MVS I/O configuration token is updated (see the description of this token in the detailed description of FIG. 11 below; the updating done here is of the sequence number; WWUV; operating system ID; etc.), and the ULUT lock is released.

Devices that have been added are made available for use 507, by simulating a Channel Report Word (CRW) to connect the device to its associated UCB, and make the device available for I/O requests. Similarly deleted devices are disconnected from the UCB. Device-paths that have been added are made available for use, by simulating a CRW to add the device-paths to the associated UCB, so that the paths are available for I/O requests. For each added device, the associated DSE is invoked to read configuration data from the device and/or perform other device dependent functions.

Stage two, the final EDT rebuild stage, is then performed 508. This stage builds a final EDT containing the complete new configuration, including the UCBs that have been added, and any changes in device grouping and device preference order. The final EDT is built directly from the target IODF.

Lastly, all device-related control blocks for deleted devices are deleted 509. This is not done up front in order to guarantee enough storage for software back-out. That is, if the device-related control blocks for the deleted devices were deleted up front, before the ULUTs are switched, and the configuration change failed, the control blocks would have to be re-added in order to back-out of the configuration change. However, there is no guarantee that there will be enough storage to re-add the control blocks (because the system keeps running, doing production work to the rest of the configuration). Therefore, they are not deleted until back-out is no longer possible.

Backing Out of a Configuration Change

Figure 7:
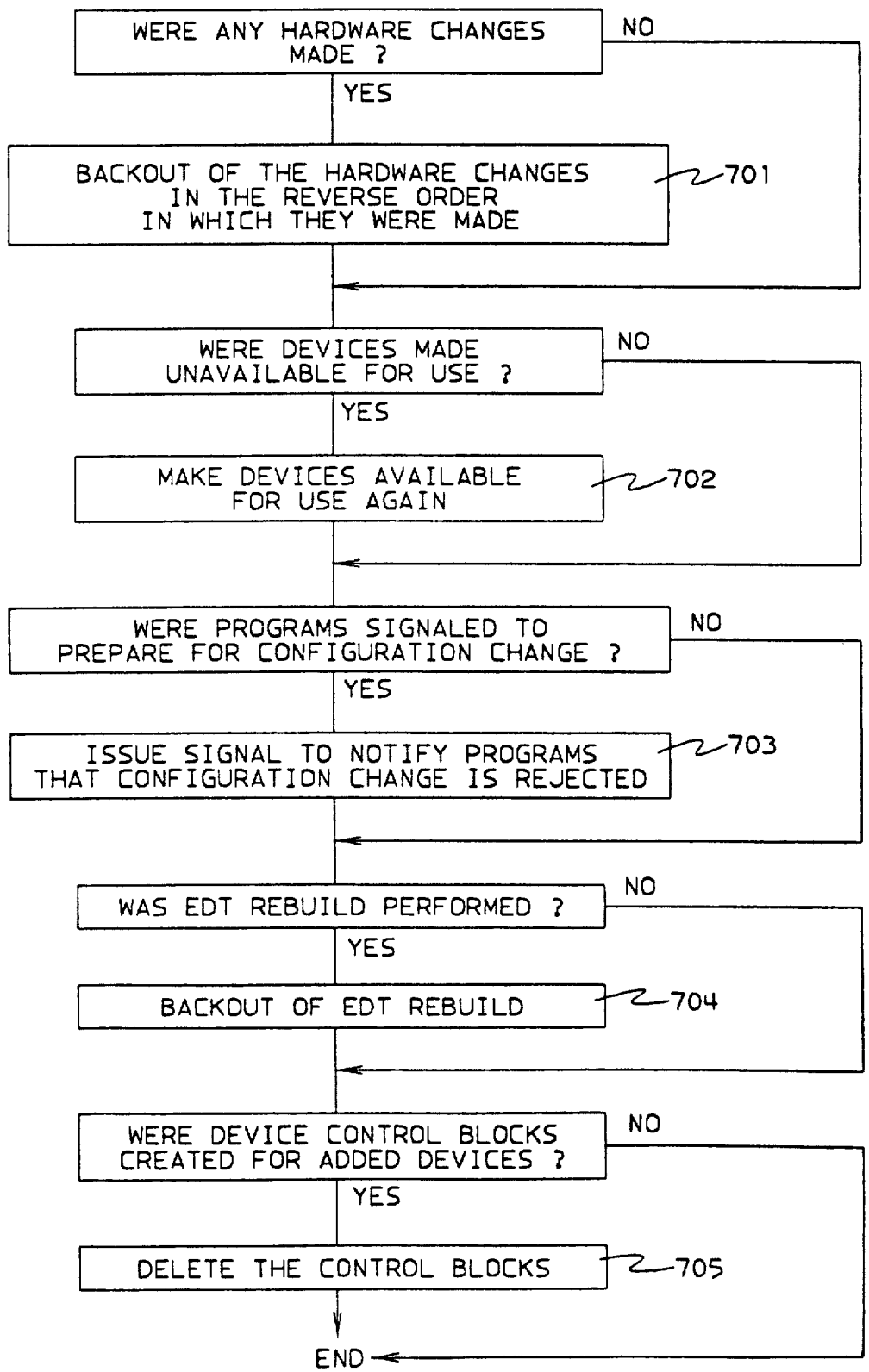
FIG. 7 is a flowchart for backing out of an I/O configuration change.

If the configuration change was unsuccessful (errors were encountered during the validation phase or the update phase), and back-out is required, the configuration change is backed out. The purpose of the back-out is to restore the I/O configuration to its original state before the configuration change was attempted. Back-out processing is shown in FIG. 7.

If any hardware updates were made before the error occurred, the hardware changes are backed out 701. For example, if a device was deleted, it is re-added, if a control unit was deleted, it is re-added, and so forth. Hardware updates are backed out in the reverse order in which they were updated.

All devices which were made unavailable for use are made available for use again 702 by enabling the subchannel and unboxing the device.

If programs were signalled to prepare for the configuration change, a signal is issued 703 to notify the programs that the configuration change is rejected. Programs which had released devices to be deleted can then reuse the devices.

If stage one EDT rebuild was performed, the EDT rebuild process is backed out 704.

All device related control blocks created for devices being added are then deleted from storage 705.

Static, Installation Static, and Dynamic Devices

Because many programs have dependencies on UCBs, this invention introduces the following concepts:

Device types which support dynamic.

This is indicated by the Unit Information Module (UIM) which is a device dependent exit out of HCD (Hardware Configuration Dialog). The UIM defines the device dependent data in the UCB.

Devices which are defined as dynamic.

For each device whose device type supports dynamic, the HCD user can define the device as installation-static or dynamic.

These new concepts resulted in three software categories of device definitions:

static: the device support code installed for the device type does not support the dynamic capability.

installation-static: device type supports the dynamic capability but the installation designates in the device definition that the device is not allowed to be deleted or modified. This allows the installation to define devices such that they will be accessible to programs which are dependent on the existing static data structures.

dynamic: device type supports the dynamic capability and the installation designates that the device is allowed to be deleted or modified.

In order for a UCB to be eligible for deletion or modification, the device type must support dynamic and the device must be defined as dynamic by the installation.

The following rules help ensure that programs which are unprepared for the dynamic deletion of UCBs (and all associated device-related control blocks) will not encounter unexpected errors.

UCBs for devices defined as dynamic are not accessible to programs which use the prior art programming services for obtaining UCB addresses.

Programs which listen for prior art ENF signals for device related events (e.g. vary device on-line) are not notified of events for devices defined as dynamic.

This invention is used in conjunction with a new set of ENF signals for device related events which encompass all UCBs. An ENF signal translation algorithm is used so that the ENF signaller does not have to be sensitive to which devices are defined as dynamic. The ENF signal translation algorithm will do the following:

If device is defined as dynamic, translate signal X into X'.

If device is defined as static or installation-static, issue both signal X and signal X'.

Therefore, existing programs which listen for signal X will only be notified for the event if the UCB is static or installation-static. Programs which listen for signal X' will be notified for the event for any UCB.

CCB Creation

The result of the comparing of the two IODFs shown in FIG. 2 at 201 is the creation of a Configuration Change Block (CCB). The CCB, in turn, is used to drive the changes to the hardware and software configuration definitions.

Figure 8:
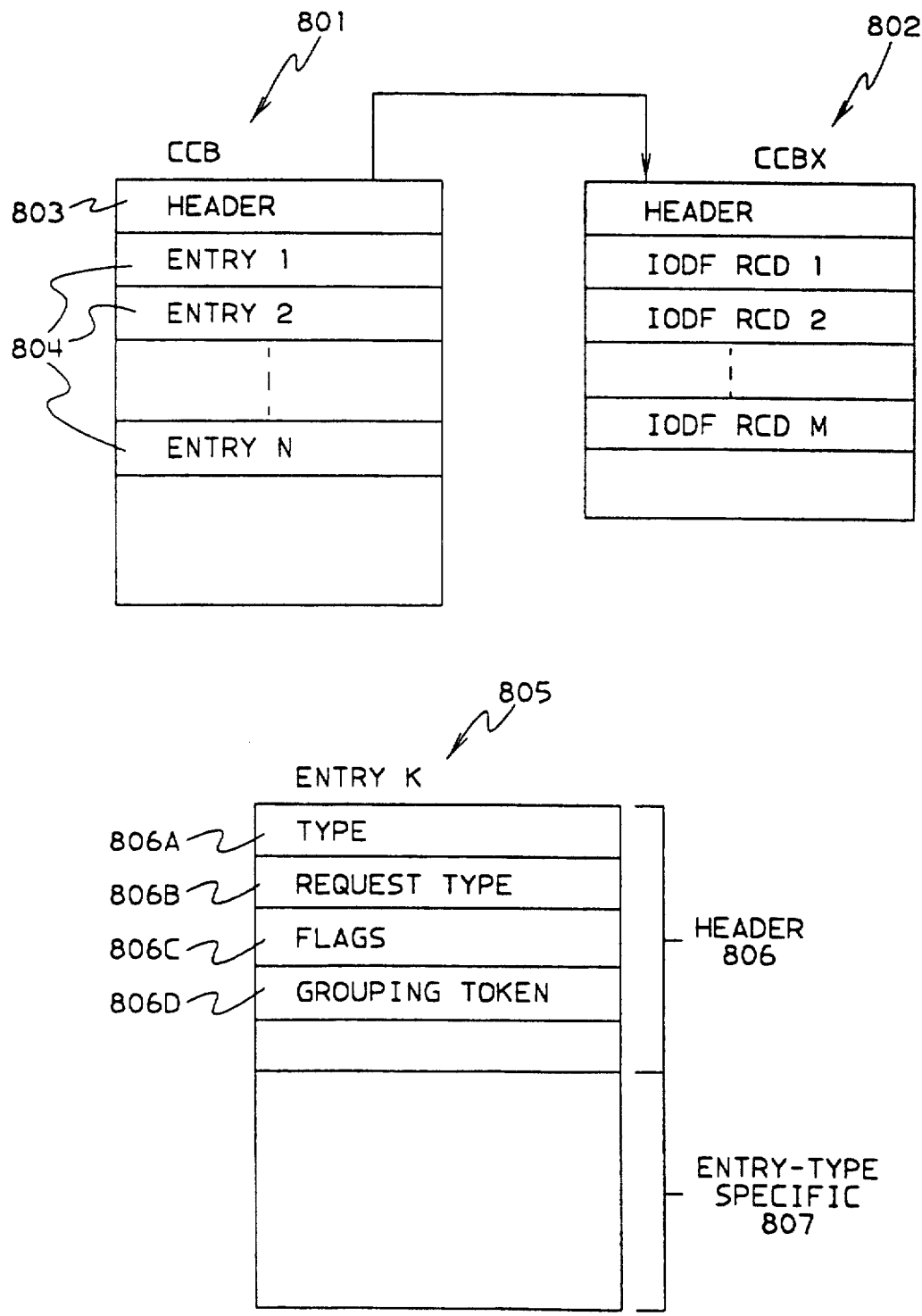
FIG. 8 is a control block diagram illustrating the structure of the CCB and CCBX.

The general structure of a CCB according to the present invention is shown in FIG. 8. As discussed in the preferred embodiment, the CCB actually comprises a CCB proper 801 and a CCB Extension (CCBX) 802 pointed to by an entry in the CCB header 803. The CCB proper contains a series of CCB entries 804 the format of which is further detailed at 805. Each entry contains a header 806 and entry type-specific information 807. The entry header contains a type indication 806A (device, control unit, or channel path ID (CHPID)) indicating the type of configuration change indicated by the entry; a request type indication 806B indicating whether the request is an add, delete or modify request; flags 806C indicating: whether the change is for the hardware configuration definition or software configuration definition; if an installation-static device is being changed to a dynamic device; and if the grouping token is valid. The entry header also contains a grouping token 806D the usage of which will be further detailed below. Each entry further contains type-specific information 807, as illustrated further in FIG. 9 (explained below). The CCBX 802 provides the IODF records that are to be used to control the dynamic additions, deletions, and modifications, and is indexed into by fields in the type-specific CCB entries 807. If the request is to add a component then the CCBX contains the record from the new IODF; if the request is to delete a record then the CCB contains the record from the old IODF (so that the component can be re-added in case of a back-out). (Appendix B describes the IODF in more detail.)

Figure 9:
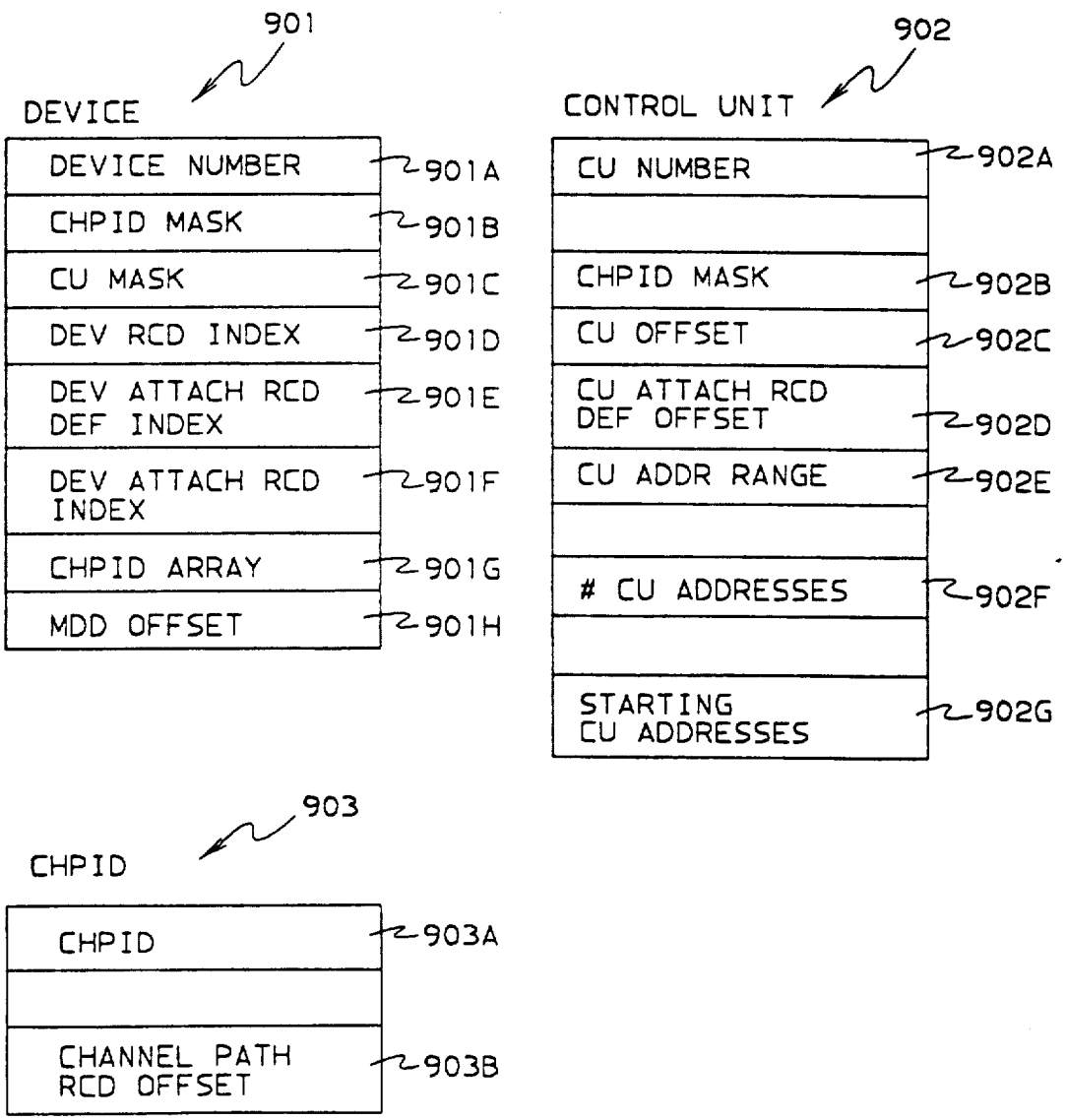
FIG. 9 is a control block diagram illustrating the structure of Device, Control Unit, and Channel Path ID (CHPID) entries of a CCB.

FIG. 9 illustrates the general form of the entry type-specific information in a CCB entry for a device entry 901, a control unit entry 902, and a CHPID entry 903.

Figure 17A:
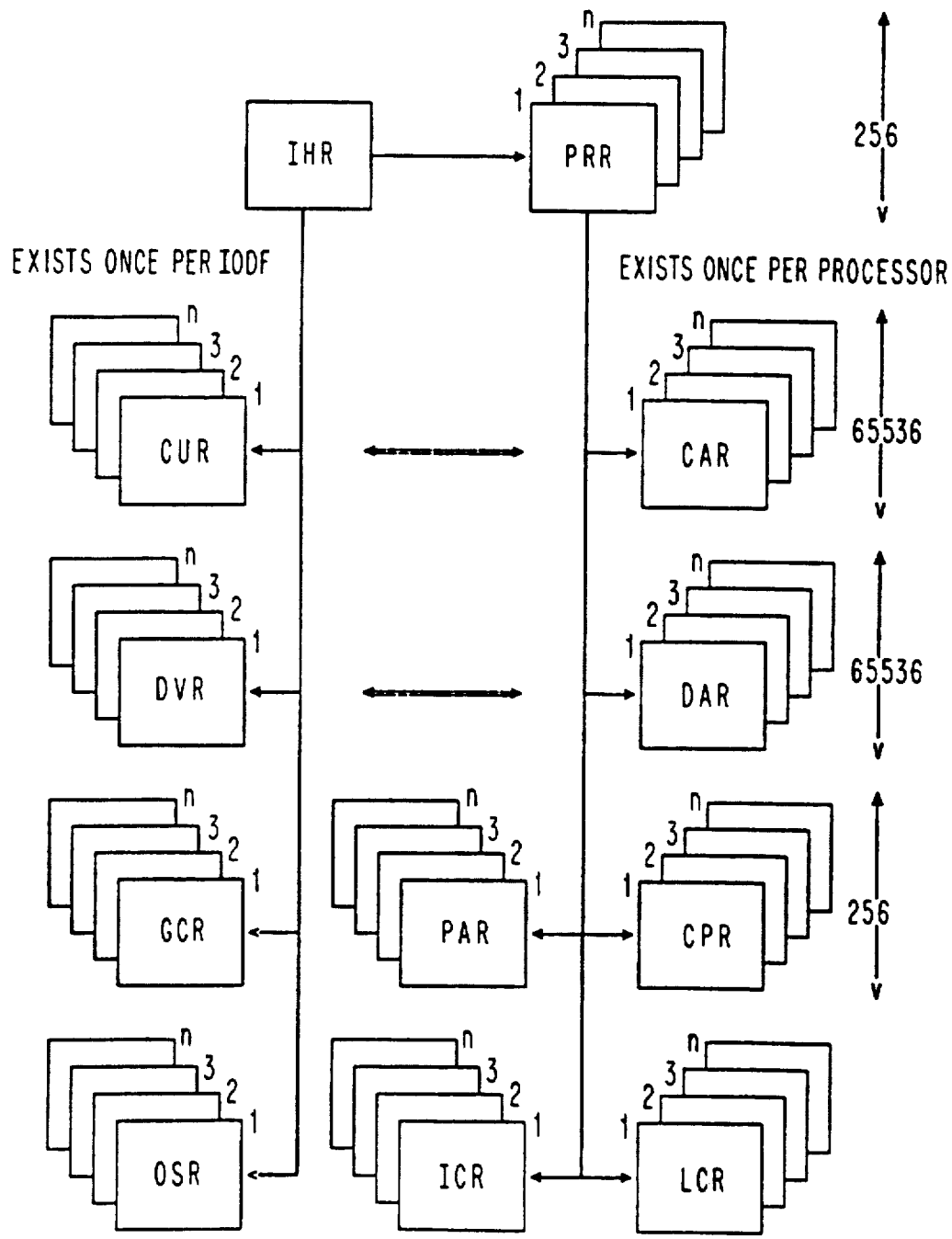
FIGS. 17A and 17 are logical structure diagrams illustrating the structure of the IODF.
Figure 17B:
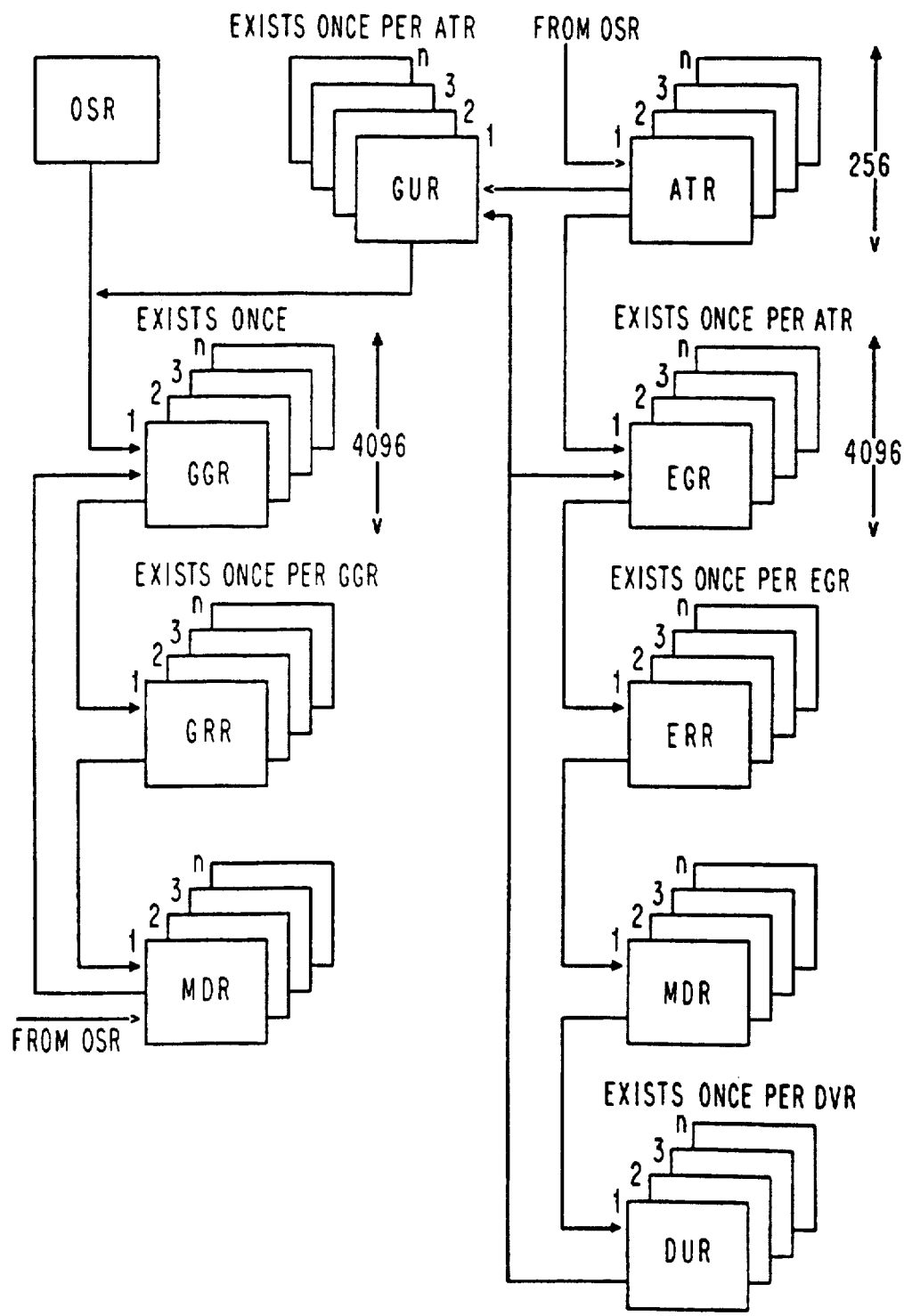

A device entry contains the device number 901A; a mask 901B of CHPIDs contained in the CHPID array 901G that are to be added/deleted from this device if the entry is for a "modify" request to add/remove CHPIDs to/from the device; a mask 901C of physical control unit numbers (contained in IODF DVR record—see FIG. 17A) that are to be added/deleted to/from the device if this entry was made for a modify request to add/delete control units to/from the device; the offset 901D into the CCBX of the device record; the offset 901E into the CCBX of the device attachment record definition (from the IODF DAR); the offset 901F into the CCBX of the device attachment record for the new IODF (from the IODF DAR); the array 901G of CHPIDs that are to be added/deleted from this device if the entry was made for a "modify" request to add/delete CHPIDs to/from the device (obtained from the IODF LCR record); and the offset 901H into the CCBX of the MVS Device Definition (IODF MDR—See FIG. 17B).

A control unit (CU) entry contains the CU number A; a mask 902B of CHPIDs that are to be added/deleted from this CU if the entry is for a "modify" request to add/delete CHPIDs to/from the CU (the CHPIDs and link addresses are contained in the CAR record—See FIG. 17A); the offset 902C into the CCBX of the physical CU record (CUR in FIG. 17A); the offset 902D into the CCBX of the CU Attachment Record definition (CAR in FIG. 17A); the range 902E of unit addresses to be added or deleted if the request is to modify the unit address range; a count 902F of the unit addresses in the range; and the starting unit address 902G.

A CHPID entry contains the CHPID 903A, and the offset 903B into the CCBX of the Channel Path Record.

In creating CCB entries, the following overall rules apply:

There are no duplicate entries in the CCB. If the same entry would result as a result of two different reasons, only one entry is generated.

No modify device entries are created if there is one add/delete hardware entry in the CCB for this device.

No modify control unit entries are created if there is one add/delete entry in the CCB for this control unit.

There is one common logic to create follow-up entries. Details are in the section entitled "Follow-up Entry Structure".

The CCB entries are sorted in the following order (so that the data can be conveniently accessed for reporting purposes, and to make building the new ULUT easier)

Device entries in device number order
  delete requests before add requests
  modify requests last
Control unit entries in control unit number order
  delete requests before add requests
  modify requests last
Channel path entries in channel path number order
  deletes before adds.

The following general comments apply to the noted type of CCB entry: (Pseudo-code for the creation of the CCB is contained in Appendix A).

There are two types of CCB entries possible for CHPIDs:
1. delete a CHPID 2. add a CHPID.

Every channel path entry indicates (via the flags in the entry header) that the hardware control blocks are to be updated and the software control blocks remain unchanged.

Delete CHPID CCB Entries

A CCB entry to delete a CHPID is created for the following reasons:
- When the old IODF is compared to the new IODF and the CHPID is not found in the new IODF, the CHPID must be deleted from the configuration.
- When the old IODF is compared to the new IODF and the CHPID definition has changed, the CHPID must be deleted from the configuration and then re-added.

Add CHPID CCB Entries

A CCB entry to add a CHPID is created for the following reasons:
- When the new IODF is compared to the old IODF and the CHPID is not found in the old IODF, the CHPID must be added to the configuration.
- When the old IODF is compared to the new IODF and the CHPID definition is found to have changed, both a delete CHPID entry and an add CHPID entry is created. The add entry says to find the corresponding CHPID record in the new IODF and create the CHPID accordingly.

Dependencies on other Entries

Whenever a delete and/or add entry is created for a CHPID, this has dependencies on other entries. See section "Follow-up Entry Structure" for a detailed description of all dependencies.

Control Unit CCB Entries

There are three types of entries possible for a control unit:
1. delete a control unit
2. add a control unit
3. modify the control unit.

Every control unit entry indicates via the header flags that the hardware control blocks are to be updated and the software control blocks remain unchanged.

Delete Control Unit Entries

A CCB entry to delete a control unit is created for the following reasons:
- When the old IODF is compared to the new IODF and the control unit is not found in the new IODF, the control unit must be deleted from the configuration.
- When the old IODF is compared to the new IODF and the control unit definition has changed (for the exceptions noted as not covered under "Modify"), the control unit must be deleted from the configuration and then re-added.

Add Control Unit Entries

A CCB entry to add a control unit is created for the following reasons:
- When the new IODF is compared to the old IODF and the control unit is not found in the old IODF, the control unit must be added to the configuration.
- When the old IODF is compared to the new IODF and the control unit definition is found to have changed (for the exceptions noted as not covered under "Modify"), both a delete control unit entry and an add control unit entry are created. The add entry says to find the corresponding control unit record in the new IODF and create the control unit accordingly.

Dependencies on Other Entries

Whenever a delete and/or add entry is created for a control unit, this has dependencies on other entries. See section "Follow-up Entry Structure" for a detailed description of all dependencies.

Modify Control Unit Entries

CCB entries to modify a control unit are created if any of the following conditions are detected:
- When the old IODF is compared to the new IODF and a CHPID has been found to be deleted from the control unit definition in the new IODF, a CCB entry is created to indicate that the control unit must be modified to remove the corresponding set of CHPIDs from the control unit definition.
- For each control unit that is modified to either add or remove a CHPID, every device on the control unit must also be modified to add or remove the CHPID. The CCB must include a Modify Device entry for each device affected.
- When the old IODF is compared to the new IODF and a CHPID has been found to be added to the control unit definition in the new IODF, a CCB entry is created to indicate that the control unit must be modified to add the corresponding set of CHPIDs into the control unit definition. If there are no CHPIDs in common, this exceptional case is not handled by "Modify", but by "Delete" and "Add".
- When the old IODF is compared to the new IODF and a unit address has been found to be added or deleted, a CCB entry is created to indicate that the control unit must be modified to add or delete unit address ranges. If there are no unit addresses in common, this exceptional case is not handled by "Modify", but by "Delete" and "Add".
- All unit addresses added or deleted are arranged into unit address ranges. There is one modify-entry for every new unit address range added and one entry for every old unit address range deleted.

Device CCB Entries

There are three types of entries possible for a device.
1. Delete a device
2. Add a device
3. Modify the device Each CCB entry for a device may indicate in the header flags that the hardware or software configuration definition is to be updated. This allows for the flexibility to add and delete UCBs without creating or deleting subchannels and adding and deleting subchannels without adding or deleting UCBs.

The following sections describe when these entries are created and placed into the CCB.

Delete a Device

A CCB entry to delete a device is created for the following reasons:
- When the old IODF is compared to the new IODF and a device definition in the old IODF (hardware and/or software) is not found in the new IODF, then that device definition must be deleted from the system.

When the old IODF is compared to the new IODF and the device definition has changed, then the device definition must be deleted and then added back into the system (except for the cases defined under "Modify"). Therefore, two CCB entries are created. The first entry will indicate that the device is to be deleted. The second entry indicates that the device is to be created with the new definition.

Add a Device Entry

A CCB entry to add a device is created for the following reasons:

When the new IODF is compared to the old IODF and a device definition (hardware or software) is found in the new IODF that was not contained in the old IODF, then that device definition must be added to the system.

When a device has changed attributes, the device is deleted from the system and must be re-added (except for the cases described under "Modify"). An add device entry is placed into the CCB.

Modify a Device

CCB entries to modify a device are only created when the old IODF is compared to the new IODF and any one of the following conditions are detected:

A control unit is added or removed from a device. If there are no control units in common between the old and new IODFs, then the device is deleted and re-added.

Following that are entries to delete or add all paths of the control unit from/to the device.

A path to an existing control unit connected to the device is added or removed.

Illegal status detection setting has changed. (Enabled or disabled)

Interface timeout setting has changed. (Enabled or disabled)

Preferred channel path has changed.

For each of the conditions above, a CCB entry is created to indicate that the device definition must be modified.

All these modify entries are hardware only changes.

Follow-up Entry Structure

Creation of some entries results in a following additional entry of another type or in a change of an existing entry.

For example, when deleting a CHPID this results in an additional entry to modify the control unit to delete the CHPID.

Or when deleting all CHPIDs from a control unit, the entry must be changed to delete the whole control unit.

Figure 10:
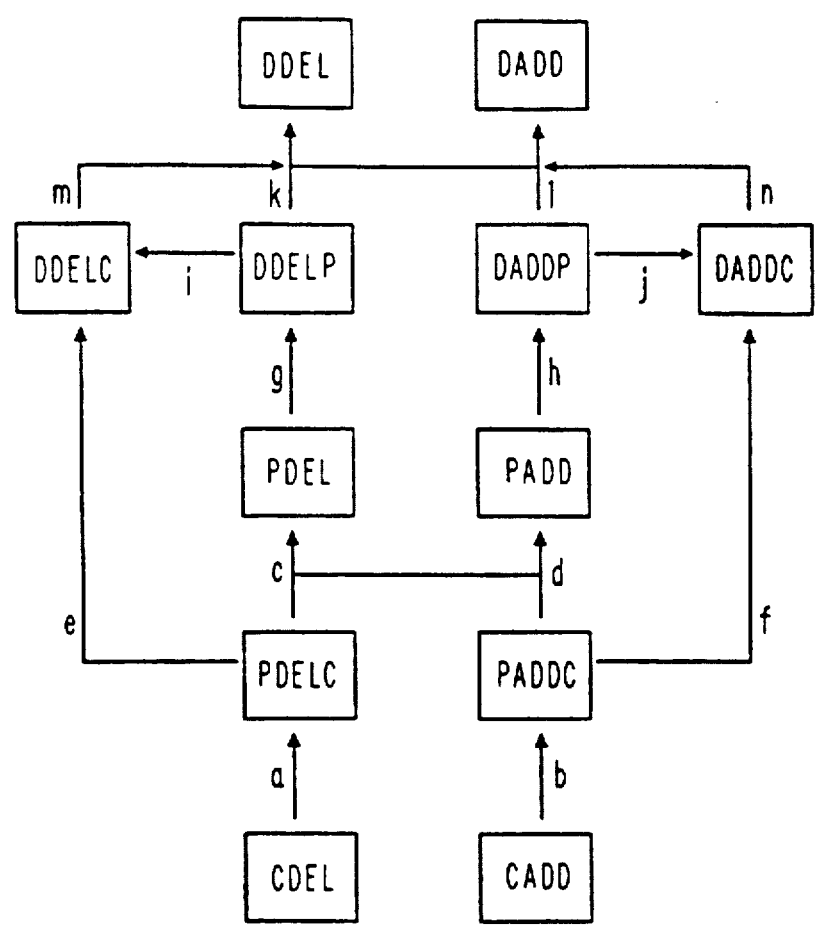
FIG. 10 is a logic flow chart illustrating the logic involved in creating follow-up CCB entries.

All rules for such follow-up entries are given in FIG. 10. In this figure, every arrow indicates a follow-up relation between two entries. When entries of different types (e.g. device/control unit) are related, this indicates an additional entry. When entries of the same type are related, it indicates a change of the entry. The letters in FIG. 10 signify the following:

a: For every CHPID (channel path) deleted, there must be entries to delete the CHPID from all control units on the CHPID.

b: For every CHPID added, there must be entries to add the CHPID to all control units on the CHPID.

c: When all CHPIDs are deleted from a control unit, the entries must be changed to delete and re-add the control unit.

d: When all channel paths are added to a control unit, the entries must be changed to delete and re-add the control unit.

e: For every channel path deleted from a control unit, there must be entries to delete the CHPID from all devices on the control unit.

f: For every CHPID added to a control unit, there must be entries to add the CHPID to all devices on the control unit.

g: For every control unit deleted, there must be entries to delete the control unit from all devices on the control unit.

h: For every control unit added, there must be entries to add the control unit to all devices on the control unit.

i: For every control unit deleted from a device, there must also be an entry to delete all channel paths from the device associated with the control unit from the device.

j: For every control unit added to a device, there must also be an entry to add all CHPIDs of the control unit to the device.

k: When all control units are deleted from a device, the entries must be changed to delete and re-add the device.

When this transition is valid, transition m must also be valid.

l: When all control units are added to a device, the entries must be changed to delete and re-add the device.

When this transition is valid, transition n must also be valid.

m: When all CHPIDs are deleted from a device, the entries must be changed to delete and re-add the device.

When this transition is valid, transition k must also be valid.

n: When all CHPIDs are added to a device, the entries must be changed to delete and re-add the device.

When this transition is valid, transition l must also be valid.

I/O Configuration Change Detection

In the MVS environment described in this embodiment of the present invention, as indicated above, Unit Control Blocks (UCBs) and the Eligible Device Table (EDT) describe the set of devices to the operating system (FIG. 1A at 104; FIG. 1B at 116). When the configuration definition of devices is dynamically added, deleted, or modified as above, MVS dynamically adds and deletes UCBs, and rebuilds the EDT. A mechanism for detecting these changes is required so that:

Programs which need to obtain information about the current I/O configuration (e.g. by scanning the set of UCBs representing the configuration) do not encounter inconsistent results when the set of UCBs representing the I/O configuration is changed.

Programs which are sensitive to the relationship between a device number and a UCB do not encounter inconsistent results when a device definition is dynamically modified from one device type to another (e.g. a device number which is initially defined as a 3350 DASD may later be defined as a 3380 DASD or as a TAPE device).

Programs which maintain lists of UCB addresses and validate a given UCB address before using it do not encounter inconsistent results when a UCB is dynamically deleted and another UCB is later dynamically added at the same storage address.

Programs sensitive to the logical grouping of devices for the purpose of allocation do not encounter inconsistent results when the logical grouping of devices is dynamically changed.

A similar mechanism is required for when a dynamic device reconfiguration (DDR) swap (known to the prior art) occurs which exchanges the contents of two UCBs. A DDR swap changes the relationship between the device number and the UCB for the devices involved in the swap.

Figure 11:
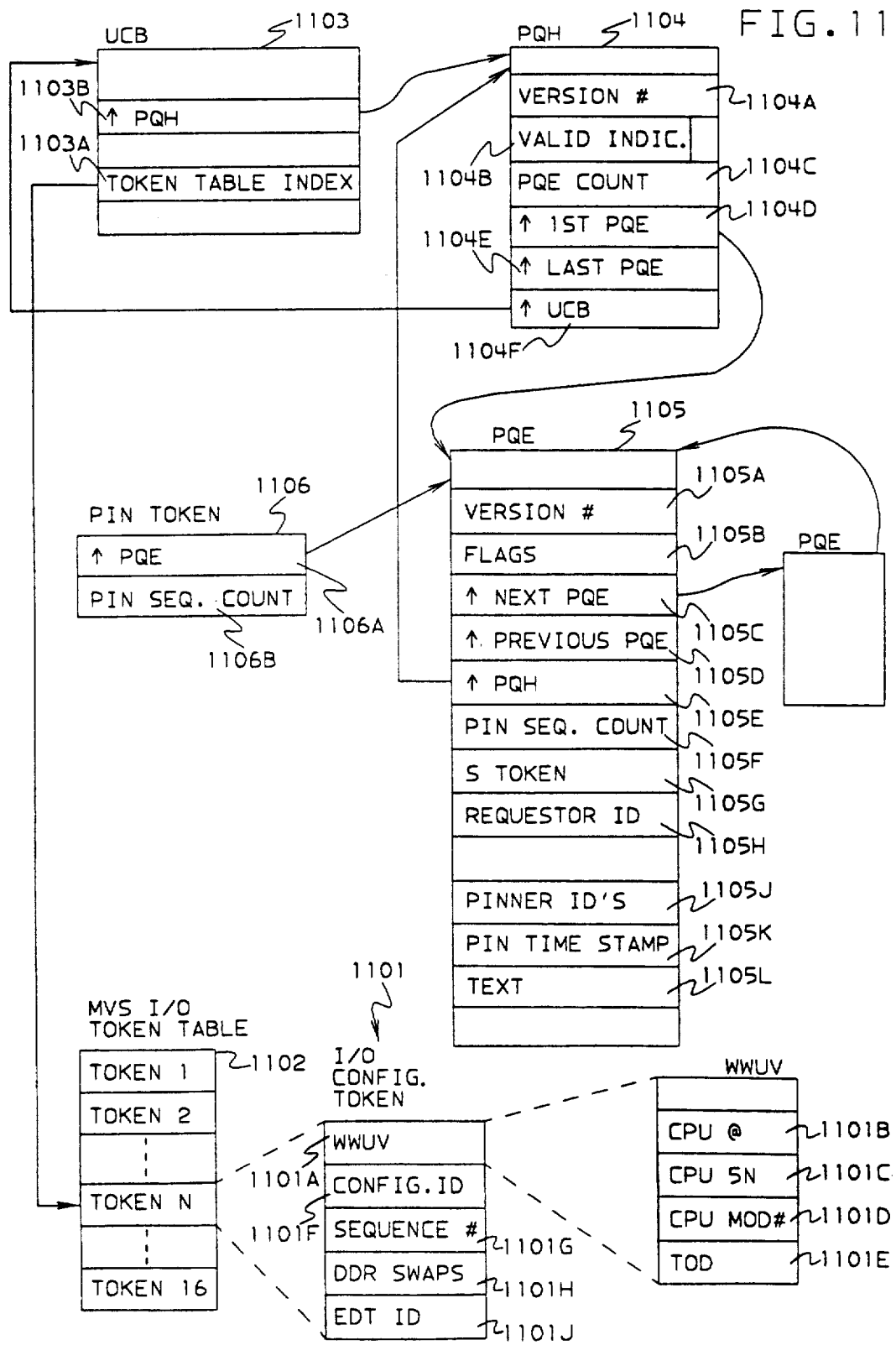
FIG. 11 is a control block diagram showing control blocks important to the present invention.

FIG. 11—describing control block structures key to the present invention—illustrates the following structures which provide for this I/O configuration change detection:

MVS I/O Configuration Token (1101)
MVS I/O Configuration Token Table (1102)
UCB Token Table Index (1103A).

MVS I/O Configuration Token—1101

The purpose of the MVS I/O Configuration Token is to uniquely identify to MVS the current state of the I/O configuration, as a whole, for the life of the IPL.

The MVS I/O Configuration Token can be used in conjunction with MVS programming services to ensure that the information that is received from the services is consistent with the configuration definition represented by the token.

Token Format

The MVS I/O Configuration Token is constructed from the following data:

IODF World Wide Unique Value (WWUV) 1101A

Note: The IODF is the I/O Definition File that contains all the I/O configuration definition data that MVS requires to initialize. This file is read by MVS during the initialization process to build the UCBs and EDT for the I/O configuration. The IODF contains a World Wide Unique Value (WWUV) that uniquely identifies the IODF.

The WWUV comprises:
CPU address 1101B
CPU serial number 1101C
CPU model number 1101D
TOD clock 1101E (at time of creation of IODF)
Operating system configuration identifier 1101F (an arbitrary 8-byte string unique to a particular configuration within an IODF)
Sequence number 1101G
Number of DDR swaps 1101H
EDT identifier 1101J The MVS I/O Configuration Token is created when the operating system completes initialization as part of the initial program load process.

The IODF WWUV is obtained from the IODF that was selected for the IPL.

The operating system configuration identifier is the one specified by the installation for IPL or the default identifier, if none was specified and only one operating system definition exists in the IODF used for IPL.

The sequence number is initialized to zero.

The number of DDR swaps is initialized to zero.

The initial EDT identifier is the one specified for IPL or the default identifier, if none was specified and only one EDT identifier exists in the IODF used for IPL.

The MVS I/O Configuration Token is updated for each of the following events:

A new I/O configuration definition is activated.
In this case, the new IODF WWUV and the new operating system configuration identifier are stored into the configuration token. Additionally, the configuration token sequence count is incremented. If the EDT is rebuilt, then the EDT identifier is updated.

A DDR swap occurs.
The DDR swap count is incremented in the configuration token.

MVS I/O Configuration Token Table 1102

The MVS I/O Configuration Token Table consists of an array of n elements (the preferred MVS implementation shows a table size of 16 entries). Each element in the array represents a valid MVS I/O configuration token.

During system initialization, the initial MVS I/O Configuration Token is stored in the first slot of the table. A new token is added to the table every time the MVS I/O configuration Token changes, that is whenever one of the following occurs:

a successful activation of a new I/O configuration definition a DDR swap which exchanges the contents of two UCBs.

If the token table becomes filled up, each successive configuration change causes the tokens in the table to be shifted up so that the oldest token is removed (i.e. the last 16 are kept). This also requires the token table index value in each UCB 1103A to be updated to point to the proper token (see "UCB Token Table Index" for a description of the UCB token table index).

UCB Token Table Index 1103A

The UCB Token Table Index is a UCB field which contains an index into the MVS I/O configuration token table. This index represents the MVS I/O configuration token at the time this UCB definition was added or last The management of the token table index values works as follows:

All UCBs built at IPL contain an index of 0.
The initial entry in the token table (which has an index of 0) contains the MVS I/O configuration token which represents the I/O configuration definition at IPL.
Whenever a dynamic configuration change or DDR swap occurs, a new MVS I/O configuration token is created and added to the token table.
Whenever a UCB is dynamically added or dynamically modified, the token table index in that UCB is set to the index of the current token in the token table.
Whenever a DDR swap occurs, the token table index values in both affected UCBs are set to the index of the current token in the token table.
If the token table becomes filled up, each successive configuration change causes the tokens in the table to be shifted so that the oldest token is removed and the last 16 are kept. This also requires updating the token table index value in each UCB to point to the proper token.

Note: If the UCB index is already zero, it is left at zero. Therefore, if 17 configuration changes occur after the MVS configuration token is retrieved, services will detect a token mismatch and indicate that the device definition has changed.

Using the MVS I/O Configuration Token

As noted, the token can be used in conjunction with MVS programming services to ensure that information that is received from the services is consistent with the input token.

For a given dynamic configuration change, only the affected portions of the token will be updated. The programming services will ensure consistency with respect to the data being returned. For example, if a dynamic configuration change only updates the EDT, programming services which return UCB information will not indicate that anything is inconsistent.

The token can be used to detect the following four cases:
 the set of UCBs has been dynamically changed
 the definition of a particular device has been dynamically changed
 the EDT has been dynamically rebuilt.
 a device was involved in a DDR swap.

The MVS I/O configuration token concept allows a program to maintain a list of UCB addresses or device numbers without keeping all UCBs in the list pinned, provided that a configuration token is kept with the list. The configuration token will be used by the system service to ensure that the UCB definition is consistent with its definition represented by the configuration token. Specifically, the service will ensure that the device definition for the input device number or UCB address has not changed since the point in time represented by the input configuration token. If the token index in the UCB represents a more recent configuration token than the token received as input, then the service will indicate that the device definition is inconsistent with the input token (via a return code from the service).

Note: Since in the MVS implementation only the last 16 token are retained, it is possible that a program could retrieve the configuration token, 17 dynamic I/O configuration changes occur, and then the program detects a token mismatch even though the specific device definition has not changed.

The configuration token allows programs to detect the following cases which otherwise would not be detected:
 the configuration definition for a particular device number is changed (because the service will validate both that a UCB exists for the device number and that the device definition is consistent with the token)
 a UCB is deleted but a different UCB is later added at the same storage address (because the service will validate both that the UCB address represents a valid UCB and that the device definition is consistent with the token)

Device Pinning

As noted above, this invention provides a PIN mechanism for data integrity purposes, so that a device definition in-use by the system can be marked as ineligible for deletion. This PIN mechanism provides for:
 Device pinning
 Allowing an authorized program to request that a UCB (and its associated device related data structures) be marked ineligible for deletion, and
 Allowing an authorized program to request that all paths to a device be marked ineligible for deletion. This is more granular than device pinning. The separation of path pinning from device pinning allows paths to be dynamically deleted from pinned devices unless the paths are also pinned.

The critical data structures for the PIN mechanism are shown in FIG. 11. They include:

Pin Queue Header 1104

The Pin Queue Header is anchored from the UCB (1103B) and is composed of the following fields:
 control block version number 1104A
 flag indicating when the count of PQEs is not valid 1104B
 count of PQEs on PQE chain 1104C
 address of first PQE on PQE chain 1104D
 address of last PQE on PQE chain 1104E
 address of UCB 1104F.

Pin Queue Element 1105

The Pin Queue Elements are anchored from the PQH (via a double headed, double threaded queue) and are composed of the following fields:
 control block version number 1105A
 flags 1105B
  An indicator if the request is to last beyond address space termination.
  An indicator if the pin was done for a task mode caller.
  An indicator if the request was to pin all the paths to the device.
  An indicator that the request was done during NIP.
 address of first next PQE 1105C
 address of previous PQE 1105D
 address of PQH 1105E
 Pin sequence count 1105F
 STOKEN for current primary address space 1105G (indicating the address space that did the pinning)
 Component ID of requestor 1105H
 PINNER ID 1105J ASID of SRB mode pinner; Address of job step TCB for task mode pinner
 time and date of pin 1105K
 pin text 1105L

PIN TOKEN 1106

Figure 12A:
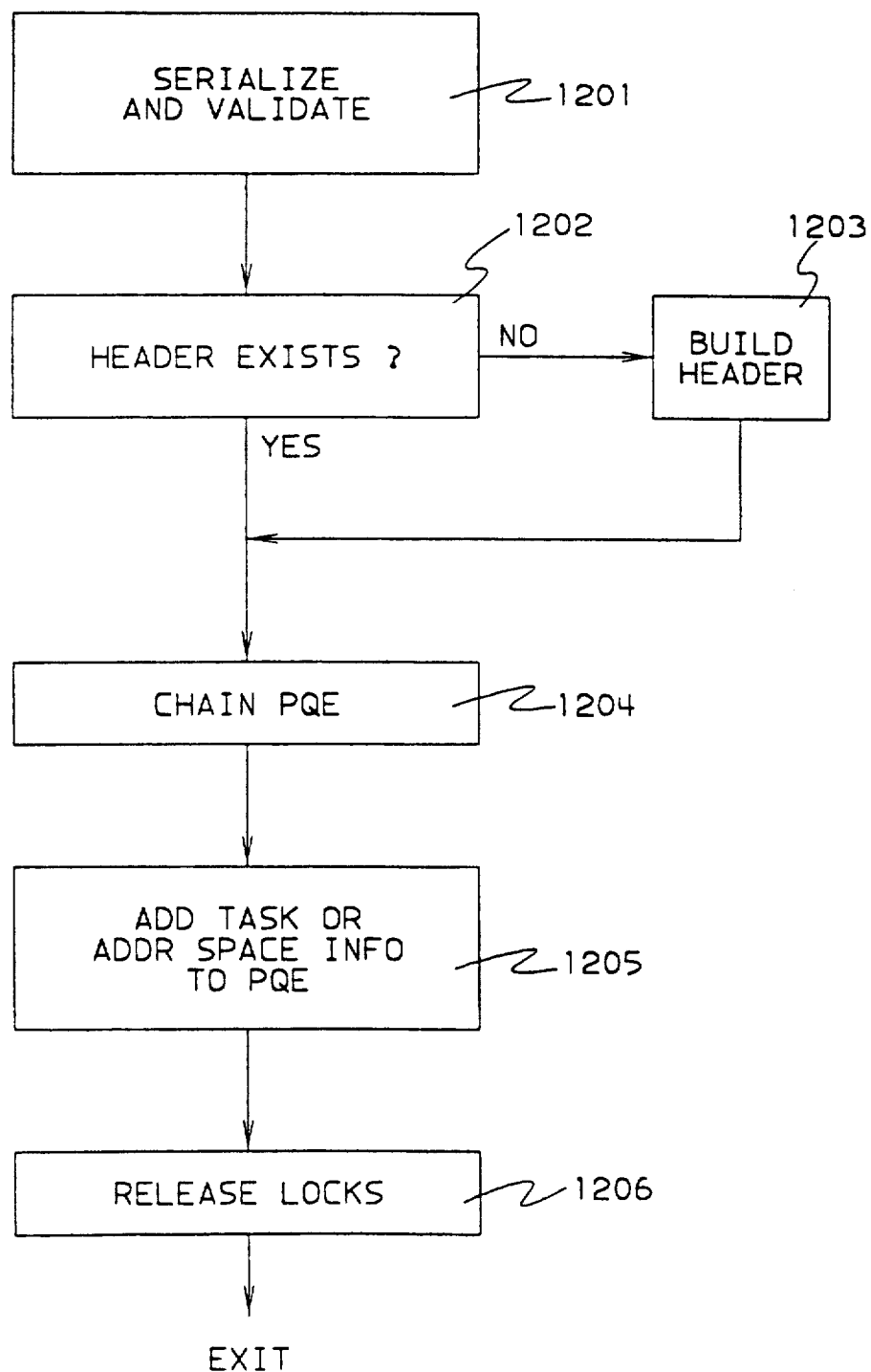
FIG. 12A is a flowchart showing the PIN function.

Pinners of devices are returned an 8 byte pin token. The pin token provides two functions:
 uniquely identifies the PQE that is to be removed
 provides a fast look up for the PQE that is to be deleted The pin token has the following format:
 PQE address 1106A
 pin sequence count 1106B The PIN Service function is illustrated in FIG. 12A. At 1201, necessary serialization and validation is performed. (i.e., a lock (the ULUT lock) is obtained to serialize against dynamic configuration changes; and the UCB is locked to serialize the PIN queue. The UCB address is validated (before locking the UCB) by extracting the device number, performing a UCB look-up and ensuring that the resulting UCB address matches the input UCB address.) If no PQH exists 1202, one is built 1203 and chained off the UCB (see FIG. 11 at 1104). The pin sequence count (a counter to guarantee uniqueness of the PIN token) is updated (FIG. 11 at 1105F) and the PQE is added to the chain 1204 (See FIG. 11 at 1105). Next, task or address space information is added to the PQE 1205 to associate task mode pins to job step task TCB and to associated SRB mode pins to primary address space (see FIG. 11 at 1105J). Finally, the locks are released 1206 and a pin token is constructed and returned.

Figure 12B:
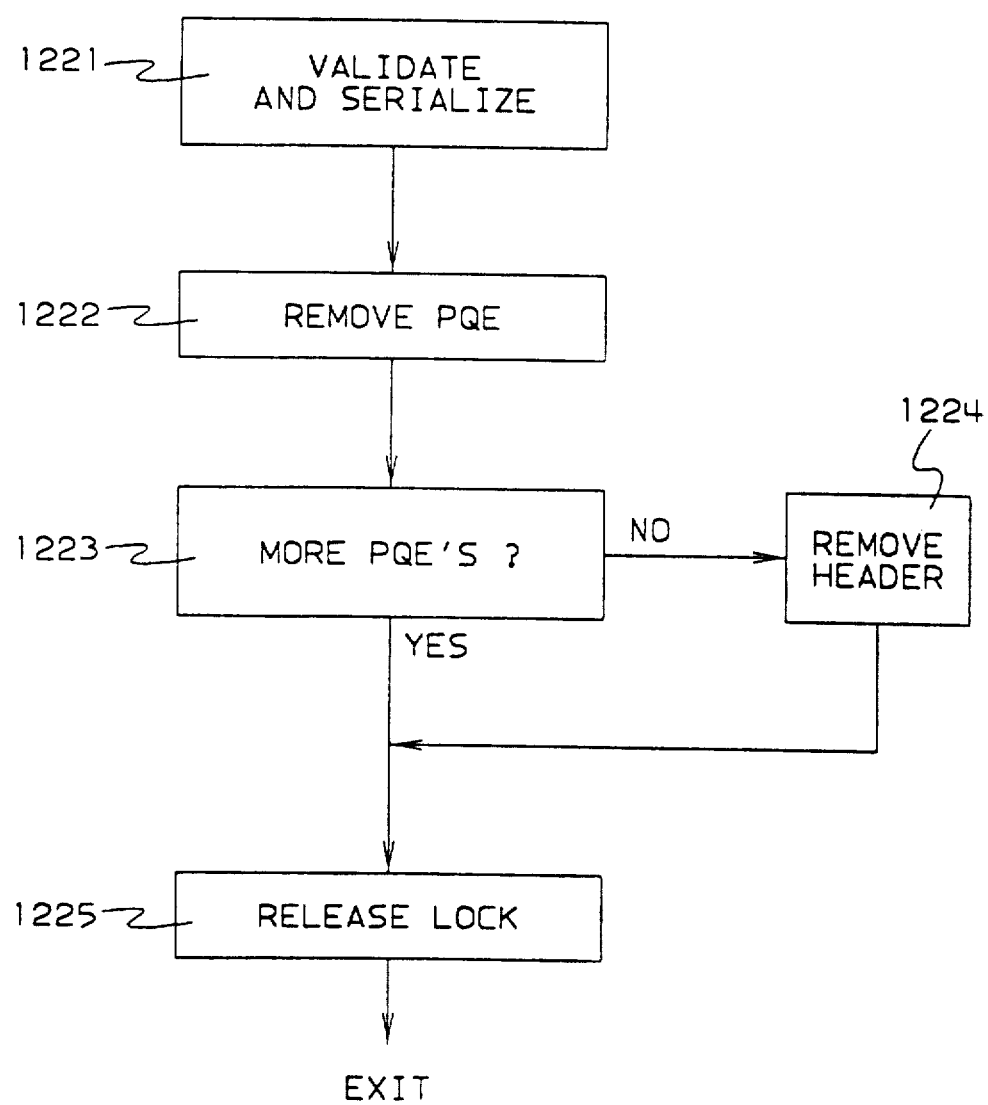
FIG. 12B is a flowchart showing the UNPIN function.

The UNPIN function is illustrated in FIG. 12B. At 1221 the input PIN token (see FIG. 11 at 1106) is validated (by ensuring that the PQE address is a valid PQE and that the PIN sequence count in the PIN token matches the sequence count in the PQE (see FIG. 11 at 1105F)) and the UCB lock is obtained to serialize the PIN queue. The PQE is removed from the PQE chain 1222 and if no PQEs remain on the chain 1223, the PQH is removed (FIG. 11 at 1103B, 1104). Finally, the UCB lock is released 1225.

Group Serialization

As noted above, the other major piece of the serialization technique is a group serialization mechanism to handle serialization requests for groups of devices while the group definitions are permitted to change.

Figure 13A:
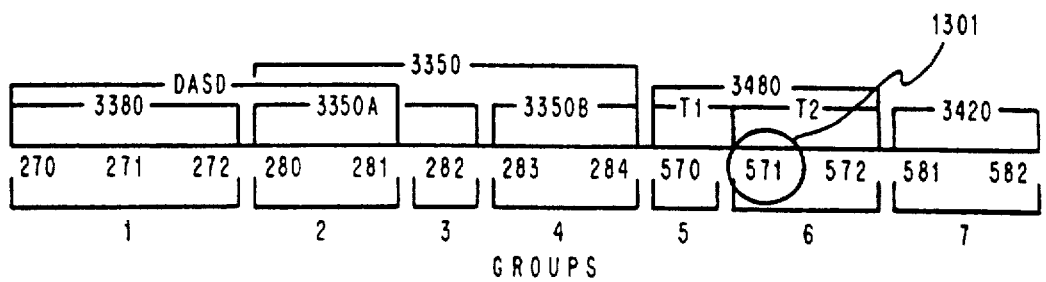
FIG. 13A is an illustration of a first set of allocation groups according to the prior art.

It is known in the prior art that users may supply unit names, or generic names, in requesting devices to be allocated to them. The operating system "allocation" function then translates these requests to requests for a specific device number (or set of device numbers). IBM's MVS/ESA Operating System is known to divide groups of device numbers up into "allocation groups" to accomplish this function, where an allocation group is defined as a set of devices that are in the same generic device type, and defined to exactly the same set of unit names. FIG. 13A illustrates seven such allocation group definitions, and FIG. 13B illustrates seven allocation groups in the same system after device 571 (formerly in group 6—FIG. 13A at 1301) has been redefined from unit name T2, to unit name T1 (and so in group 5—FIG. 13B at 1302).

It is further known in the prior art to include in the EDT "group masks" representing the allocation group(s) contained in a particular unit name. FIG. 3C illustrates the group masks corresponding to the definitions in FIG. 13A. For example, unit 3350 is shown (1303) as having three bits "on" to indicate that this unit name spans allocation groups 2, 3 and 4. These group masks have been used in the past in conjunction with a "global mask" in common storage to serialize access to particular groups. In the example illustrated in FIG. 13C, the global mask (1304) has a bit on indicating that group 5 is locked—so that a user attempting to allocate any unit name spanning group 5 (3480 or T1 in the example of FIG. 13C) would have to wait.

Figure 13B:
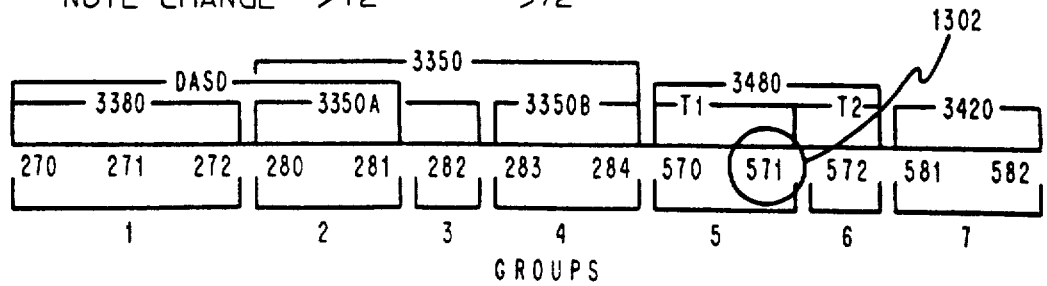
FIG. 13B is an illustration of a second set of allocation groups according to the prior art.

Since the present invention provides for a dynamically modifiable I/O configuration ("reconfiguration"), it is now possible for a device number to move between allocation groups—as device 71 has between FIG. 13A and 13B. Thus, without further accommodation, locking group 5 before the reconfiguration will not lock all devices part of the group after the reconfiguration (in particular, device 571).

Figure 14:
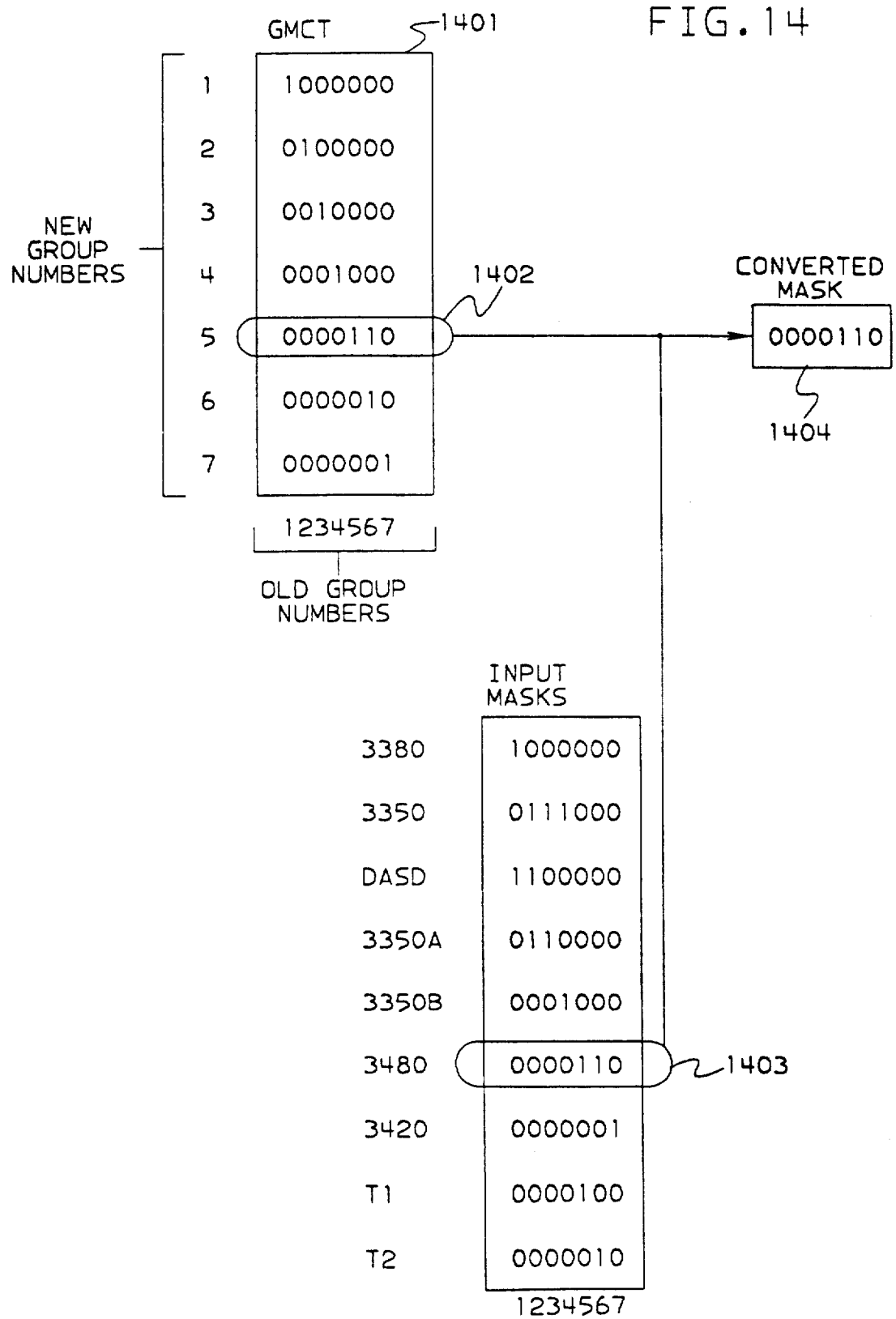
FIG. 14 is an illustration of the use of input masks on a GMCT to create a converted mask.

To solve this problem, the preferred embodiment of the present invention includes a "Group Mask Conversion Table" (GMCT) as part of the EDT, as illustrated in FIG. 14 at 1401. This table comprises a row corresponding to each allocation group, and is used to create "converted" group masks from the input group masks in an EDT during a reconfiguration (a "new EDT"). Using the reconfiguration example of FIGS. 13A-13C, the corresponding GMCT (FIG. 14 at 1401) is constructed as follows: each row in the GMCT corresponds to an allocation group in the new EDT; each column corresponds to an allocation group number in the old EDT. A bit is set in row X column Y if a device in (new) allocation group X occurs in (old) allocation group Y. Thus row 1402 (for new allocation group 5—see FIG. 13B) has bits 5 and 6 (see FIG. 13A) since devices 570 and 571 (new allocation group 5) span old allocation groups 5 (device 570) and 6 (devices 571 and 572).

The GMCT is then used in combination with an input mask (representing a particular set of allocation groups to be serialized) to create a "converted mask" as follows: each bit set in an input mask is used to select a row from the GMCT, and that row is logically ORed into the converted mask being built. For example, for unit 3480 the input mask is illustrated at 1403 in FIG. 14. Using this input mask results in logically ORing rows 5 and 6 of GMCT 1401, producing converted mask 1404.

Figure 15:
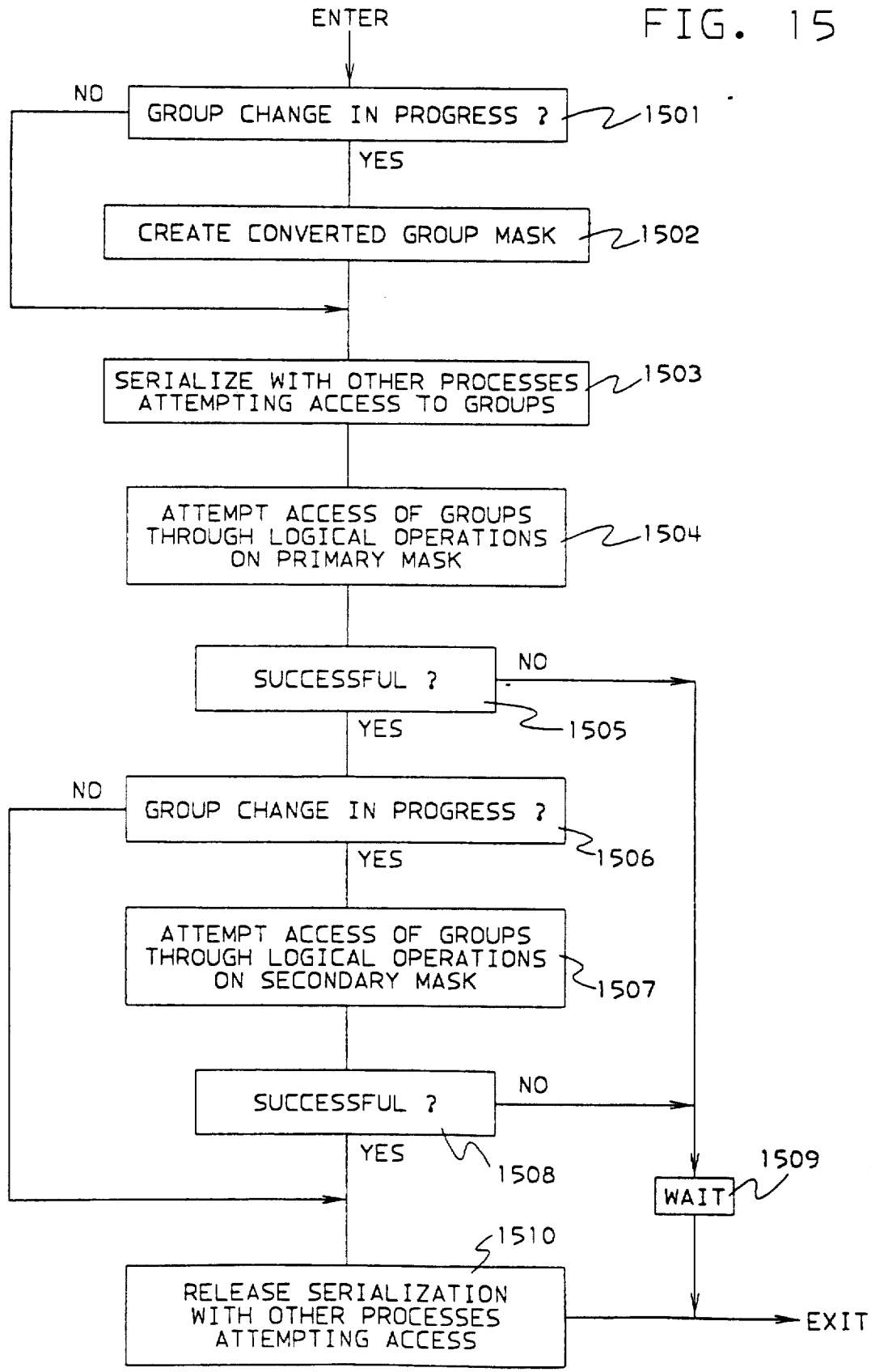
FIG. 15(is a flowchart showing control flow for obtaining exclusive access to an allocation group.

FIG. 15 illustrates how these concepts are tied together to obtain exclusive access to an allocation group. At 1501, a test is made whether a group change is in progress (a change is in progress if users of the old EDT exist concurrent with users of the new EDT. This is indicated by an indication in the new EDT). If so, a converted group mask is created 1502 by the method just illustrated, using the GMCT and the input group mask. Appropriate serializing locks are then obtained 1503 to serialize with other processes requesting access to groups. Using the input and the converted masks, attempts are made (1504, 1507) to obtain access to the required groups—the input mask is used against the (primary) global mask associated with the new EDT (representing "locked" groups), and the converted mask is used against the (secondary) global mask associated with the old EDT. (To illustrate: the global mask in FIG. 13 at 1304 shows that group 5 is locked, all other groups are not; attempting to allocate "3350" (1303) would succeed since groups 2, 3 and 4 are currently unlocked ("anding" mask 1303 with 1304 results in zeroes); subsequently, global mask 1304 would be "ORed" with mask 1303 to turn these 3 bits on, indicating that these three groups are now locked). Failure of the ANDing attempt would result in a conventional "wait" 1509 for a later "post" of the waiting process (first freeing up any primary groups already held). Finally, serializing locks are released, and the routine is exited.

Figure 16:
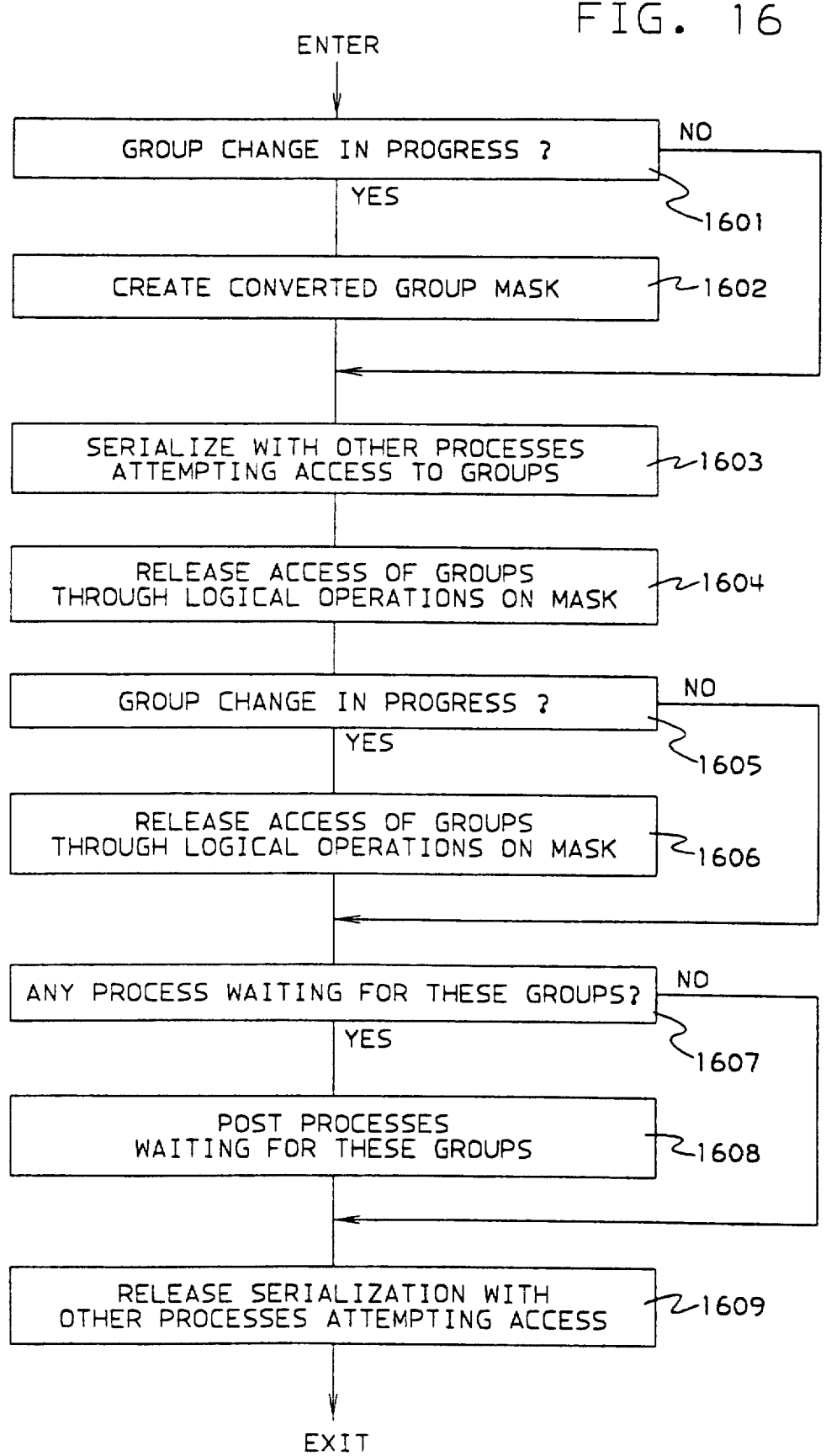
FIG. 16 is a flowchart showing control flow for releasing exclusive access to an allocation group.

FIG. 16 illustrates control flow required to release exclusive access to devices in a group. The logic closely parallels that described to obtain the access—tests whether a group change is still in progress (1601, 1605), creation of a converted mask (1602), and locking and unlocking (1603, 1609). The significant differences are that access to the groups is unconditionally released by Exclusive ORing the input mask with the primary global mask (1604) and the converted mask with the secondary global mask (1606); and any waiting processes are now "posted" conventionally (1608) before exiting.

FIG. 18 shows the format of a hardware token which is located in each PRR in the IODF for identifying the associated processor I/O configuration definition (see Appendix B). The fields in the hardware token are as follows:

Processor Name: Words 0 and 1 contain the processor name of the IODF processor I/O configuration definition that the hardware token identifies.

World wide unique value (WWUV): Words 2-5 contain a token which identifies the processor I/O configuration definition. The HCD sets this token when the processor I/O configuration definition is created. The token consists of the CPU address, CPU serial number, and CPU model number. Words 4 and 5 contain the time stamp from the Time Of Day clock.

Date: Words 8 and 9 contain the EBCDIC date when the processor I/O configuration definition was created.

Time: Words 10 and 11 contain the EBCDIC time when the processor I/O configuration definition was created.

Configuration Description: Words 12-15 contain an EBCDIC configuration description which the installation can assign to help correlate processor I/O configuration definitions.

As will be explained, at IPL time and activate time, configuration information, including the hardware token in the HSA of the channel subsystem, is fetched by a store configuration information channel subsystem call (CHSC) instruction. The term "I/O-configuration definition" is used herein to mean the I/O-configuration definition that is used by the channel subsystem to control I/O operations.

Generally the channel subsystem also contains a current-configuration hardware token which is associated with this processor I/O configuration definition. If the channel subsystem is in configuration mode, it contains an additional hardware token, the target hardware token, which is associated with the processor I/O configuration definition which will result from the successful completion of a sequence of I/O-configuration-change commands. Configuration mode is a serialization mechanism that prevents concurrent updates of the HSA for dynamic changes.

The term "I/O-configuration establishment (ICE)" is used herein to designate the process by which a processor I/O configuration definition is established in the channel subsystem. The operator options and procedures for performing an ICE are model dependent. Likewise the format, content and location of information required for ICE are model dependent. Generally an ICE is included in the IML and POR procedures.

The execution of the store-configuration-information command does not change any information contained in the channel subsystem.

The command-request block for store configuration information has the format shown in FIG. 19, wherein:

L1: Bytes 0-1 of word 0 contain the value 0010 hex, specifying a command-request-block length of 16 bytes.

Command Code: Bytes 2-3 of word 0 contain the value 0012 hex, specifying the store-configuration-information command.

Reserved: Words 1-3 are reserved and must contain zeros.

The command-response block for the store-configuration-information command has the format shown in FIG. 20, wherein:

L2: Bytes 0-1 of word 0 specify the length in bytes of the command-response block. The length depends upon the response code that is stored as a result of the attempt to execute the store-configuration-information command.

If a response code of 0001 hex is stored in the response-code field, L2 specifies a length of 312 bytes.

If a response code other than 0001 hex is stored in the response-code field, L2 specifies a length of eight bytes for the command-response block.

Response Code: Bytes 2-3 of word 0 contain a 16-bit unsigned binary integer that describes the results of the attempt to execute the store-configuration-information command. The valid response codes are 0001, 0003, and 0004 hex.

When the response-code field contains 0001 hex, the channel subsystem has successfully stored I/O-configuration definition information in the command-response block.

Flags: Byte 1 of word 2 specifies conditions that exist in the channel subsystem. The meaning of bits 0-7 is as follows:

| Bits | Meaning |
| --- | --- |
| 0 | Configuration Mode: When one, bit 0 specifies that the channel subsystem is in configuration mode. When zero, bit 0 specifies that the channel subsystem is not in configuration mode. Configuration mode can be set by the change-configuration-mode command. |
| 1 | Configuration Valid: When one, bit 1 specifies that the I/O-configuration definition is valid. When zero, bit 1 specifies that the I/O-configuration definition is not valid. The I/O-configuration-definition is set valid at ICE and can be set valid or invalid by the change-configuration-mode command. |
| 2 | Configuration Changed: When one, bit 2 specifies that the I/O-configuration definition has been changed since ICE. When zero, bit 2 specifies that the I/O-configuration definition has not been changed since ICE. The I/O-configuration definition is changed by the successful execution of change-channel-path-configuration, change-control-unit-configuration, or change-I/O-device-configuration commands. |
| 3 | Token Present: When one, bit 3 specifies that the processor I/O configuration definition in the channel subsystem includes a current hardware token (see FIG. 20) which is described by the current-configuration-token field. When zero, bit 3 specifies that the processor I/O configuration definition in the channel subsystem does not include a current-configuration token and the current-configuration-token field has no meaning. Generally, a current-configuration token is included with the processor I/O configuration definition that is established at ICE. However, it is possible that the processor I/O configuration definition that is established at ICE does not have a current-configuration token. |
| 4 | Program-Parameter Valid (PPV): When one, bit 4 specifies that the processor I/O configuration definition in the channel subsystem includes a valid program parameter which is described by the program-parameter field (to be discussed in connection with FIG. 25). When zero, bit 4 specifies that the processor I/O configuration definition in the channel subsystem does not include a valid program parameter and the program-parameter field has no meaning. The program-parameter is set valid by the successful execution of change-channel-path-configuration, change-control-unit-configuration, or change-I/O-device-configuration commands. The setting of the program parameter is synchronized with the successful execution of the change-channel-path-configuration, change-control-unit-configuration, or change-I/O-device- |

-continued

| Bits | Meaning |
|---|---|
|  | configuration commands. The program-parameter can be set invalid by the change-configuration-mode command. |
| 5-7 | Reserved. |

Reserved: Word 1, bytes 0 and 2 of word 2, words 10-11, word 44, and bytes 2 and 3 of word 45 are reserved and contain zeros.

Partition Number (PN): If the machine is operating in LPAR mode and the command-response block contains partition names, byte 3 of word 2 contains the number of the partition from which this command is being executed. If the machine is not operating in LPAR mode or the command-response block does not contain partition names, byte 3 of word 2 contains zeros.

Program Parameter: If the PPV flag is one, words 3-6 contain the I/O-configuration-definition program parameter. If the PPV flag is zero, words 3-6 have no meaning.

The I/O-configuration-definition program parameter is presented to the channel subsystem by the change-channel-path-configuration, change-control-unit-configuration, and change-I/O-device-configuration commands.

Remaining Channel Subsystem Resources: Modification of the I/O-configuration definition may require the channel subsystem to use additional internal storage resources. When these resources become exhausted, the channel subsystem may be unable to make further processor I/O configuration changes. The number of remaining subchannel elements, control-unit elements and shared-cluster elements are measures of the amount of remaining storage resources.

Remaining Subchannel Elements: Word 7 contains a 32 bit unsigned binary integer that specifies the number of remaining subchannel elements that are available for configuration change.

Remaining Control-Unit Elements: Word 8 contains a 32 bit unsigned binary integer that specifies the number of remaining control-unit elements that are available for configuration change.

Remaining Shared-Cluster Elements: Word 9 contains a 32 bit unsigned binary integer that specifies the number of remaining shared-device-cluster (also referred to herein as LCU) elements that are available for configuration change.

Current-Configuration Token: If the token-present flag is one, words 12-27 contain the current-configuration token. If the token-present flag is zero, words 12-27 have no meaning. The current-configuration token is a 64-byte binary value which resides in the channel subsystem as a portion of the processor I/O configuration definition and is used to identify that processor I/O configuration definition.

The current-configuration token may be set by the change-configuration-mode command. This command is discussed in the previously mentioned R. Cwiakala et al. patent application Ser. No. 693,997.

Target-Configuration Token: Words 28-43 contain the target-configuration token. If the processor I/O configuration definition is valid, the target-configuration token is a copy of the current-configuration token. If the channel subsystem is in configuration mode, the target-configuration token identifies the processor I/O configuration that will result from the execution of the sequence of change-configuration commands in progress. If the channel subsystem is not in configuration mode, and the processor I/O configuration definition is invalid, the target-configuration token identifies the processor I/O configuration that would have resulted had the sequence of change-configuration commands completed.

The target-configuration token may be set by the change-configuration-mode command.

Partition-Names Valid: Bytes 0-1 of word 45 specify which of the eight-byte entries in the partition-names field contain a valid partition name. Bits 0-15 of the partition-names-valid field correspond from left to right, with each of the 16 8-byte entries in the partition-names field.

Partition Names: Beginning with byte 0 of word 46, each of the 16 contiguous eight-byte fields can contain an eight-character (EBCDIC) partition name. The eight-byte fields that contain valid partition names are determined by bits that are one in the partition-names-valid field.

A special condition exists if a response code other than 0001 hex is stored in the command-response block. The special conditions for the store-configuration-information command are described below.

'0003': Response code 0003 hex is presented for the following reasons:
   The L1 field contains a value other than 0010 hex.
   Words 1-3 are not all zeros.

'0004': Response code 0004 hex is presented if the command is not supported by the model.

Generally, I/O-configuration-definition validity is used as follows. The process of changing the processor I/O configuration definition generally requires the execution of a sequence of change-configuration commands. While this sequence is being executed, the processor is in configuration mode and the processor I/O configuration definition is set invalid. If the sequence is completed successfully, a new configuration token, representing the new configuration, is set into the channel subsystem and the processor I/O configuration definition is set valid and the processor exits configuration mode. If the sequence cannot be completed successfully, the program attempts to back out the changes already made. If the program successfully backs out the changes, the old current-configuration token is set into the channel subsystem and the processor I/O configuration definition is set valid. If the program is unable to either complete the sequence, or back out the changes already made, the processor I/O configuration definition remains invalid, and the target-configuration token identifies the intended configuration definition.

When the machine is not operating in LPAR mode, the remaining-subchannel-elements field specifies the number of devices that can be added to the I/O configuration definition. Similarly, the remaining-control-unit-elements field specifies the number of control units that can be added to the I/O configuration definition. The remaining-shared-cluster-elements field specifies the number of additional shared-device-clusters that can be supported in the I/O-configuration definition.

When the machine is operating in LPAR mode, the remaining-control-unit-elements field still specifies the number of control units that can be added to the processor I/O configuration definition. However, the remaining-subchannel-elements field and remaining-shared-cluster-elements field are not so simply related to configuration changes. When a machine is operating in LPAR mode, the number of subchannel elements required to support each shared-device cluster is equal to the number of devices belonging to that shared-device cluster times the maximum number of partitions that could access that shared-device cluster. The maximum number of partitions that could access a shared-device cluster is equal to the number of reconfigurable channel paths connected to that shared-device cluster plus the number of unique partition numbers associated with dedicated paths to that shared-device cluster. The number of shared-device-cluster elements required to support each shared-device cluster is equal to the maximum number of partitions that could access that shared-device cluster.

In the course of executing a sequence of configuration-change commands, the number of shared-device clusters may vary as shared-device clusters are generated, split, or joined. The number of remaining-shared-device-cluster elements required to support a sequence of configuration changes may be somewhat larger than the difference between the resulting number of shared-device-cluster elements and the initial number of shared-device-cluster elements.

If a program initiates a sequence of configuration changes and subsequently backs out those changes, the configuration-changed flag will remain set even though the processor I/O configuration definition and the current-configuration token are the same as they were before the changes were attempted.

If the machine is operating in LPAR mode, the channel subsystem is in configuration mode, and the partition from which this command is being executed is the same as the partition from which configuration mode was initiated, the contents of the partition-names-valid field specify which of the eight-byte entries in the partition-names field contain a valid partition name. Otherwise, the partition-names-valid field contains zeros and the partition-name field has no meaning.

The contents of the program-parameter-valid field generally have a value of one. There are only two occasions when the contents of this field are zero:

a During the interval between ICE and the first successful execution of a change-configuration command ( change channel-path configuration, change control-unit configuration, or change I/O-device configuration).

b. During the interval between the successful completion of one set of configuration changes and the next successful execution of a change-configuration command. (Successful completion is signified by the termination of configuration mode with the contents of the V field in the command-request block equal to one.)

Words 10-11 of the command-response block are reserved to provide additional information about space requirements in the channel subsystem.

If the system is operating in LPAR mode and the channel subsystem is in configuration mode, the channel subsystem will place the number of the partition from which configuration mode was initiated into byte 3 of word 2 of the command-response block. If the partition from which this command is executed is different from the partition from which configuration mode was initiated, the LPAR hypervisor will set byte 3 of word 2 to zero.

If the system is operating in LPAR mode, and the channel subsystem is in configuration mode, the channel subsystem will include partition-names and partition-names-valid information in the command-response block. The LPAR hypervisor will then determine if the partition from which this command is executed is the same as the partition from which configuration mode was initiated. If it is, the partition-names and partition-names-valid information will remain in the command-response block. Otherwise, the LPAR hypervisor will set the partition-names-valid field in the command-response block to zeros before presenting it to the guest.

If the system is not operating in LPAR mode or the channel subsystem is not in configuration mode, the partition names are not presented to the LPAR hypervisor or guest.

Even if the system is operating in LPAR mode, there is only one set of values for:
configuration mode
configuration valid
configuration changed
token present
program parameter
current-configuration token
target-configuration token
partition names For example, if a partition issues a store-configuration-information command after a different partition had entered configuration mode, the contents of the configuration-mode field in the command-request block is one, and the contents of the current-configuration token is that specified by the partition which had initiated configuration mode.

FIG. 21 is an illustration of multiple IODFs. In the illustrated embodiment, there may be a maximum of 256 IODFs. Each IODF has a suffix which is a 2-digit hexidecimal number from OO to FF which is a part of the IODF name. Although, in FIG. 21, consecutive numbers are shown, it will be understood that there is no requirement that consecutive numbers be used in the IODF suffix. Each of the IODFs contains one of the structures shown in FIG. 17A, and may contain multiple structures shown in FIG. 17B. Each of the IODFs may contain multiple PRRs, one for each processor I/O configuration definition in the IODF. As previously mentioned, each PRR includes a hardware token for identifying the processor I/O configuration definition represented by the PRR. Each FIG. 17B structure includes an OSR record which includes an operating system configuration identifier for identifying the operating system I/O configuration definition of its FIG. 17B structure.

Figure 22:
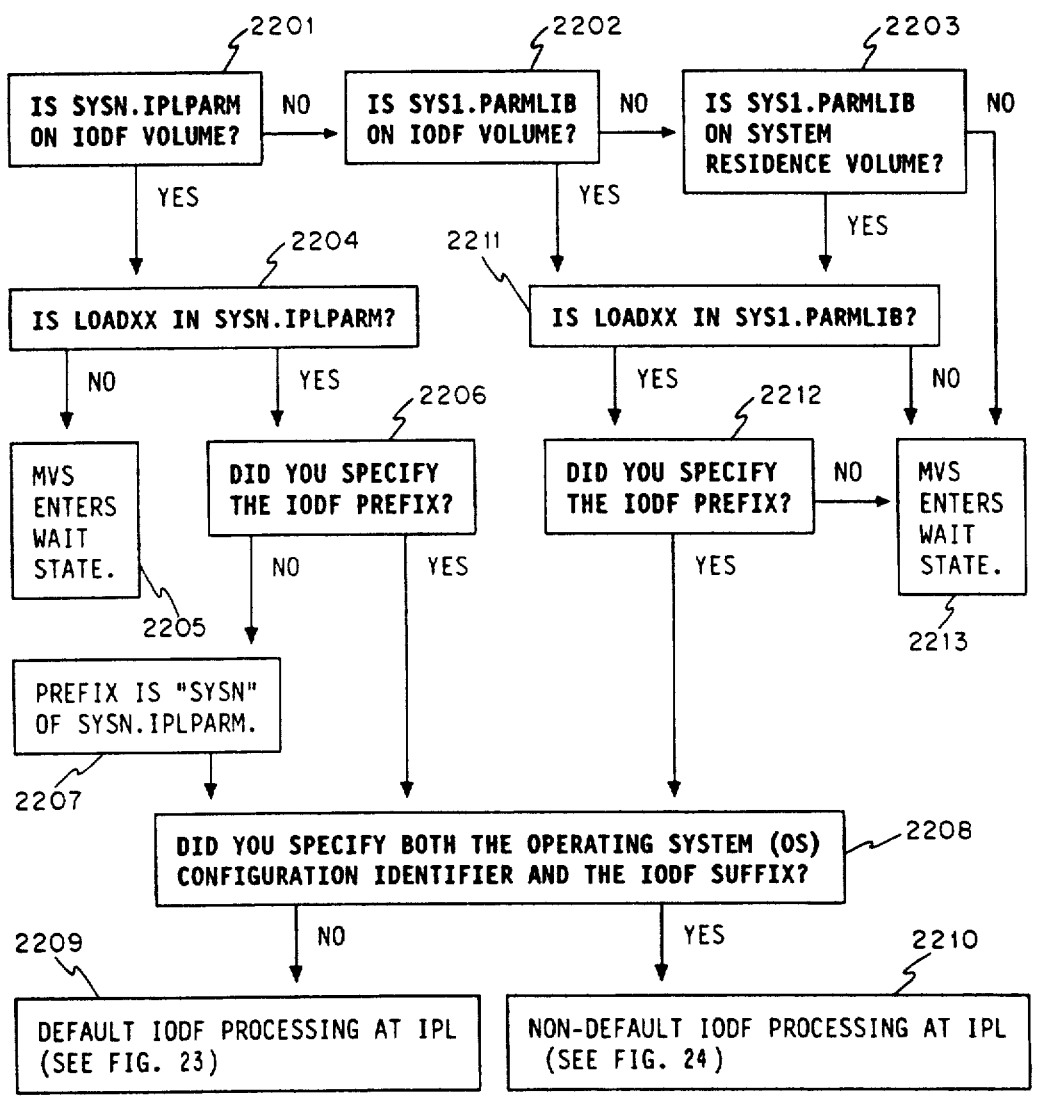
FIG. 22 is a flowchart showing the processing of an IODF at IPL time.

FIG. 22 is a flowchart of IODF processing at IPL time. At IPL time, a check is made to see if the hardware configuration designation in the HSA corresponds to or is synchronized with the software configuration designation as indicated by specified or defaulted input values in LOADxx, to be explained. There are two processes used to determine this synchronism, default processing and non-default processing. In default processing, MVS fetches the hardware token in the HSA, and searches for that token in the IODFs. If the fetched hardware token is found, that IODF is used to establish the software configuration definition. If non-default processing is used, the user specifies the IODF to be used. As will be explained, MVS searches only the specified IODF to find the hardware token fetched from the HSA.

Returning to FIG. 22, at 2201 a check is made to determine if the SYSn.IPLPARM is on the IODF volume. As in the prior art, the SYSn.IPLPARM is a data set which contains MVS IPL customization information, including the IODF names. If not, checks are made at 2202 and 2203 to determine if the SYS1.PARMLIB is on the IODF volume or on the system residence volume. As in the prior art, the SYS1.PARMLIB is a data set with MVS customization information. If the result is yes at 2201, a check is made at 2204 to see if LOADxx is in SYSn.IPLPARM. LOADxx identifies the member of SYSn.IPLPARM or SYS1.PARMLIB to identify the I/O configuration definition to be selected at IPL. If the result at 2204 is no, MVS enters the wait state at 2205. If the result at 2204 is yes, a check is made at 2206 to determine if the user specified the IODF prefix. The IODF prefix is the high-level qualifier of the IODF data set name. You need to specify an IODF prefix only if LOADxx is in SYS1.PARMLIB. If the check at 2206 is no, the "SYSn" from SYSn.IPLPARM is used at 2207 as the prefix of the IODF.

If the result at 2206 is yes, or if 2207 is used, a check is made at 2208 to determine if both the operating system configuration identifier and the IODF suffix are specified. If no, default processing is used at 2209 (see FIG. 23), and if yes, non-default processing is used at 2210 (see FIG. 24).

If the result at either 2202 or 2203 is yes, a check is made at 2211 to see if LOADxx is in SYS1.PARMLIB. If yes, a check is made at 2212 to determine if the IODF prefix is specified. If the result at 2203, 2211 or 2212 is no, MVS enters a wait state at 2213. If the result at 2212 is yes, MVS goes to 2208 to determine if default processing or non-default processing is to be used.

Figure 23:
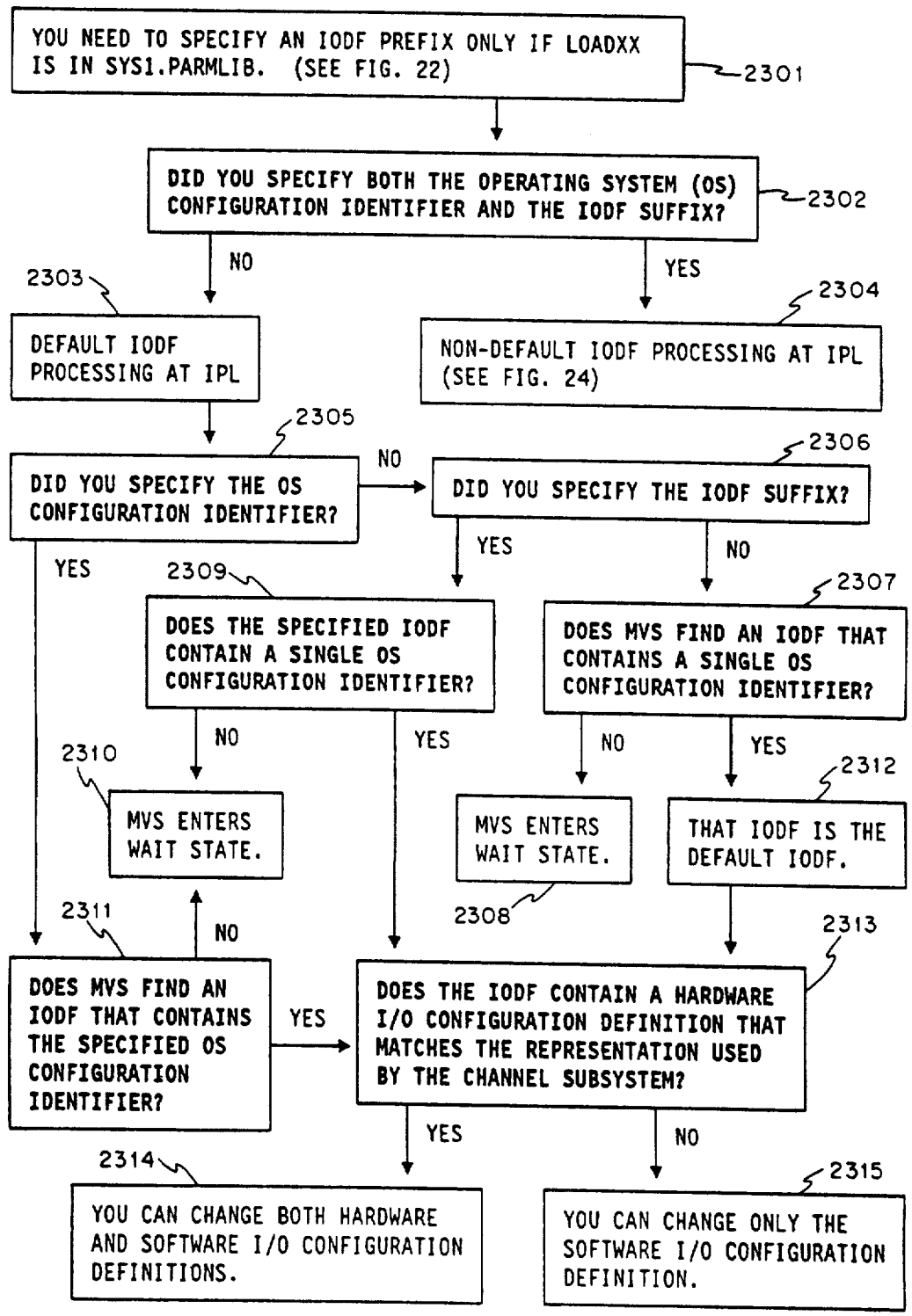
FIG. 23 is a flowchart of default IODF processing at IPL.

FIG. 23 is a flow chart of default processing at IPL. Blocks 2301, 2302, 2303 and 2304 are a summary of the flow chart of FIG. 22. A check is made at 2305 to see if an operating system (OS) configuration identifier is specified. If no, a check is made at 2306 to determine if the IODF suffix is specified. If the result at 2306 is no, MVS searches at 2307 for an IODF that contains a single OS configuration identifier. In other words, the FIG. 17B structure (see FIG. 21) contains only one OSR record which indicates that the single operating system I/O configuration definition in that IODF is to be used. If the result at 2307 is no, MVS enters the wait state at 2308. If the result at 2307 is yes, the IODF found at 2307 is used as the default IODF, as shown at 2312.

If the result at 2306 is yes, a check is made at 2309 to determine if the IODF specified at 2306 contains a single OS configuration identifier. If the result at 2309 is no, MVS enters the wait state at 2310.

Returning to 2305, if an OS configuration identifier was specified at 2305, MVS searches for an IODF that contains the specified OS configuration identifier at 2311. If the result at 2307, 2309, or 2311 is yes, a check is made at 2313 to determine if the hardware I/O configuration definition matches the representation of the hardware I/O configuration used by the channel subsystem. This is done by fetching the hardware token from the HSA, and searching the PRRs of the IODF for that hardware token. If the hardware token is found at 2313, both the software and hardware configuration definitions can be changed at 2314, as previously discussed. If the Hardware token is not found in the IODF, only the software configuration definition can be changed at 2315. If only the software configuration definition can be changed, a warning is issued that the hardware configuration definition is not allowed to be changed.

FIG. 24 is a flowchart showing the non-default process at IPL. Blocks 2401, 2402 and 2403 form a summary of FIG. 22. At 2405, MVS looks for the specified OS configuration identifier in that specified IODF. If the specified OS configuration identifier is not found in the specified IODF, MVS enters the wait state at 2406. If MVS does find the specified OS configuration identifier in the specified IODF, that IODF is checked at 2407 to confirm that it contains an I/O configuration definition that matches the representation used by the channel subsystem. This is done by fetching the hardware token from the HSA, and searching for it in the PRRs of the specified IODF. If a match is found in 2407, both software and hardware configuration definitions can be changed at 2408, as previously explained. If a match is not found at 2407, only the software configuration definition can be changed at 2409, and a warning is issued that changes to the hardware configuration definition are not allowed.

FIG. 25 shows the format of the program parameter which is used in the recovery of I/O configuration definitions. The program parameter fields are as follows:

Operating System Identifier (OSID): Byte 0 of word 0 contains the value 01 hex, specifying that the control program creating the program parameter was MVS. Other operating systems running in other partitions may choose to have their own format for the program parameter.

Version code (VERS): Byte 2 of word 0 contains the version code. This allows new levels of MVS to have different formats for the program parameter.

Flags: Byte 2, bit 0 of word 0 contains the Backout flag. If one, the configuration was being backed out toward the source configuration. If zero, the configuration was being modified toward the target configuration. This flag is used to determine what the default direction should be for the recovery and which command should be executed first in that direction.

CCB Index: Word 1 contains an index into the Configuration Change Block to indicate the last change request that was successfully executed before the failure occurred that prevented the configuration change from occurring.

Source IODF Suffix: Bytes 0-1 of word 2 contain the two byte EBCDIC suffix of the IODF dataset name used to represent the source I/O configuration definition.

Target IODF Suffix: Bytes 2-3 of word 2 contain the two byte EBCDIC suffix of the IODF dataset name used to represent the target I/O configuration definition.

Figure 26:
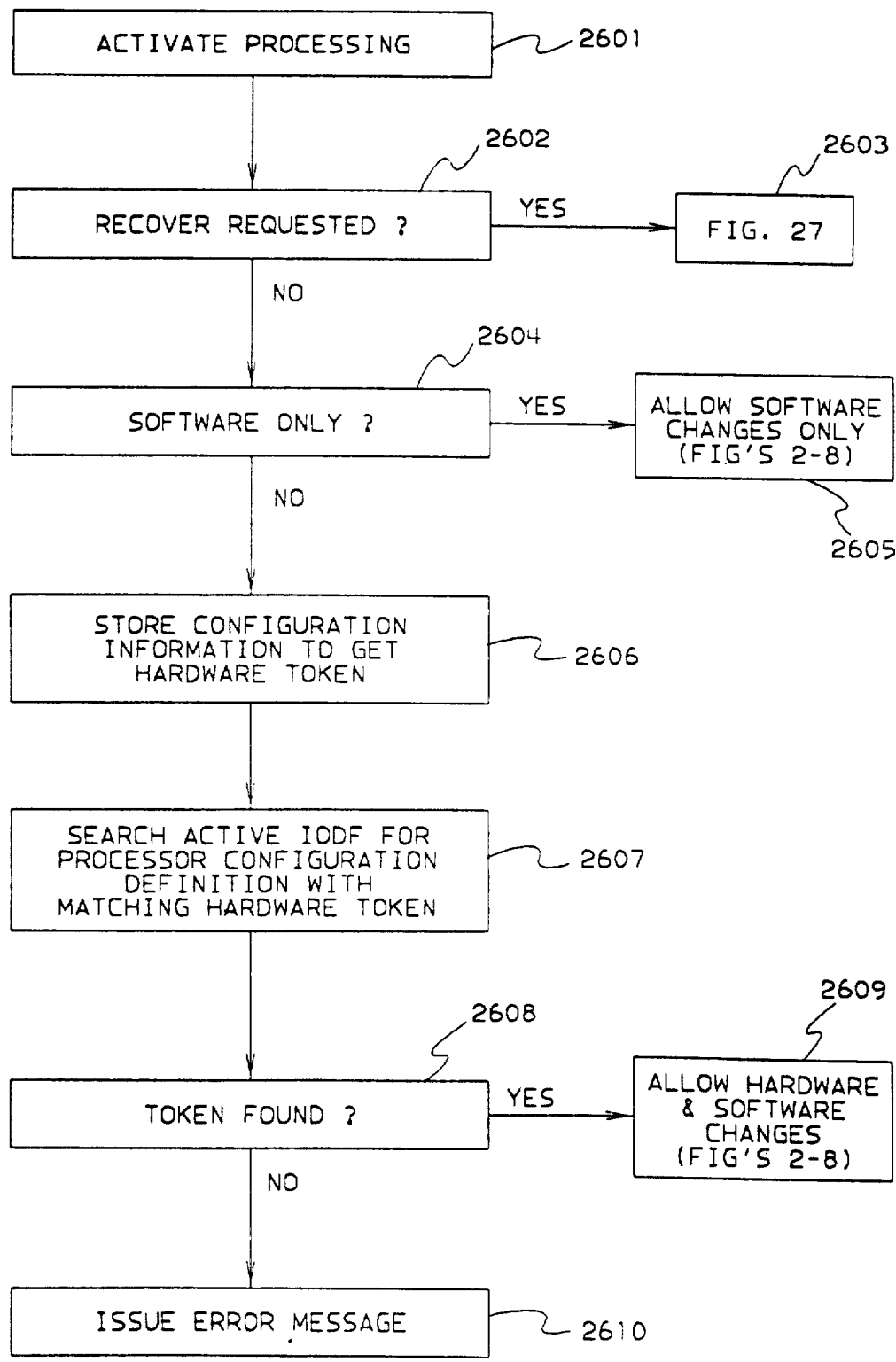
FIG. 26 is a flowchart of the check for synchronization of the software configuration definition and the hardware configuration definition made at activate time.
Figure 27:
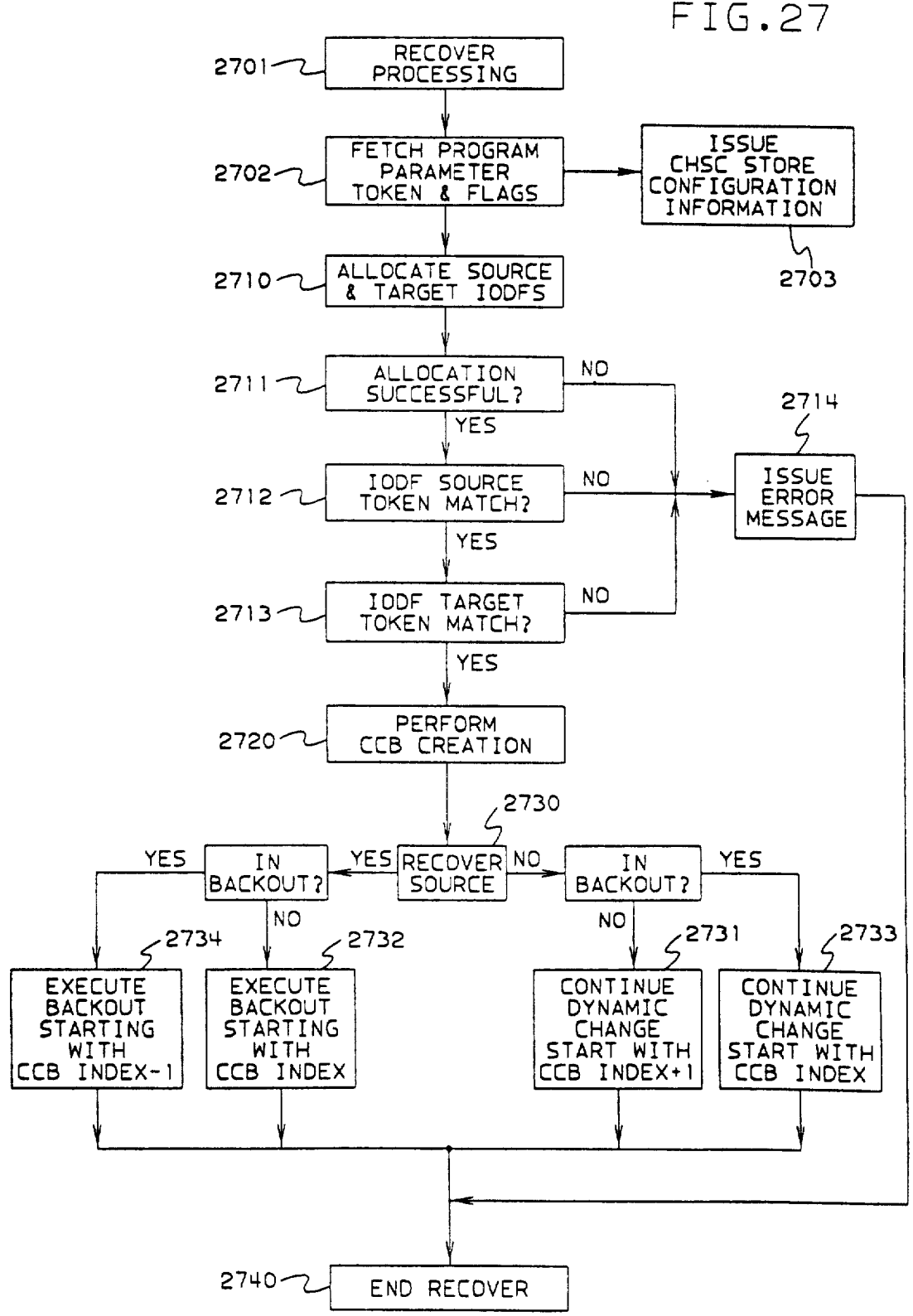
FIG. 27 is a flowchart of the recovery procedure for recovering from a fault in the operating system which occurred while dynamic changes were being made.

FIG. 26 is a flowchart of the check of synchronization of the software configuration definition and the hardware configuration definition which is made at activate time as shown at 2601. A check is made at 2602 to determine if the activate procedure was invoked to request RECOVER. If yes, the procedure of FIG. 27 is called at 2603 to perform RECOVER. If the results at 2602 is no, a check is made at 2604 to see if only the software configuration definition are to be changed. If yes, the procedures of FIGS. 2-8 is called at 2605 to make dynamic changes to the software configuration definition, as previously described. If the results at 2604 is no, a store-configuration-information CHSC command is issued at 2606 to fetch the hardware token from the HSA, as previously described. At 2607, the PRRs of the active IODF are searched for a match with the hardware token from the HSA. As illustrated at 2608, if the hardware token from the HSA is found in the active IODF, both hardware and software dynamic changes to the configuration definitions are allowed to be made at 2609 as discussed in connection with FIGS. 2-8. If the results at 2608 is no, an error message is issued at 2610 indicating that the software configuration definition and the hardware configuration definition do not match and that changes to the hardware configuration definition are not allowed.

FIG. 27 is a flow diagram of the recovery procedure for recovering from a system failure which occurred while dynamic changes were being made. This system failure may be the result of a fault in the operating system, a failure of hardware not requiring an ICE, or any other failure which prevents the successful completion of a sereis of dynamic configuragion changes. Before dynamic hardware configuration changes are performed (FIGS. 2-8) the program parameter of FIG. 25 is constructed. This data is part of each CHSC command that is sent to the hardware while making a dynamic configuration change. The program parameter is stored in the channel subsystem when the dynamic configuration change command has succeessfully completed processing. When valid, the program parameter is visible to each LPAR in a multipartition machine and across IPLs of of operating systems in both native machines and LPAR partitions.

As each instruction of a dynamic configuration change is issued, the CCB index is updated in the program parameter to point to the CCB entry that is currently being executed. By having the program parameter and the source and target hardware configuration tokens, the software always has enough information to be able to continue a dynamic configuration change that it was not able to complete because of some system failure.

If a system failure occurs while a dynamic configuration change is in progress, the channel subsystem's I/O configuration definition could be left in an indeterminate state, somewhere between the source I/O configuration definition and the target I/O configuration definition. When this occurs, no further dynamic I/O configuration changes can be done until the configuration is returned to a known state represented by the source or target IODFs. An ICE of the machine could be used to reinitialize to a specific configuration, but all partitions of an LPAR machine are then unavailable for a length of time. Dynamic configuration changes to the hardware definition cannot be done if the machine is not in a known state because the CCB creation will not produce a set of valid changes unless there is a base from which the comparison of two IODFs can be done.

When RECOVER processing is required, any ACTIVATE requests that that would alter the hardware configuration definition are rejected. RECOVER processing is required if the hardware token is present but not valid and the program parameter is valid.

When ACTIVATE is invoked at 2701 to perform recovery processing, the program parameter and the source and target hardware tokens are fetched from the channel subsystem using the store-configuration-information CHSC instruction.

The source and target IODF data set names are constructed from the source and target IODF suffixes contained in the program parameter. At 2710, the source IODF and the target IODF, which may be the same IODF, are allocated so that the data can be accessed. If the two IODFs cannot be allocated, an error message is displayed and the processing terminated at 2714.

The source IODF is checked at 2712 to determine if the source hardware configuration token obtained at 2703 is contained in the source IODF for one of its processor I/O configuration definitions. If yes, then the source IODF can be used for CCB creation. If the source token is not contained within the source IODF, then an error message is issued and processing terminated at 2714.

The target IODF is checked at 2713 to determine if the target hardware token obtained at 2703 is contained in the target IODF for one of its processor I/O configuration definitions. If yes, the target IODF can be used for CCB creation. If the target token is not contained within the target IODF, then an error message is issued and the processing terminated at 2714.

CCB creation is performed at 2720 as described in appendix A, except that only hardware related CCB entries are created. Software entries do not apply to RECOVER processing.

The RECOVER process can either backout toward the source IODF configuration definition or continue toward the target IODF configuration definition, as determined at 2730. The default is to continue in the direction that was last occurring when the system failure occurred, according to the direction flag in the program parameter. The user may choose to override the default and specify the direction of recovery, if desired.

If recovery is toward the target IODF as shown at 2733, then the dynamic configuration change process is done as described. As previously mentioned, the CCB for RECOVER only contains hardware entries. No software structures are changed. If the system failure occurred while the dynamic process was going toward the target configuration, the RECOVER process begins at the next CCB entry after the CCB entry pointed to by the CCB index of the program parameter 2731. If the original process terminated while performing backout processing, the current CCB entry pointed to by the CCB index is executed at 2733.

If recovery is toward the source IODF at 2734, then backout processing is performed. If processing terminated while going toward the target IODF, the processing begins with the CCB entry pointed to by the CCB index of the program parameter 2732. If processing terminated while going toward the source IODF because backout was already in progress, the backout process begins with the CCB entry previous to the CCB entry pointed to by the CCB index of the program parameter.

Figure 28:
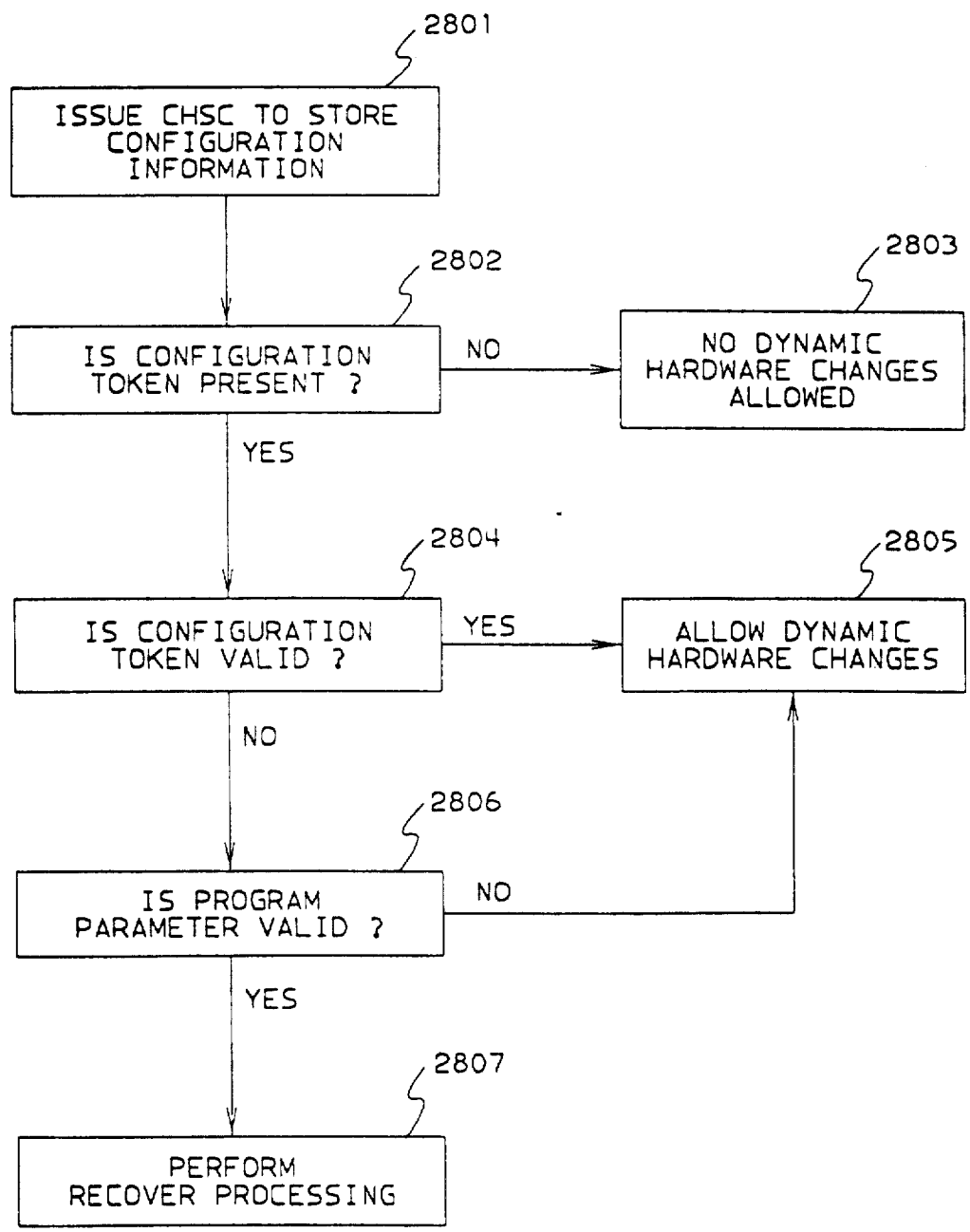
FIG. 28 is a flowchart of the procedure for determining when a fault has occurred for invoking the recovery procedure of FIG. 27.

FIG. 28 is a flowchart showing how the software determines that a fault has occurred and that RECOVER processing should be invoked. At 2801, a store-configuration-information CHSC command is issued to fetch the hardware token from the HSA. A check is made at 2802 to determine if a hardware configuration token is present in the response block of FIG. 20. If no, no dynamic hardware changes are allowed as shown at 2803. If a hardware configuration token is present, a check is made at 2804 to determine if the hardware configuration token is valid. If yes, dynamic hardware changes are allowed as shown at 2805. If the hardware configuration token is not valid, a check is made at 2806 to determine if the program parameter is valid. If no, dynamic hardware changes are allowed. If the program parameter is valid at 2806, the software has determined that a fault has occurred, and RECOVER processing is performed; at 2807 (see FIG. 27).

APPENDIX A

```
Find the processor and the O/S configuration ID
DO FOR each device in the old IODF
      Find the device in the new IODF
      IF the device in the old IODF is not found in the
      new IODF THEN
            Create a "delete device" entry in the CCB
      ELSE
      IF the software definition has changed THEN
            Create a "delete device" entry in the CCB to
                  delete the old device, mark the entry as
                  software only
            Create an "add device" entry in the CCB to
                  add the new device, mark the entry as
                  software only
      IF there are no control units in common between
            the old and new device THEN
            If there is a software only "delete device"
                  entry for this device already in the CCB
                  THEN
                        Mark both the "delete device" and
                        "add device" entries as both
                        hardware and software
            ELSE
                  Create a "delete device" entry for the
                  device
                  Create a "add device" entry for the
                  device
      ELSE there are some CUs in common
            IF the new device has new control units THEN
                  Create a "modify device" entry to add
                  the control unit
```

```
            IF the device in the new IODF is missing
        control units
                Create a "modify device" entry to delete
                the control unit
            IF the subchannel characteristics have
        changed
                Create a "modify device" entry to change
                    the device characteristics
                    (preferred path, interface timeout
                    or illegal status detection)
ENDDO
DO FOR each device in the new IODF
        Find the device in the old IODF
        IF the device is not found THEN
            Create an "add device" entry to add the new
            device
ENDDO
DO FOR each control unit in the old IODF
        Find the control unit in the new IODF
        IF the old control unit is not found in the new
        IODF THEN
            Create a "delete control unit" entry to
            delete the control unit
        ELSE
        IF there are no CHPIDs in common between the
            control unit in the old IODF and the control
            unit in the new IODF OR the control unit
            definition has changed except for the unit
            address range THEN
                Create a "delete control unit" entry
                Create a "modify device entry" to remove
                    the path for every device on the
                    control unit that does not already
                    have a "delete device entry" or a
                    "add device entry" created for it.
                    IF there is already a software
                    delete or add entry for the device,
                    change both the delete and add
```

```
            entry to do both hardware and
            software changes
    Create an "add control unit" entry
    Create a "modify device entry" to add
            the path for every device on the
            control unit that does not already
            have a "delete device entry" or a
            "add device entry" created for it.
            IF there is already a software
            delete or add entry for the device,
            change both the delete and add
            entry to do both hardware and
            software changes
ELSE
    IF the control unit has additional
    CHPIDs THEN
            Create a "modify control unit"
                    entry to add the CHPIDs
            Create a "modify device entry" to
                    add the path for every device
                    on the control unit that does
                    not already have a "delete
                    device entry" or a "add device
                    entry" created for it.  IF
                    there is already a software
                    delete or add entry for the
                    device, change both the delete
                    and add entry to do both
                    hardware and software changes
    IF the control unit has CHPIDs removed
    THEN
            Create a "modify control unit"
                    entry to delete the CHPIDs
            Create a "modify device entry" to
                    remove the path for every
                    device on the control unit
                    that does not already have a
                    "delete device entry" or a
```

```
                              "add device entry" created for
                              it.  IF there is already a
                              software delete or add entry
                              for the device, change both
                              the delete and add entry to do
                              both hardware and software
                              changes
                    IF the control unit, unit address range
                    has changed THEN
                              Create a "modify control unit"
                                   entry to change the U/A range
ENDDO
DO FOR each control unit in the new IODF
     Find the control unit in the old IODF
          IF the control unit is not found THEN
               Create an "add control unit" entry
ENDDO
DO FOR each CHPID in the old IODF
     Find the CHPID in the new IODF
     IF the CHPID is not found THEN
          Create an "delete CHPID" entry
     ELSE
          IF the CHPID definition has changed THEN
               Create a delete CHPID entry
               Create either a "modify control unit"
                    entry or a "delete control unit"
                    entry for every control unit on the
                    CHPID (depending on whether the
                    control unit has other paths)
                    except those control units that
                    already have delete entries or
                    modify entries in the CCB
               Create a "modify device" entry of a
                    "delete device" entry for every
                    device on every control unit on the
                    CHPID (depending whether there are
                    alternate paths to the device)
                    except for those devices that
``` already have "delete device" entries in the CCB. If there is a software only delete and entry, then they are converted to both hardware and software changes.

Create an add CHPID entry

Create either a "modify control unit" entry for every control unit that had a path removed or was added in the step above Create a "modify device" entry or an "add device" entry for every device on every control unit that had path removed above.

ENDDO
DO FOR each CHPID in the new IODF
    Find the CHPID in the old IODF
    IF the CHPID is not found THEN
        Create an "add CHPID" entry
ENDDO

APPENDIX B
I/O Definition File (IODF)

The hardware configuration will be saved in a file, called the I/O definition file (IODF). This file contains the I/O definition information for one or more processors. it contains the information necessary to:

- Build an IOCDS member for each processor

- Build UCBs for the devices in the I/O definition

- Build one or more Eligible Device Tables (EDTs) for the devices in the I/O definition file.

In general the I/O Definition File consists of sets of records ordered into trees and connected together.

The I/O Definition File is constructed in such a way that it will allow a blocked sequential access to some of the records collected in a specific section (e.g., operating system device information, Generic definition table, and Allocation definition tables) with a high performance without the need to use the built in chaining possibilities.

In addition to collecting some of the record types into contiguous storage locations, there are special sets of definitions in the IODF such that different related records are grouped together into contiguous areas. Such sets of definitions are the Generic Definition Table (GDT) and the Allocation Definition Tables (ADT) whereas the ADTs itself are collected each after the other into an allocation definition area (ADA). The areas defined above are again grouped together for every operating system. Refer to Figure 17.

The I/O definition file consists of the following sections:

- File header, containing control information used by HCD.

This section contains control information as well as offsets to other sections of the IODF. The header resides at the origin of the IODF linear space. The header has a length of 4096 bytes.

- Operating system record (OSS) section. Section starts on page boundary relative to the origin of the IODF. It contains all operating system records grouped together.

OSR ...

- The following sections are grouped together and repeated for each operating system configuration definition.

- Generic definition table (GDT) section used by the operating system. Section starts on page boundary relative to the origin of the IODF. It contains generic definition records as follows:

(GGR GRR ...)...

- Allocation definition area (ADA) section used by the operating system. Section starts on page boundary relative to the origin of the IODF. It contains the different allocation definition tables addressed by the ATRs. Organization of the different allocation definition records in ADA is as follows:

ADT...whereas an ADT is setup by (GUR...)(EGR ERR...)...

- Allocation definition table index section used by the operating system. Section starts on page boundary relative to the origin of the IODF. It contains operating system unique control information and it consists of the header records (ATR) of the allocation definition tables. the length of this section may vary depending on the number of the allocation definition tables defined.

ATR ...

- MVS Device record section used by the operating system. Section starts on page boundary relative to the origin of the IODF.

It contains the operating system device records (MDR for example) ordered by the four byte device number.

MDR ...

- NIP Console section used by the operating system. Section starts on page boundary relative to the origin of the IODF.

It contains the NIP Console records.

NCR ...

- Area independent from the operating system.

- Channel path record section (CPS). Section starts on page boundary relative to the origin of the IODF. It contains all CPR records grouped together for each processor.

CPR ...

- Control unit attachment record section (CAS). Section starts on page boundary relative to the origin of the IODF. It contains all CAR records grouped together for each processor.

CAR ...

- Device attachment record section (DAS). Section starts on page boundary relative to the origin of the IODF. It contains all DAR records grouped together for each processor.

DAR ...

- Device record section (DVS). Section starts on page boundary relative to the origin of the IODF. It will contain all DVR records ordered by the device number.

DVR ...

- Control unit record section (CUS). Section starts on page boundary relative to the origin of the IODF. it contains all CUR records ordered by the control unit number.

CUR ...

- Unordered section. Section starts on page boundary relative to the origin of the IODF. It contains all the remainding records of the IODF. Records are stored without a grouping but in sequence of descending length. They can be addressed only using the imbedded fields of the corresponding tree structures.

The I/O definition file will consist of the following records:

- IODF header record (IHR)

It contains control information (e.g., the WWUV) used by HCD, offsets to the roots of trees or to the beginning and end of IODF sections, length of different records, counters etc.

- Operating system records (OSR)

For every operating system configuration there is one OSR defined.

- Processor records (PRR)

There is one Processor Record (PRR) for each processor (processor configuration definition) defined in the IODF. Each PRR that is defined contains control information on a specific processor. The maximum number of processors that can be defined is 4096.

Each processor has to be defined with an up to 8 character alphameric name assigned by the user and used to address the PRR for the processor.

- Channel path records (CPR)

There is a set of 256 Channel Path Records (CPR) for each processor defined in the IODF. Each CPR that is defined contains control information on the channel path attached to that processor. The processor name for a given processor is used to index to the set of 256 CPRs for that processor. The channel path identifiers (CHPID) that can be defined on a given processor are controlled by the Processor Information Table (PIT).

- Partition records (PAR)

There is a set of 256 partition records for each processor defined in the IODF. Each partition record that is defined contains an 8-character partition name, a partition identifier and a count of channel paths assigned to the partition.

Note: Only processors that have been defined for LPAR will have PARs defined. The processor name for a given processor is used to address the set of PARs for that processor. The maximum number of partitions that can be defined for a given processor is controlled by the associated Processor Information Table (PIT).

- IOCDS records (ICR)

There is one set of IOCDS records for each processor defined in the IODF. Each IOCDS record contains the name of the IOCDS data set and information when the data set was updated last.

The maximum number of IOCDSs for a specific processor is controlled by the associated Processor Information Table (PIT).

- Control unit records (CUR, CAR)

The information on physical control units is separated into two types of records.

1. Physical control unit record (CUR)
2. Control unit attachment record (CAR)

The physical control unit record contains processor independent information on the control unit such as unit, model, count of attached devices and unit address ranges of attached devices. There is one set of CURs in the IODF. The number of CURs that can be defined in the IODF is 65536.

As each physical control unit is defined, it is assigned an hexadecimal identifier in the range from 0000 to FFFF. This identifier is assigned by the user and used to address the CUR for the physical control unit.

The control unit attachment record contains processor specific information such as attached channel path IDs and the number of the LCR for the logical control unit the physical control unit belongs to. There is a set of CARs for each CUR attached to a given processor. The physical control unit identifier is used to address the CARs of a given processor. The processor name for a given processor is used to address the set of CARs for that processor.

- Logical Control unit records (LCR)

There is a set of LCRs for each processor defined in the IODF. Each LCR that is defined contains control information on a logical control unit connected to that processor. The processor name for a given processor is used to address the set of LCRs for that processor. The IODF will not contain LCRs for LPAR duplicated control units. These will be generated dynamically as the IOCDS is being built. The number of logical control units that can be defined for a given processor cannot exceed the maximum logical unit count specified in the Processor Information Table (PIT) for that processor. LCRs and logical control unit numbers are dynamically created by the hardware configuration routines. LCR numbers will be provided searching to the first unused number between 0 and the limit number (mentioned above) for a specific processor.

- Device records (DVR, DAR)

The information on devices is separated into two types of records.

1. Device Record (DVR)
2. Device Attachment Record (DAR)

The device record contains processor independent information on the device such as unit, model, features, count of attached physical control units and numbers of attached physical control units. There is one set of DVRs in the IODF. The number of DVRs in this set is limited to 65536.

As each device is defined, it is assigned an hexadecimal number in the range from 0000 to FFFF. This number is assigned by the user and used to address the DVR for the device.

The device attachment record contains processor specific information such as preferred channel path. There is a set of DARs for each DVR attached to a given processor. The device number is used to address the DARs of a given processor. The processor name for a given processor is used to address the set of DARs for that processor.

- Location and Unit Identification Records (LOR)

These records are optional. They contain additional information for the processors (PRR), control units (CUR), devices (DVR), and channel paths (CPR). They are chained to the basic records as an extension. They are not chained together and are transparent to the repository user. Thus the basic records are shorter and can be read in with a better performance by the processing routines. These records contain the location identification, and serial number of the corresponding hardware units.

- NIP Console Records (NCR)

There is one set of NCRs which will define which devices can be used as NIP consoles. A maximum of 128 NIP consoles can be specified. The NCRs have to be added to the system defining their order number (numbers 1 to 256 can be used) such, that the user wants to select the devices as a NIP console.

NCRs contain the HEX device number of the console with unit and model specification. The IODF header (IHR) will contain the offset to the NCRs as well as the count of NCRs specified.

- Operating system device records (for example MDR for MVS)

This contains the operating system dependent device information.

- Device Usage Records (DUR)

There is one set of DURs for each device defined in the IODS. DURs of the same device are chained together and the chain is connected to the corresponding DVR record. DURs contain the offset to either an esoteric group record (EGR) or a NIP console record (NCR) the device is assigned to.

- Generic device Group Records (GGR)

All GGRs are chained together. The anchor is placed in the operating system record. The offset of the GGR is stored in the DVR records for reference.

The GGR contains the name of the generic device group that is used. It is the anchor point of the Generic Range definition Records (GRR). It contains the number of GRRs chained to the GGR.

- Allocation definition Table Records (ATR)

It is the index record to address the ADTs. There is one ATR entry for each ADT. As each ADT is defined, it is assigned a two byte alphanumeric identifier by the user. The ATRs of different ADTs are chained together. The anchor is placed in the operating system record.

The ATR is the anchor point of the records building an allocation definition table.

ATRs contain information about creation and update of the ADT. They provide addressing possibilities to the Esoteric device Group Records (EGR) and to the Generic Update Records (GUR) of an ADT.

- Generic Update Records (GUR)

GURs of the same ADT are chained together. The chain header is located in the ATR.

The GUR is identified by the name of the generic device group and contains an overwrite to the corresponding generic specification. It specifies a user defined preference number for the generic and indicates which generic is eligible for VIO. No GRRs are connected to GURs. The GRRs of the corresponding GGR in the System Generic definition Table (GDT) contain the device specifications.

- Esoteric device Group Records (EGR)

EGRs of the same ADT are chained together. The chain anchor is placed in the ATR.

The EGR is the anchor point of the Esoteric Range definition Records (ERR) associated with the ADT.

The EGR contains the name of an esoteric device group that have been defined. It also indicates which esoteric is eligible for VIO. It contains the number of ERRs chained to the EGR, and the ATR offset for backwards reference.

- Generic Range definition Records (GRR)

GRRs are used with GDT.

GRRs of the same GDT are chained together. The chain header is located in the group record (GGR).

The GRR contains the range specification for a sequence of consecutive device numbers belonging to an generic group. The device numbers stored in the GRR can be used to address the corresponding DVRs.

- Esoteric Range definition Records (ERR)

ERRs are used with ADT.

ERRs of the same ADT are chained together. The chain header is located in the group record (EGR).

The ERR contains the range specification for a sequence of consecutive device numbers belonging to an esoteric group. The device numbers stored in the ERR can be used to address the corresponding DVRs.

APPENDIX C

LCU Split/Merge

A logical control unit (LCU) is a prior art implementation construct used by the channel subsystem to represent a set of physical control units that physically or logically attach I/O devices in common. IOCP builds LCUs from input provided to define the I/O configuration. At POR, LCUs become part of the I/O configuration definition contained in the hardware system area (HSA).

An LCU is created by IOCP for:

- Each physical control unit with no I/O devices.

- Each physical control unit that does not share any I/O devices with other physical control units.

- Each group of control units that share I/O devices between them.

The described embodiment only contains limited support for splitting or merging of LCUs when ACTIVATE'ing a new I/O configuratin definition. An LCU split would occur if a path from a control unit to an I/O device or an I/O device is deleted and the deletion causes the physical control units, that were part of the LCU, to no longer have an I/O device in common. Similarly, an LCU merge would occur if a path from a control unit to an I/O device or an I/O device is added and the addition causes physical control units, that were part of different LCUs, to connect to an I/O device in common.

Splitting or merging of LCUs is only allowed if one of the LCUs resulting after a split or existing vefore the merge does not have any devices attached. This restriction is enforced as part of the comparison processing between the source and the target configuration definition prior to determining the set of changes required. Enforcement is done beforehand in order to prevent disruption within a set of planned changes. Refer to the following for details on the method used.

```
Loop through all devices in the old IODF
    If the device is connected to 2 or more PCUs then
    consider device as possible candidate for split -
    do
        Loop through all PCUs connected to the device
        in the old IODF
            Collect all those PCUs that also exist
            in the new IODF
        end loop through all PCUs on old device
        Compare every pair of the collected PCUs in
        the new IODF - do
            If both PCUs are on different LCUs then
            a split was performed here - do (check
            for illegal split)
                If both LCUs the PCUs belong to in
                the new IODF contain at least one
                device that was part of the LCU in
                the old IODF and that has PCUs in
                common between the old and the new
                IODF then ***** ILLEGAL SPLIT *****
            end
        end
    end
End loop through all devices Loop through all devices in the new IODF
    If the device is connected to 2 or more PCUs then
    consider device as possible candidate for merge -
    do
        Loop through all PCUs connected to the device
        in the new IODF
            Collect all those PCUs that also exist
            in the old IODF
        end loop through all PCUs on new device
        Compare every pair of the collected PCUs in
        the old IODF - do
```

```
                    If both PCUs are on different LCUs then
                    a merge was performed here - do (check
                    for illegal merge)
                            If both LCUs the PCUs to belong to
                            in the old IODF contain at least
                            one device that is part of the LCU
                            in the new IODF and that has PCUs
                            in common between the new and the
                            old IODF then
                                    ***** ILLEGAL MERGE ****
                    end
            end
    end
    End loop through all devices.
```

While we have illustrated and described the preferred embodiment of our invention, it is to be understood that we do not limit ourselves to the precise construction herein disclosed, and the right is reserved to all changes and modifications coming within the scope of the invention as defined in the appended claims.

What is claimed is:

1. In a data processing I/O system having a main storage for storing data including a software configuration definition and data processing instructions arranged in programs including an operating system, a storage device for storing I/O definition files including hardware configuration information and at least one operating system I/O configuration definition, a processor controller for containing said hardware configuration information, and a hardware storage area connected to said processor controller for storing a hardware configuration definition, computer implemented a method for determining if the software configuration definition corresponds to the hardware configuration definition comprising:

building an I/O definition file (IODF) on said storage device with a hardware configuration definition program (HCD) for a processor I/O configuration definition, said IODF containing a hardware token for identifying said processor I/O configuration definition in the IODF;

transferring hardware configuration information for said processor I/O configuration from said IODF to said processor controller with an I/O configuration program (IOCP), said hardware configuration information containing a copy of said hardware token;

establishing in said HSA, said hardware configuration definition from said hardware configuration information, said hardware configuration definition containing said copy of said hardware token;

specifying to said operating system, the operating system I/O configuration definition in said IODF for establishing said software configuration definition;

establishing in said main storage with said operating system, said software configuration definition specified by said system I/O configuration definition;

fetching said copy of said hardware token from said HSA; and searching said IODF for a hardware token matching said copy of said hardware token fetched from said HSA for determining if said software configuration definition corresponds with said hardware configuration definition.

2. The method of claim 1 further comprising allowing dynamic changes to said hardware configuration definition when said copy of said hardware token is contained in said IODF.

3. The method of claim 1 further comprising issuing a warning that dynamic changes are not allowed to be made to said hardware configuration definition when said copy of said hardware token is not found in said IODF.

4. The method of claim 2 further comprising:

specifying a target processor I/O configuration definition;

locating said target processor I/O configuration definition from among processor I/O configuration definitions stored in said IODF;

establishing as a target hardware configuration definition, the target processor I/O configuration definition located in said IODF;

creating a configuration change block representing the deltas to the software and hardware configuration definitions to form target software and hardware configuration definitions; and dynamically changing said software and hardware configuration definitions to said target software and hardware configuration definitions in accordance with said configuration change block.

5. The method of claim 4 further comprising:

checkpointing by hardware an indication of each successful change made to said hardware configuration definition;

detecting a failure that occurred while dynamically changing said hardware configuration definition to said target hardware configuration definition; and continuing to make changes to the hardware configuration definition from the last checkpointed indication recorded before said failure, therefore completing said target hardware configuration definition.

6. The method of claim 4 further comprising:

detecting a failure that occurred while dynamically changing said hardware configuration definition to said target hardware configuration definition; and backing out all changes made to the hardware configuration definition before said failure, therefore recovering said hardware configuration definition.

7. In a data processing I/O system having a main storage for storing data including a software configuration definition and data processing instructions arranged in programs including an operating system, a storage device for storing multiple I/O definition files including hardware configuration information, a processor controller for containing a portion of said hardware configuration information, and hardware storage area connected to said processor controller for storing a computer implemented hardware configuration definition, a method for determining if the software configuration definition corresponds to the hardware configuration definition comprising:

building multiple I/O definition files (IODFs) on said storage device with a hardware configuration definition program (HCD), each IODF containing multiple processor I/O configuration definitions each processor I/O configuration definition containing a hardware token for identification;

transferring hardware configuration information for a specified one of said processor I/O configuration definitions from one of said IODFs to said processor controller with an I/O configuration program (IOCP), said transferred hardware configuration information containing a copy of the hardware token for said specified one of said processor I/O configurations definitions;

establishing in said HSA, said hardware configuration definition from said transferred hardware configuration information, said hardware configuration definition containing said copy of said hardware token;

fetching said copy of said hardware token from said HSA; and searching said IODFs for a hardware token matching said copy of said hardware token fetched from said HSA for determining if said software configuration definition corresponds with said hardware configuration definition.

8. The method of claim 7 further comprising issuing a warning that dynamic changes are not allowed to be made to said hardware configuration definition when said copy of said hardware token is not located in said IODFs, and establishing in said main storage with said HCD, the software configuration definition from the first IODF found which is compatible with said operating system.

9. The method of claim 7 further comprising, when said hardware token is located in one of said IODFs:

establishing in said main storage with said HCD, the software configuration definition from said one IODF having said hardware token matching said copy of said hardware token; and allowing dynamic changes to said hardware configuration definition.

10. The method of claim 9 further comprising:

specifying a target hardware token;

locating in said one IODF, said target hardware token;

establishing as a target hardware configuration definition, the processor I/O configuration definition located in said one IODF as containing said target hardware token;

creating a configuration change block representing the deltas to the software and hardware configuration definitions to form target software and hardware configuration definitions; and dynamically changing said software and hardware configuration definitions to said target software and hardware configurations definitions in accordance with said configuration change block.

11. The method of claim 10 further comprising:

checkpointing by hardware, an indication of each successful change made to said hardware configuration definition;

detecting a failure that occurred while dynamically changing said hardware configuration definition to said target hardware configuration definition; and continuing to make changes to the hardware configuration definition from the last checkpointed indication recorded before said failure, therefore completing said target hardware configuration definition.

12. The method of claim 10 further comprising:

detecting a failure that occurred while dynamically changing said hardware configuration definition to said target hardware configuration definition; and backing out all changes made to the hardware configuration definition before said failure, therefore recovering said hardware configuration definition.

13. In a data processing I/O system having a main storage for storing data and data processing instructions arranged in programs including an operating system, a storage device for storing multiple I/O definition files (IODFs), each IODF having hardware configuration information for multiple processor I/O configuration definitions, each processor I/O configuration definition having a hardware token for identification, a processor controller for containing hardware configuration information for one processor I/O configuration definition and a copy of its hardware token received from a base IODF in said main storage, and a hardware storage area (HSA) connected to said processor controller for storing a hardware configuration definition established from the hardware configuration definition in said processor controller, said hardware configuration definition containing said copy of said hardware token in said processor controller, and said main storage having a software configuration definition established from said base IODF, a computer implemented method for determining if the software configuration definition corresponds to the hardware configuration definition comprising:

at a specified activate time, fetching said copy of said hardware token from said HSA; and comparing the hardware token of said one processor I/O configuration definition of said base IODF with said copy of said hardware token fetched from said HSA for determining if said software definition corresponds with said hardware configuration definition.

14. The method of claim 13 further comprising issuing a warning that dynamic changes are not allowed to be made to said hardware configuration definition when said copy of said hardware token does not match the hardware token of said one processor I/O configuration definition in said base IODF.

15. The method of claim 13 further comprising allowing dynamic changes to said hardware configuration definition when said copy of said hardware token matches the hardware token of said one processor I/O configuration definition in said base IODF.

16. The method of claim 15 further comprising:
specifying a target processor I/O configuration definition;
locating in said IODFs, said target hardware configuration definition;
establishing as a target hardware configuration definition, the processor I/O configuration definition located in said IODFs;
creating a configuration change block representing the deltas to the software and hardware configuration definitions to form target software and hardware configuration definitions; and
dynamically changing said software and hardware configuration definition to said target software and hardware configurations definitions in accordance with said configuration change block.

17. The method of claim 16 further comprising:
checkpointing by the hardware an indication of each successful change made to said hardware configuration definition;
detecting a failure that occurred while dynamically changing said hardware configuration definition to said target hardware configuration definition; and
continuing to make changes to the hardware configuration definition from the last checkpointed indication recorded before said failure, therefore completing said target hardware configuration definition.

18. The method of claim 16 further comprising:
detecting a failure that occurred while dynamically changing said hardware configuration definition to said target hardware configuration definition; and
backing out all changes made to the hardware configuration definition before said failure, therefore recovering said hardware configuration definition.

19. In a data processing I/O system having a main storage for storing data including a software configuration definition and data processing instructions arranged in programs including an operating system, a storage device for storing multiple I/O definition files (IODFs), each IODF including hardware configuration information, a processor controller for containing at least a portion of said hardware configuration information, and a hardware storage area connected to said processor controller for storing a hardware configuration definition, a computer implemented method comprising:
storing in a program parameter, a source identification for identifying a source IODF;
storing in said program parameter, a target identification for identifying a target IODF;
storing in said program parameter, a direction indicator having a first state when the software and hardware configuration definitions are being changed from the source identification to the target identification, and a second state when the software and hardware configuration definitions are being changed from the target identification to the source identification;
changing the software and hardware configuration definitions between said source identification and said target identification in a series of steps, each step being implemented for changing a single element in the configurations;
checkpointing in said program parameter, an index number of each step of said series of steps, said index number representing the last step successfully implemented;
detecting any failure that occurred in any one of the steps in said series of steps; and
implementating a series of recovery steps dependent on said index number and said direction indicator for either completing the series of steps or backing out part of said series of steps for recovering said hardware configuration definitions.

20. The method of claim 19 wherein said method is being performed in one partition of multiple partitions in said main storage, and further comprising indicating in said program parameter the operating system running in said one partition.

21. The method of claim 19 further comprising indicating in said program parameter a version number of the format of the program parameter.

22. The method of claim 19 wherein;
each of said IODFs contain multiple processor I/O configuration definitions, each processor I/O configuration definition having a hardware token for identification,
said source identification includes the hardware token for a first one of said processor I/O configuration definitions, and
said target identification includes the hardware token for a second one of said processor I/O configuration definitions, and
further comprising:
validating said source identification by matching said source identification with one of the hardware tokens in said source IODF thereby locating said first one of said processor I/O configuration definitions; and
validating said target identification by matching said target identification with another one of the hardware tokens in said target IODF thereby locating said second one of said processor I/O configuration definitions.

23. A data processing I/O system comprising:
a main storage for storing data including a software configuration definition and data processing instructions arranged in programs including an operating system;
a storage device for storing I/O definition files including hardware configuration information and at least one operating system I/O configuration definition;
a processor controller for containing said hardware configuration information;
a hardware storage area connected to said processor controller for storing a hardware configuration definition;
a hardware configuration definition program (HCD) for building an I/O definition file (IODF) on said storage device, said IODF containing a processor I/O configuration definition and a hardware token for identifying said processor I/O configuration definition in the IODF;

an I/O configuration program (IOCP) for transferring hardware configuration information for said processor I/O configuration from said IODF to said processor controller, said hardware configuration information containing a copy of said hardware token;

hardware establishing means for establishing in said HSA, said hardware configuration definition from said hardware configuration information, said hardware configuration definition containing said copy of said hardware token;

specifying means for specifying to said operating system, the operating system I/O configuration definition in said IODF for establishing said software configuration definition;

software establishing means for establishing in said main storage with said operating system, said software configuration definition specified by said system I/O configuration definition;

fetching means for fetching said copy of said hardware token from said HSA; and searching means for searching said IODF for a hardware token matching said copy of said hardware token fetched from said HSA for determining if said software configuration definition corresponds with said hardware configuration definition.

24. The data processing I/O system of claim 23 further comprising:

dynamic change means for making dynamic changes to said hardware configuration definition when said copy of said hardware token is contained in said IODF.

25. The data processing I/O system of claim 23 further comprising warning means for issuing a warning that dynamic changes are not allowed to be made to said hardware configuration definition when said copy of said hardware token is not found in said IODF.

26. The data processing I/O system of claim 24 further comprising:

target specifying means for specifying a target processor I/O configuration definition;

target locating means for locating said target processor I/O configuration definition from among processor I/O configuration definitions stored in said IODF;

target establishing means for establishing as a target hardware configuration difinition, the target processor I/O configuration definition located in said IODF;

configuration change block creating means for creating a configuration change block representing the deltas to the software and hardware configuration definitions to form target software and hardware configuration definitions; and means in said dynamic change means for dynamically changing said software and hardware configuration definitions to said target software and hardware configuration definitions in accordance with said configuration change block.

27. The data processing I/O system of claim 26 further comprising:

checkpointing means for checkpointing in hardware, an indication of each change successfully made to said hardware configuration definition;

failure detecting means for detecting a failure that occurred while dynamically changing said hardware configuration definition to said target hardware configuration definition; and completing means for continuing to make changes to the hardware configuration definition from the last checkpointed indication recorded before said failure, therefore completing said target hardware configuration definition.

28. The data processing I/O system of claim 26 further comprising:

failure detecting means for detecting any failure that occurred while dynamically changing said hardware configuration definition to said target hardware configuration definition; and recovery means for backing out all changes made to the hardware configuration definition before said fault, therefore recovering said hardware configuration definition.

29. A data processing I/O system comprising a main storage for storing data including a software configuration definition and data processing instructions arranged in programs including an operating system;

a storage device for storing multiple I/O definition files including hardware configuration information;

a processor controller for containing a portion of said hardware configuration information;

a hardware storage area (HSA) connected to said processor controller for storing a hardware configuration definition;

a hardware configuration definition program (HCD) for building multiple I/O definition files (IODFs) on said storage device, each IODF containing multiple processor I/O configuration definitions, each processor I/O configuration definition containing a hardware token for identification;

an I/O configuration program (IOCP) for transferring hardware configuration information for a specified one of said processor I/O configuration definitions from one of said IODFs to said processor controller, said transferred hardware configuration information containing a copy of the hardware token for said specified one of said processor I/O configurations definitions;

hardware establishing means for establishing in said HSA, said hardware configuration definition from said transferred hardware configuration information, said hardware configuration definition containing said copy of said hardware token;

fetching means for fetching said copy of said hardware token from said HSA; and determining means for searching said IODFs for a hardware token matching said copy of said hardware token fetched from said HSA for determining if said software configuration definition corresponds with said hardware configuration definition.

30. The data processing I/O system of claim 29 further comprising;

warning means for issuing a warning that dynamic changes are not allowed to be made to said hardware configuration definition when said copy of said hardware token is not located in said IODFs, and software establishing means for establishing in said main storage, the software configuration definition from the first IODF found which is compatible with said operating system.

31. The data processing I/O system of claim 29 further comprising;
   locating means for locating said copy of said hardware token in one of said IODFs:
   software establishing means for establishing in said main storage, the software configuration definition from said one IODF located by said locating means wherein said hardware token matches said copy of said hardware token; and
   dynamic change means for making dynamic changes to said hardware configuration definition.

32. The data processing I/O system of claim 31 further comprising:
   target specifying means for specifying a target hardware token;
   target locating means for locating in said one IODF, said target hardware token;
   target establishing means for establishing as a target hardware configuration definition, the processor I/O configuration definition located in said one IODF by said target locating means as containing said target hardware token;
   configuration change block creating means for creating a configuration change block representing the deltas to the software and hardware configuration definitions to form target software and hardware configuration definitions; and
   means in said dynamic change means for dynamically changing said software and hardware configuration definitions to said target software and hardware configurations definitions in accordance with said configuration change block.

33. The data processing I/O system of claim 32 further comprising: checkpointing means for checkpointing in hardware, an indication of each change successfully made to said hardware configuration definition;
   failure detecting means for detecting a failure that occurred while dynamically changing said hardware configuration definition to said target hardware configuration definition; and
   completing means for continuing to make changes to the hardware configuration definition from the last checkpointed indication recorded before said failure, therefore completing said target hardware configuration definition.

34. The data processing I/O system of claim 32 further comprising:
   failure detecting means for detecting any failure that occurred while dynamically changing said hardware configuration definition to said target hardware configuration definition; and
   recovery means for backing out all changes made to the hardware configuration definition before said fault, therefore recovering said hardware configuration definition.

35. A data processing I/O system comprising:
   a main storage for storing data and data processing instructions arranged in programs including an operating system;
   a storage device for storing multiple I/O definition files (IODFs), each IODF having hardware configuration information for multiple processor I/O configuration definitions, each processor I/O configuration definition having a hardware token for identification;
   processor controller for containing hardware configuration information for one processor I/O configuration definition and a copy of its hardware token received from a base IODF in said main storage;
   a hardware storage area (HSA) connected to said processor controller for storing a hardware configuration definition established from the hardware configuration definition in said processor controller;
   said hardware configuration definition containing said copy of said hardware token in said processor controller, and said main storage having a software configuration definition established from said base IODF;
   fetching means for fetching at a specified activate time, said copy of said hardware token from said HSA; and
   comparing means for comparing the hardware token of said one processor I/O configuration definition of said base IODF with said copy of said hardware token fetched from said HSA for determining if said software definition corresponds with said hardware configuration definition.

36. The data processing I/O system of claim 35 further comprising;
   a warning means for issuing a warning that dynamic changes are not allowed to be made to said hardware configuration definition when said copy of said hardware token does not match the hardware token of said one processor I/O configuration definition in said base IODF.

37. The data processing I/O system of claim 35 further comprising:
   dynamic change means for dynamically changing said hardware configuration definition when said copy of said hardware token matches the hardware token of said one processor I/O configuration definition in said base IODF as determining by said comparing means.

38. The data processing I/O system of claim 37 further comprising:
   target specifying means for specifying a target processor I/O configuration definition;
   target locating means for locating in said IODFs, said target hardware configuration definition;
   target establishing means for establishing as a target hardware configuration definition, the processor I/O configuration definition located in said IODFs by said target locating means;
   configuration change block creating means for creating a configuration change block representing the deltas to the software and hardware configuration definitions to form target software and hardware configuration definitions; and
   means in said dynamic change means for dynamically changing said software and hardware configuration definition to said target software and hardware configurations definitions in accordance with said configuration change block.

39. The data processing I/O system of claim 38 further comprising:
   checkpointing means for checkpointing in hardware, an indication of each change successfully made to said hardware configuration definition;
   failure detecting means for detecting a failure that occurred while dynamically changing said hardware configuration definition to said target hardware configuration definition; and completing means for continuing to make changes to the hardware configuration definition from the last checkpointed indication recorded before said failure, therefore completing said target hardware configuration definition.

40. The data processing I/O system of claim 38 further comprising:
failure detecting means for detecting any failure that occurred while dynamically changing said hardware configuration definition to said target hardware configuration definition; and
recovery means for backing out all changes made to the hardware configuration definition before said fault, therefore recovering said hardware configuration definition.

41. A data processing I/O comprising:
a main storage for storing data including a software configuration definition and data processing insructions arranged in programs including an operating system;
a storage device for storing multiple I/O definition files (IODFs), each IODF including hardware configuration information;
a processor controller for containing at least a portion of said hardware configuration information;
a hardware storage area connected to said processor controller for storing a hardware configuration definition;
a program parameter for storing a source identification for identifying a source IODF, a target identification for identifying a target IODF, and a direction indicator having a first state when the software and hardware configuration definitions are being changed from the source identification to the target identification and a second state when the software and hardware configuration definitions are being changed from the target identification to the source identification;
dynamic changing means for changing the software and hardware configuration definitions between said source identification and said target identification in a series of steps, each step being implemented for changing a single element in the configurations;
checkpointing means for checkpointing in said program parameter, an index number of each step of said series of steps, said index number representing the last step successfully implemented;
failure detecting means for detecting any failure that occurred in any one of the steps in said series of steps; and
a recovery means for implementing a series of recovery steps dependent on said index number and said direction indicator for either completing the series of steps or backing out part of said series of steps for recovering said hardware configuration definitions.

42. The data processing I/O system of claim 41 further comprising:
multiple partitions in said main storage, said recovery program being executed in one partition of said multiple partitions in said main storage; and
indicating means in said program parameter for indicating the operating system running in said one partition.

43. The data processing I/O system of claim 41 further comprising a version field in said program parameter for storing a version number of the format of the program parameter.

44. The data processing I/O system of claim 41 wherein;
each of said IODFs contain multiple processor I/O configuration definitions, each processor I/O configuration definition having a hardware token for identification,
said source identification includes the hardware token for a first one of said processor I/O configuration definitions, and
said target identification includes the hardware token for a second one of said processor I/O configuration definitions, and
further comprising:
source validating means for validating said source identification by matching said source identification with one of the hardware tokens in said source IODF thereby locating said first one of said processor I/O configuration definitions; and
target validating means for validating said target identification by matching said target identification with another one of the hardware tokens in said target IODF thereby locating said second one of said processor I/O configuration definitions.

* * * * *